(12) United States Patent
Finelt et al.

(10) Patent No.: US 11,679,760 B2
(45) Date of Patent: Jun. 20, 2023

(54) NAVIGATION IN VEHICLE CROSSING SCENARIOS

(71) Applicant: Mobileye Vision Technologies Ltd., Jerusalem (IL)

(72) Inventors: Ofer Finelt, Jerusalem (IL); Tomer Baba, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 214 days.

(21) Appl. No.: 16/709,220

(22) Filed: Dec. 10, 2019

(65) Prior Publication Data

US 2020/0180612 A1 Jun. 11, 2020

Related U.S. Application Data

(60) Provisional application No. 62/777,531, filed on Dec. 10, 2018, provisional application No. 62/777,527, filed on Dec. 10, 2018.

(51) Int. Cl.
*B60W 30/09* (2012.01)
*B60W 30/095* (2012.01)
*B60W 40/072* (2012.01)
*G05D 1/00* (2006.01)
(Continued)

(52) U.S. Cl.
CPC ........ *B60W 30/09* (2013.01); *B60W 30/0956* (2013.01); *B60W 40/072* (2013.01); *G05D 1/0088* (2013.01); *G05D 1/0214* (2013.01); *G05D 1/0246* (2013.01);
(Continued)

(58) Field of Classification Search
CPC ............. B60W 30/0956; B60W 30/09; B60W 40/04; B60W 40/072; B60W 2552/53; B60W 30/18154; B60W 2552/30; G05D 1/0038; G05D 1/0214; G05D 1/0246;
(Continued)

(56) References Cited

U.S. PATENT DOCUMENTS

2015/0224988 A1* 8/2015 Buerkle ............ B60W 30/0956
701/45
2016/0200317 A1* 7/2016 Danzl ............... B60W 30/0956
701/25
2016/0207534 A1* 7/2016 Nishimura .......... B60W 30/095
(Continued)

*Primary Examiner* — Christian Chace
*Assistant Examiner* — Shayne M. Gilbertson
(74) *Attorney, Agent, or Firm* — Finnegan, Henderson, Farabow, Garrett & Dunner, LLP.

(57) ABSTRACT

Systems and methods are disclosed for navigating a host vehicle. In one implementation, at least one processor may be programmed to receive images representative of an environment of the host vehicle; identify an oncoming target vehicle associated with a projected trajectory indicated by an aspect of the oncoming target vehicle in the images; determine that a planned trajectory for the host vehicle crosses the projected trajectory of the oncoming target vehicle and indicates a potential turn-across-path event; determine a remedial action for the host vehicle in response to the oncoming target vehicle and the potential turn-across-path event; implement the remedial action if the oncoming target vehicle is determined to be not approaching a road feature that negates the potential turn-across-path event; and forego the remedial action if the oncoming target vehicle is determined to be approaching a road feature that negates the potential turn-across-path event.

25 Claims, 68 Drawing Sheets

(51) Int. Cl.
  *G05D 1/02* (2020.01)
  *G06V 20/56* (2022.01)
(52) U.S. Cl.
  CPC ....... *G06V 20/588* (2022.01); *B60W 2520/06* (2013.01); *B60W 2554/00* (2020.02); *G05D 2201/0213* (2013.01)
(58) Field of Classification Search
  CPC .............. G05D 1/0253; G05D 1/0212; G05D 1/0088; B60K 2370/177; G06K 9/00798; G06V 20/588
  See application file for complete search history.

(56) References Cited

U.S. PATENT DOCUMENTS

| | | | |
|---|---|---|---|
| 2017/0101102 A1* | 4/2017 | Matei | G08G 1/00 |
| 2018/0150080 A1* | 5/2018 | Gross | G05D 1/0217 |
| 2018/0326979 A1* | 11/2018 | Tsuruoka | B60W 30/0956 |
| 2018/0370528 A1* | 12/2018 | Rittger | B60W 30/09 |
| 2019/0011917 A1* | 1/2019 | Kuffner, Jr. | G09B 5/02 |
| 2019/0086925 A1* | 3/2019 | Fan | G01C 21/3837 |
| 2019/0235499 A1* | 8/2019 | Kazemi | G01S 17/931 |

\* cited by examiner

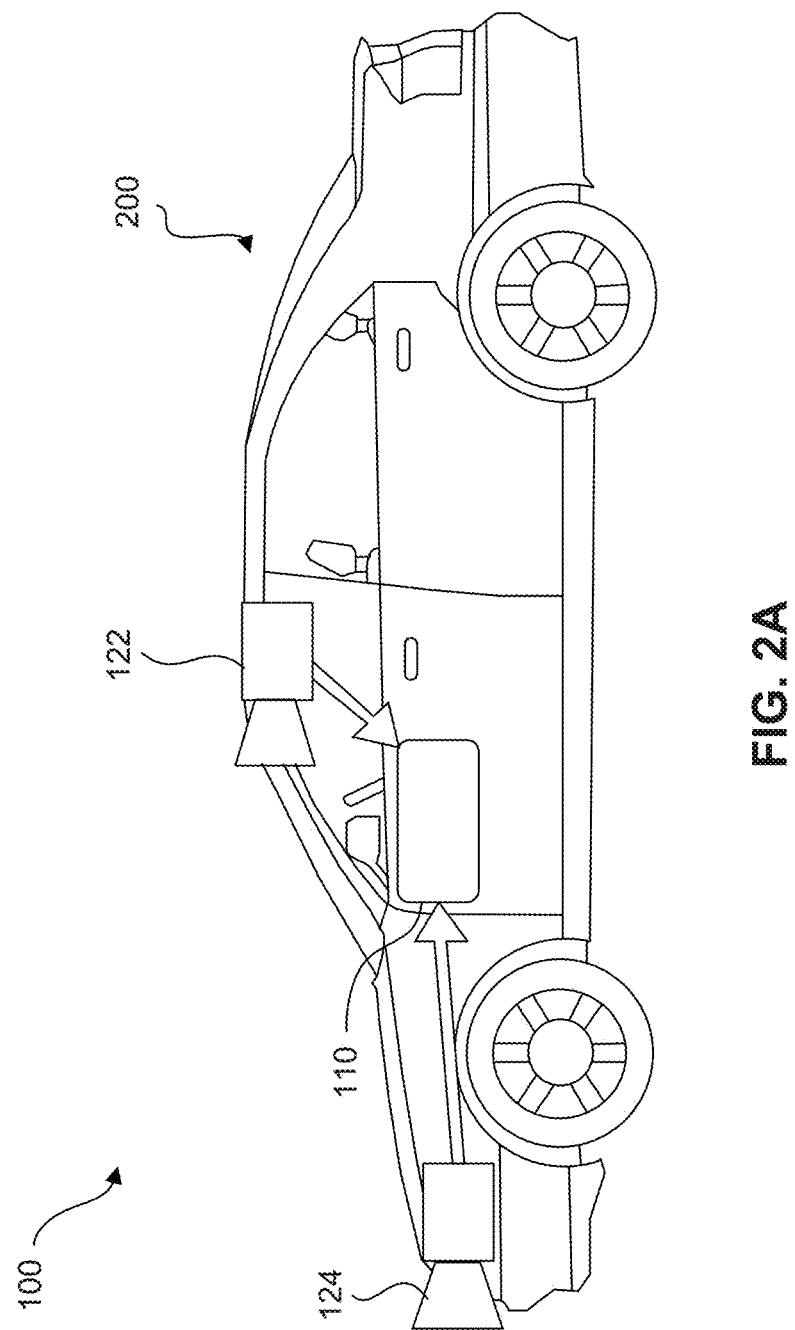

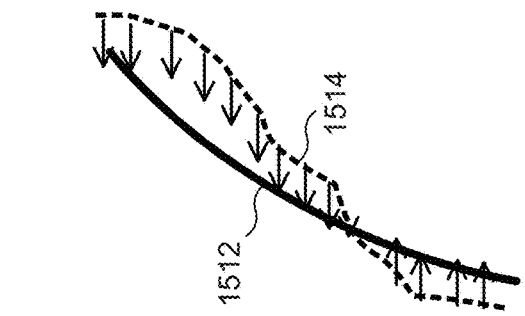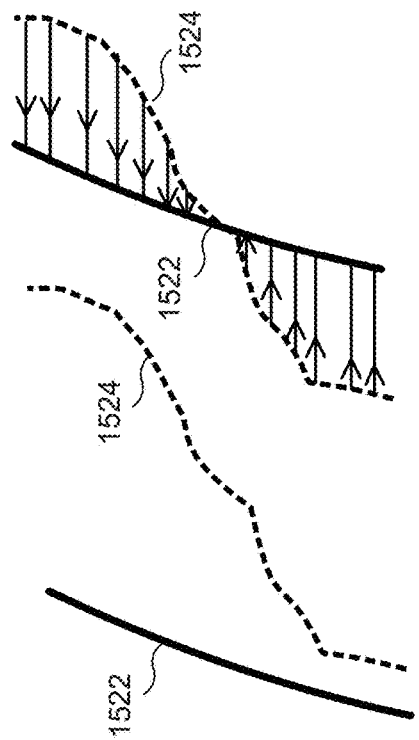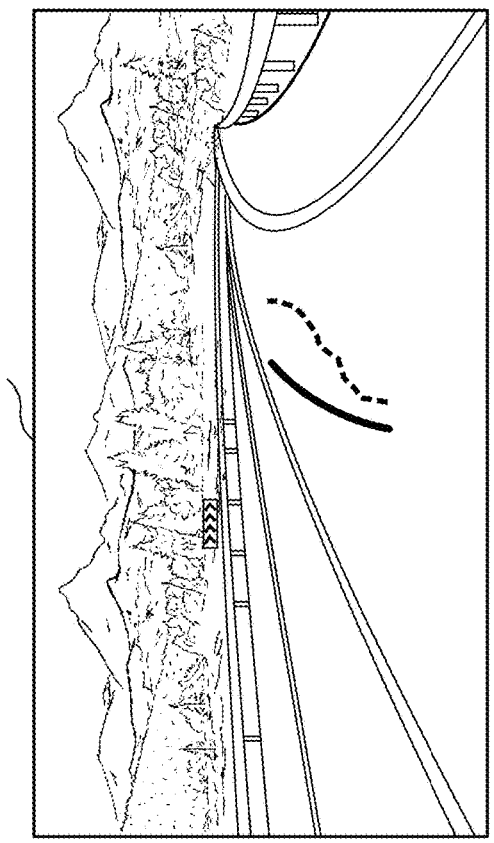
FIG. 15A
FIG. 15B

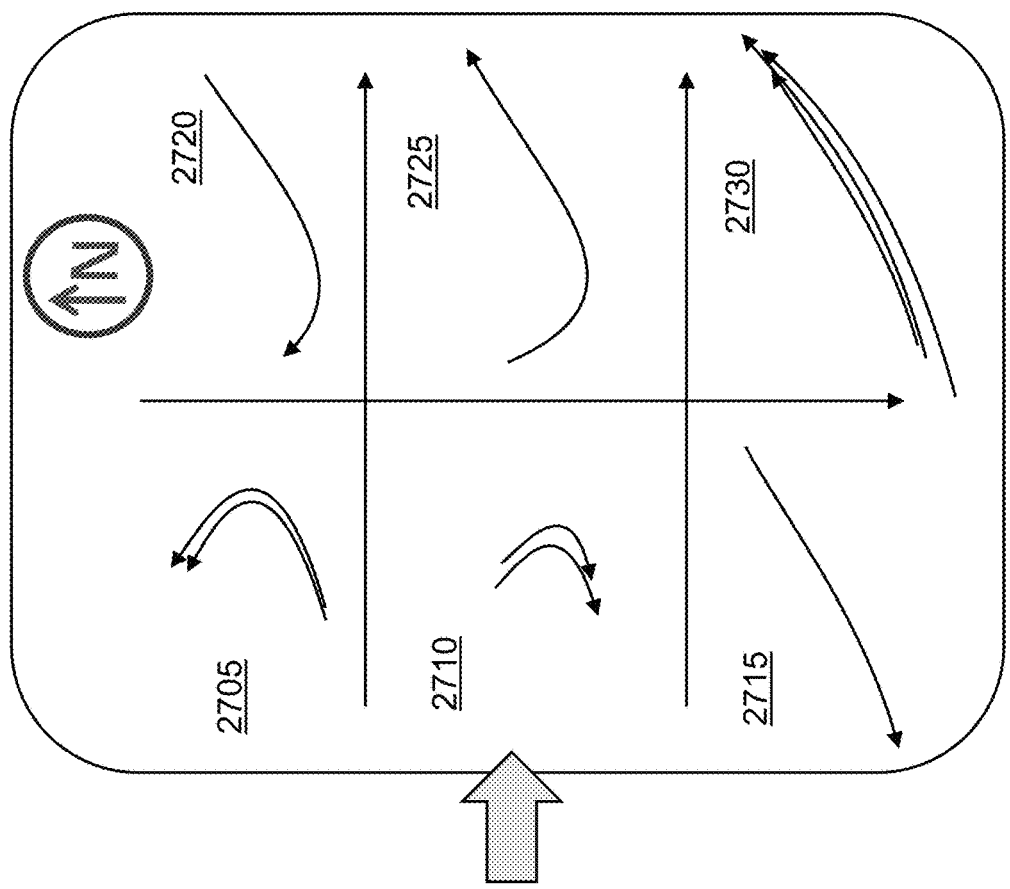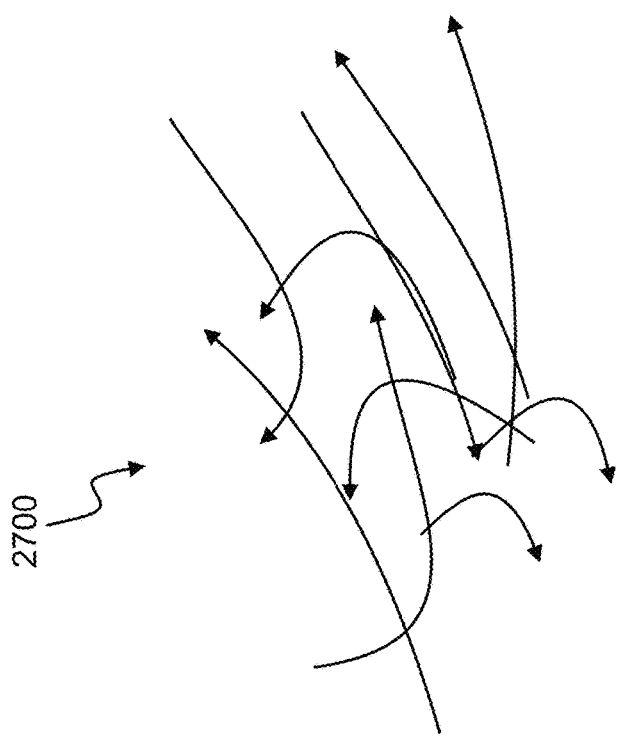
FIG. 27

NAVIGATION IN VEHICLE CROSSING SCENARIOS

CROSS REFERENCES TO RELATED APPLICATIONS

This application claims the benefit of priority of U.S. Provisional Application No. 62/777,527, filed on Dec. 10, 2018, and U.S. Provisional Application No. 62/777,531, filed on Dec. 10, 2018. The foregoing applications are incorporated herein by reference in their entirety.

BACKGROUND

Technical Field

The present disclosure relates generally to advanced driver assistance systems (ADAS), and autonomous vehicle (AV) systems.

Background Information

As technology continues to advance, the goal of a fully autonomous vehicle that is capable of navigating on roadways is on the horizon. Autonomous vehicles may need to consider a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as it travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also consider other data including, for example, global positioning system (GPS) data, sensor data (e.g., from an accelerometer, a speed sensor, a suspension sensor, etc.), and/or other map data.

A navigation system for a host vehicle may include at least one processor programmed to: receive, from a camera, one or more images representative of an environment of the host vehicle; identify, based on analysis of the one or more images, an oncoming target vehicle in the environment of the host vehicle, wherein the oncoming target vehicle is associated with a projected trajectory of the oncoming target vehicle, the projected trajectory being indicated by at least one aspect of a representation of the oncoming target vehicle in the one or more images; determine that a planned trajectory for the host vehicle crosses the projected trajectory of the oncoming target vehicle and is indicative of a potential turn-across-path event; determine a remedial action for the host vehicle in response to the oncoming target vehicle and the potential turn-across-path event; implement the remedial action if the oncoming target vehicle is determined to be not approaching a road feature that negates the potential turn-across-path event; and forego the remedial action for the host vehicle in response to the oncoming target vehicle and the potential turn-across-path event if the oncoming target vehicle is determined to be approaching a road feature that negates the potential turn-across-path event.

A method for navigating a host vehicle may include receiving, from a camera, one or more images representative of an environment of the host vehicle; identifying, based on analysis of the one or more images, an oncoming target vehicle in the environment of the host vehicle, wherein the oncoming target vehicle is associated with a projected trajectory of the oncoming target vehicle, the projected trajectory being indicated by at least one aspect of a representation of the oncoming target vehicle in the one or more images; determining that a planned trajectory for the host vehicle crosses the projected trajectory of the oncoming target vehicle and is indicative of a potential turn-across-path event; determining a remedial action for the host vehicle in response to the oncoming target vehicle and the potential turn-across-path event; implementing the remedial action if the oncoming target vehicle is determined to be not approaching a road feature that negates the potential turn-across-path event; and foregoing the remedial action for the host vehicle in response to the oncoming target vehicle and the potential turn-across-path event if the oncoming target vehicle is determined to be approaching a road feature that negates the potential turn-across-path event.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2A is a diagrammatic side view representation of an exemplary vehicle including a system consistent with the disclosed embodiments.

FIGS. 15A and 15B are graphical illustrations of certain aspects of training a system consistent with some disclosed embodiments.

FIG. 27 illustrates a process of clustering vehicle trajectories associated with vehicles, consistent with the disclosed embodiments.

DETAILED DESCRIPTION

Figure 1:
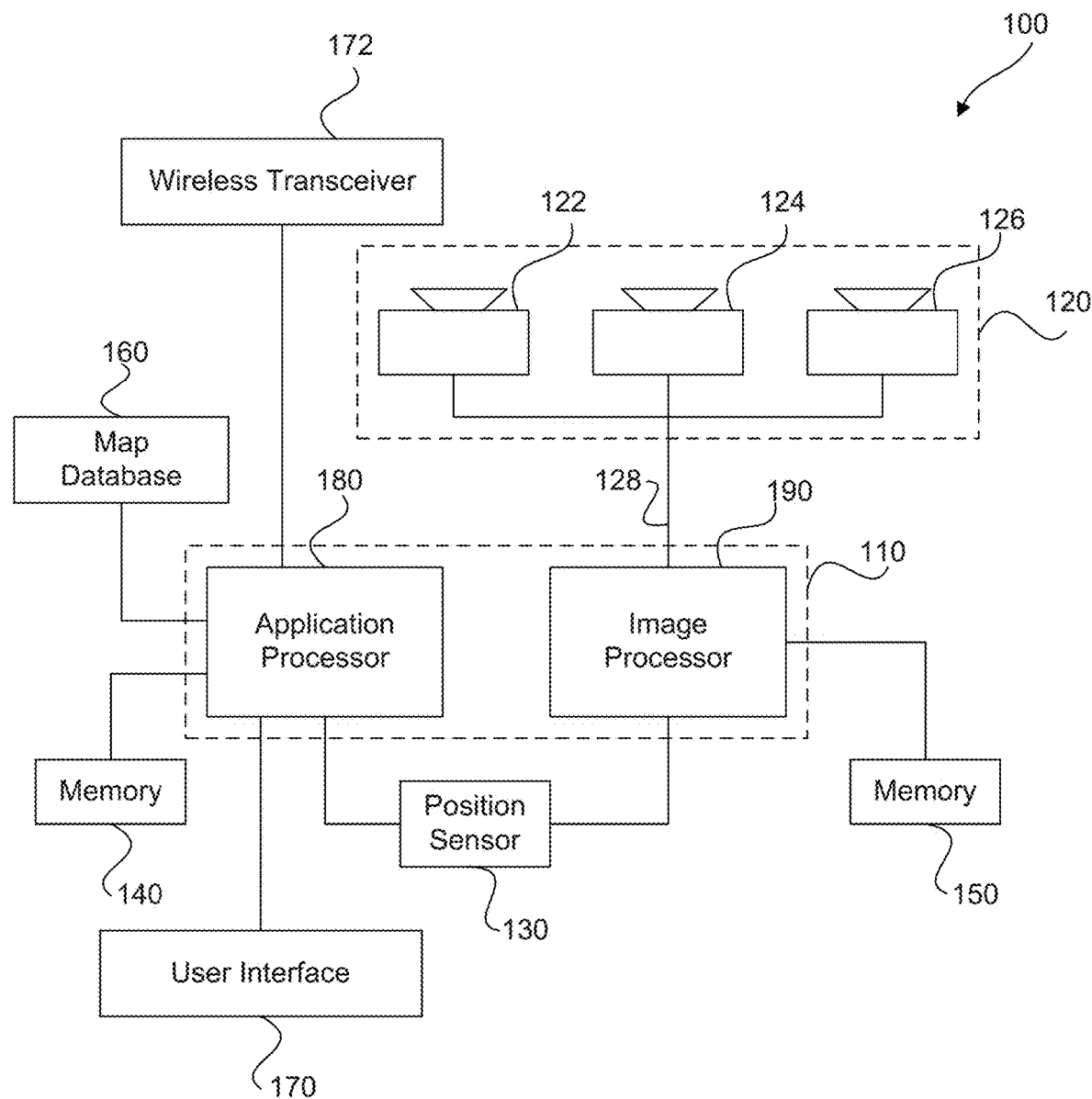
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.).

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer) for measuring a speed of vehicle 200 and/or an accelerometer for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2B:
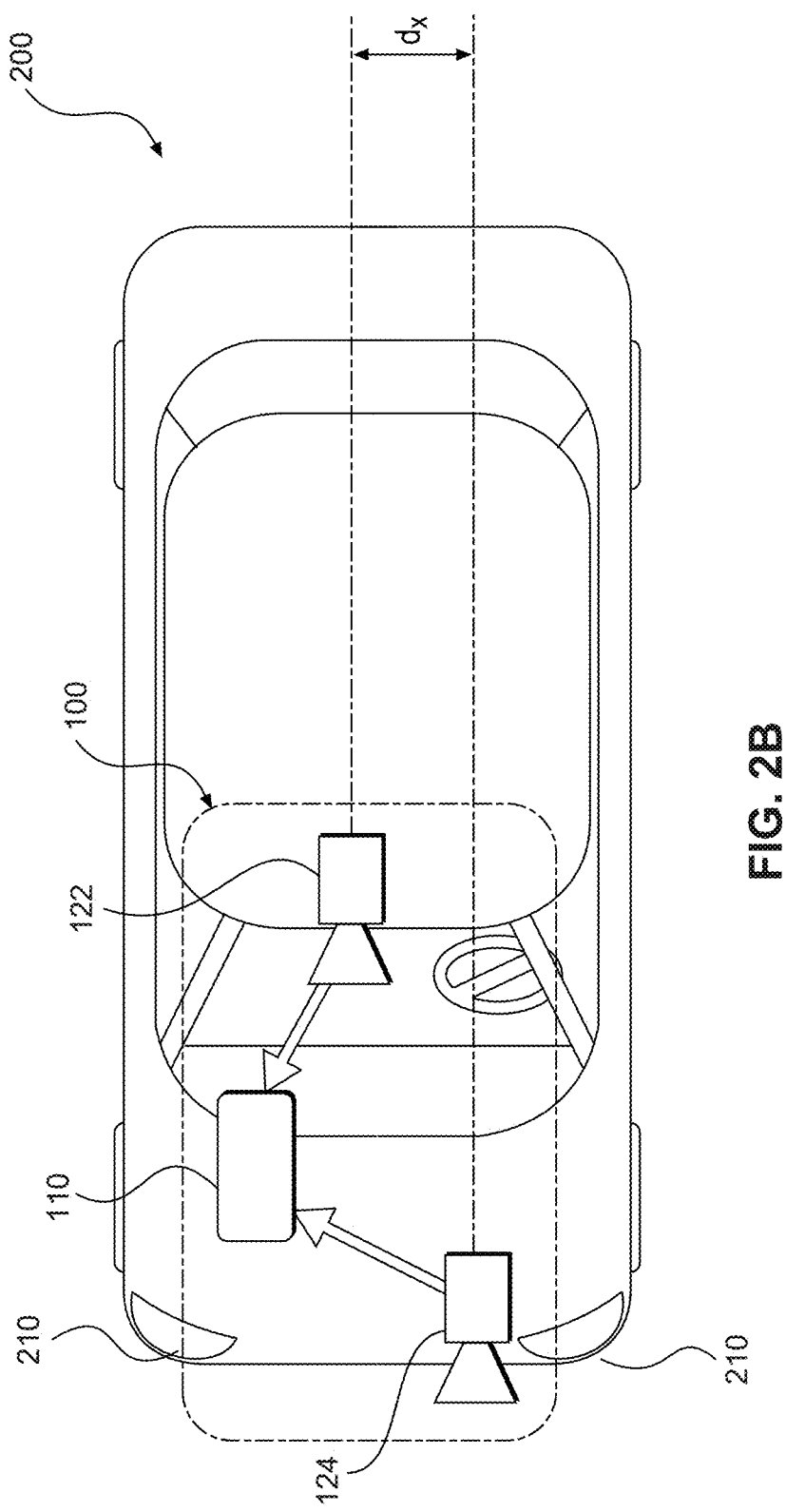
FIG. 2B is a diagrammatic top view representation of the vehicle and system shown in FIG. 2A consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
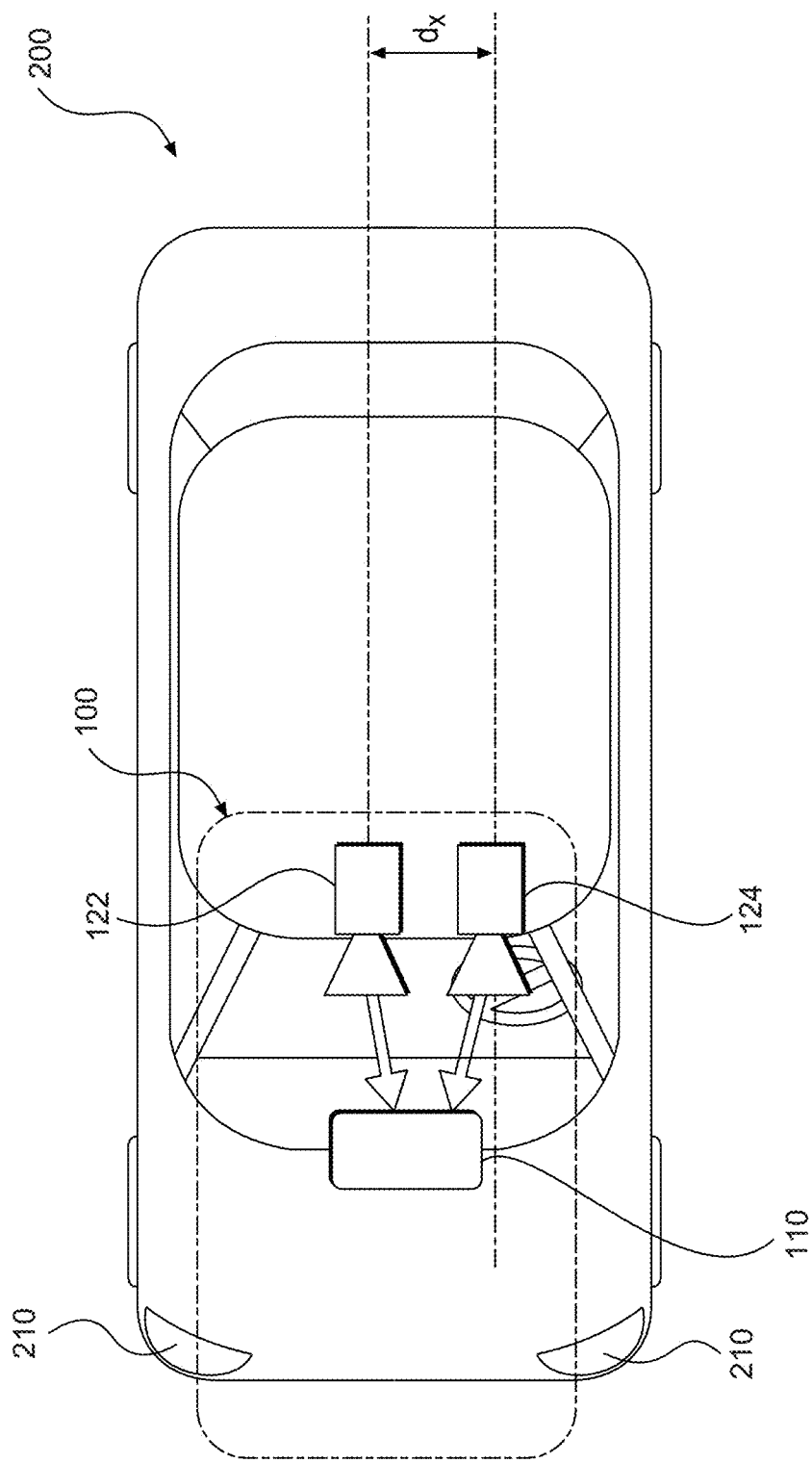
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
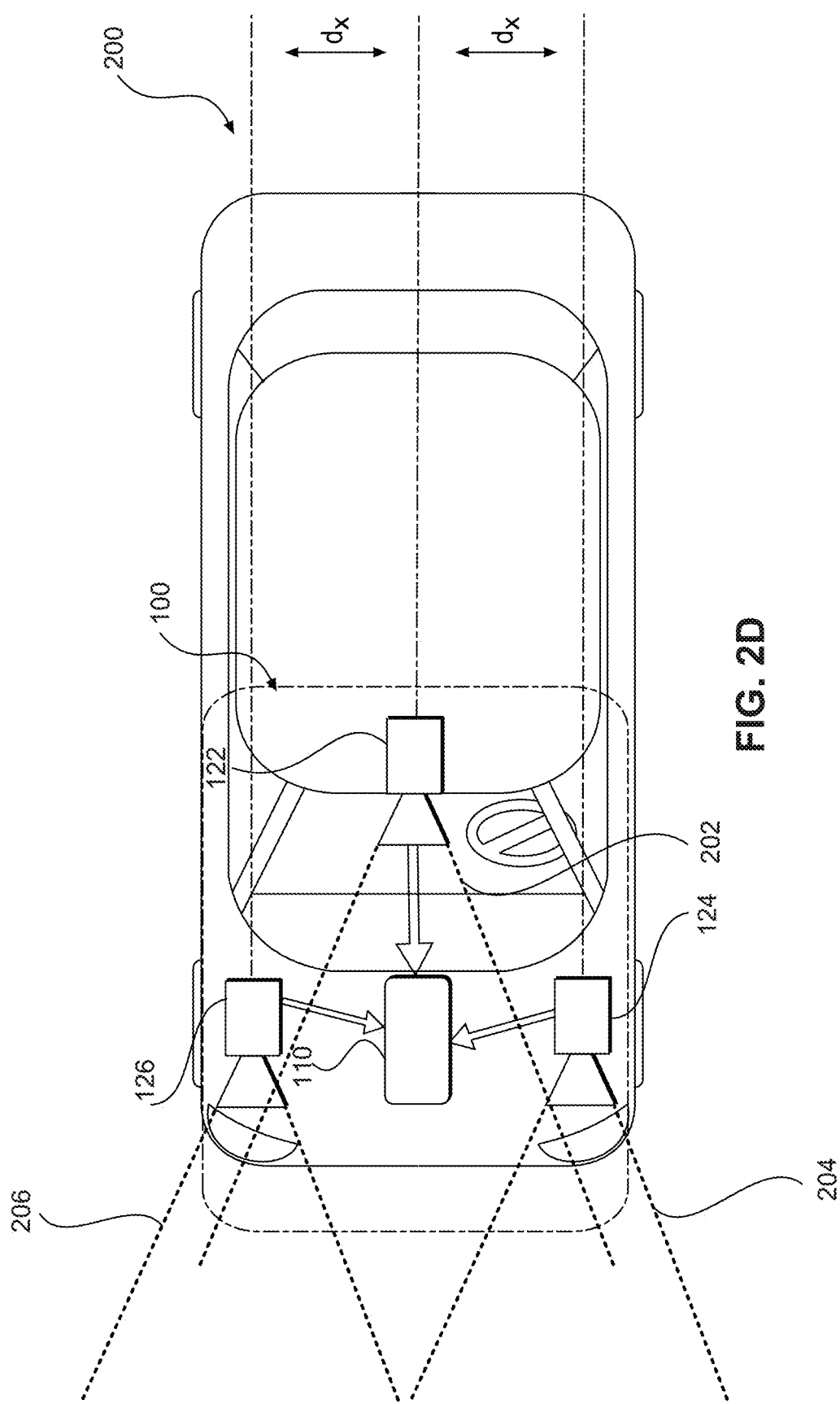
FIG. 2D is a diagrammatic top view representation of yet another embodiment of a vehicle including a system consistent with the disclosed embodiments.
Figure 2E:
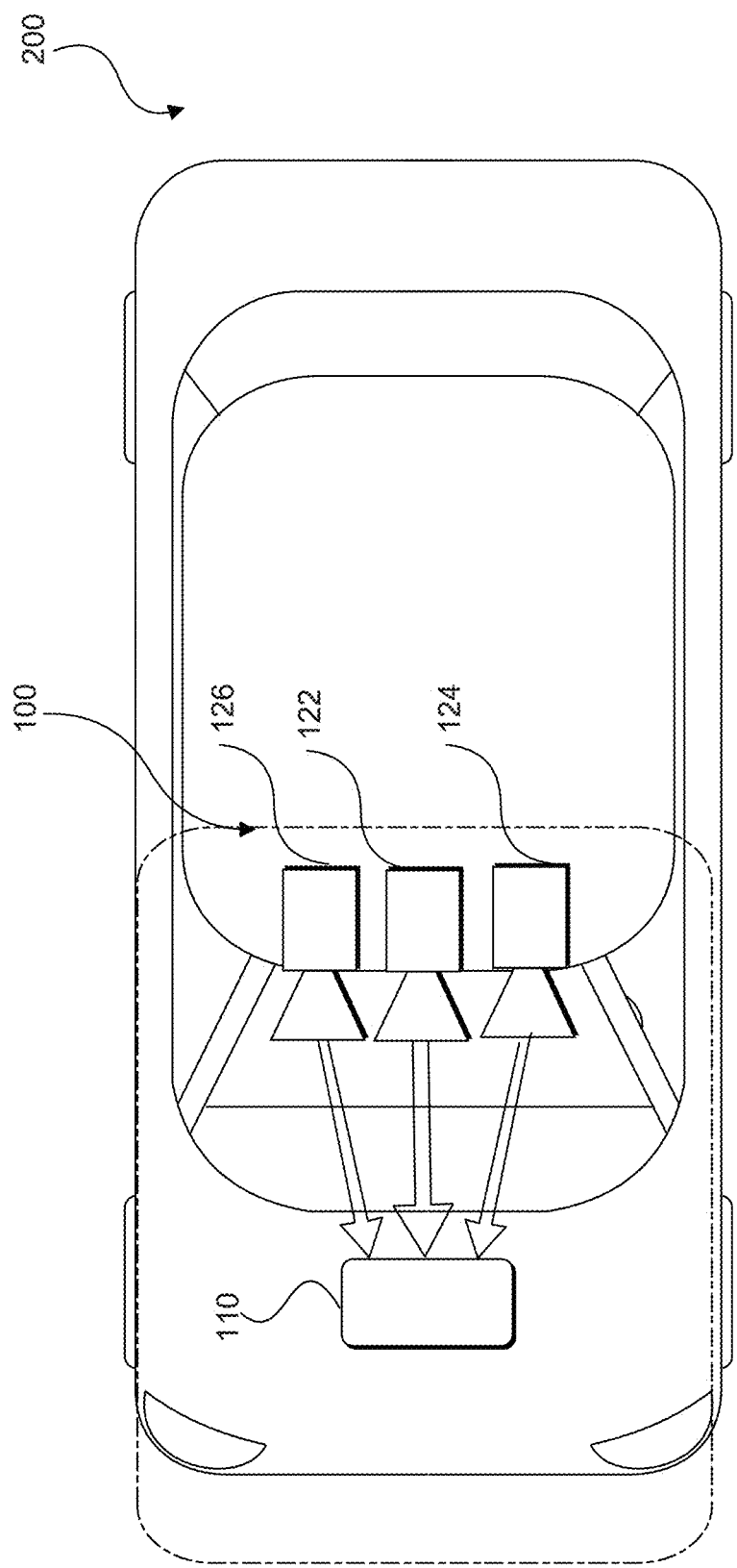
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126)

disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
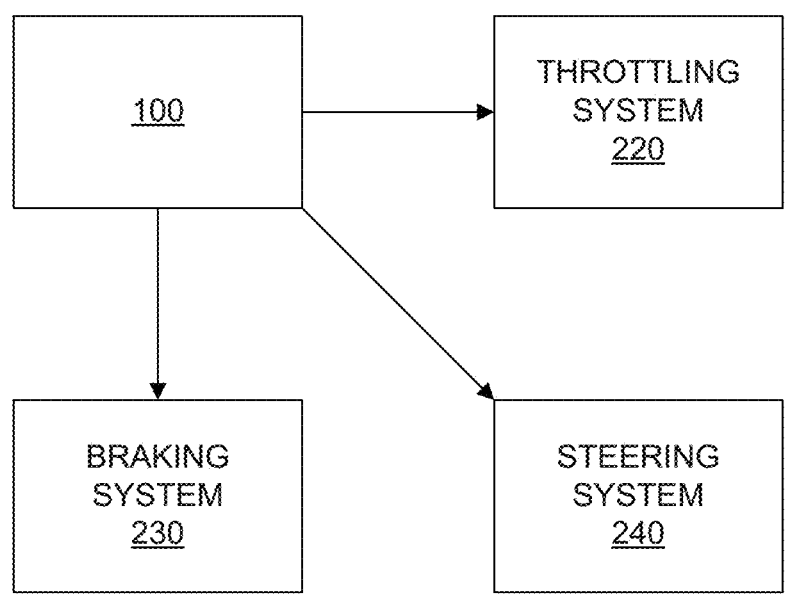
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
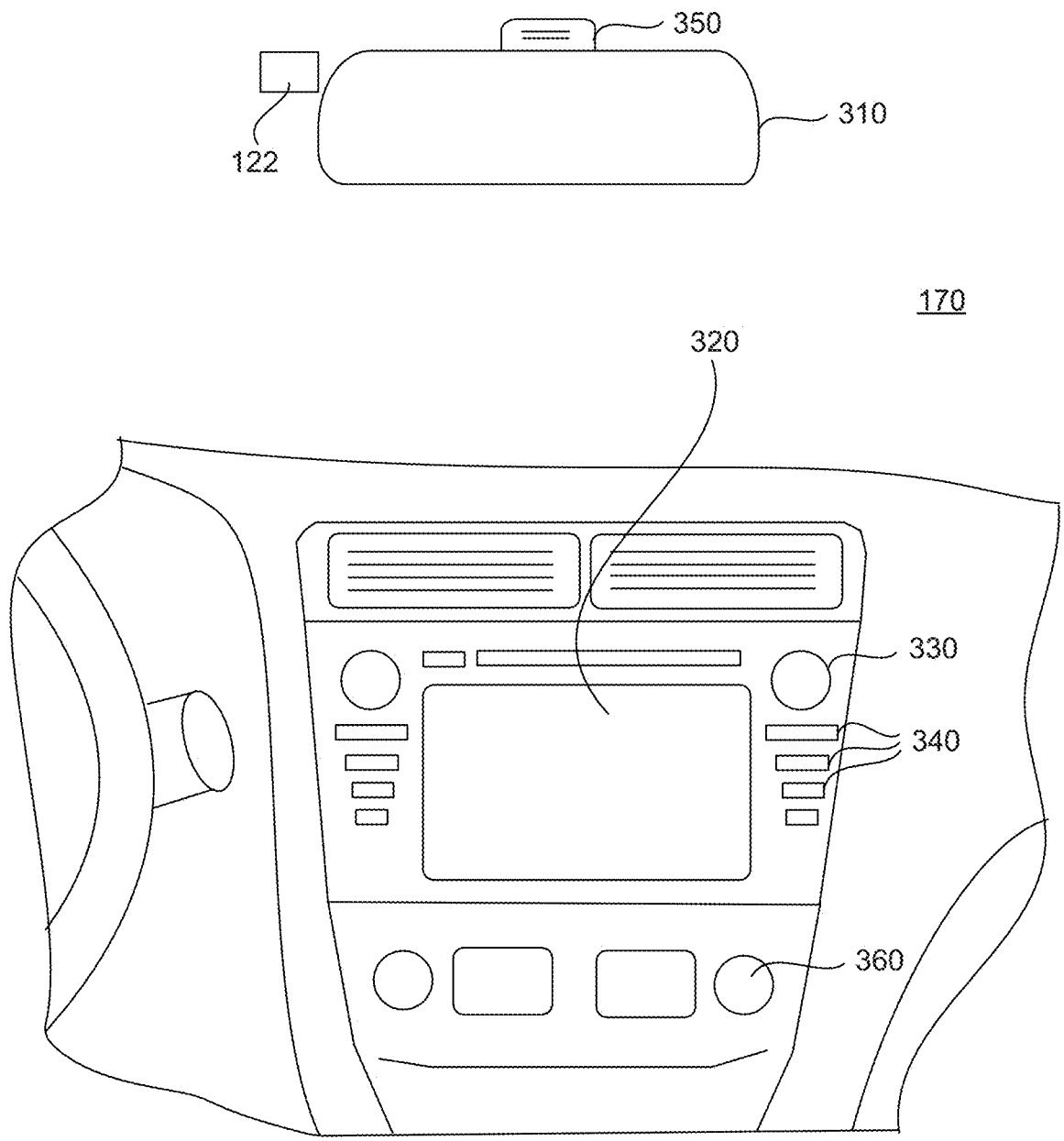
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
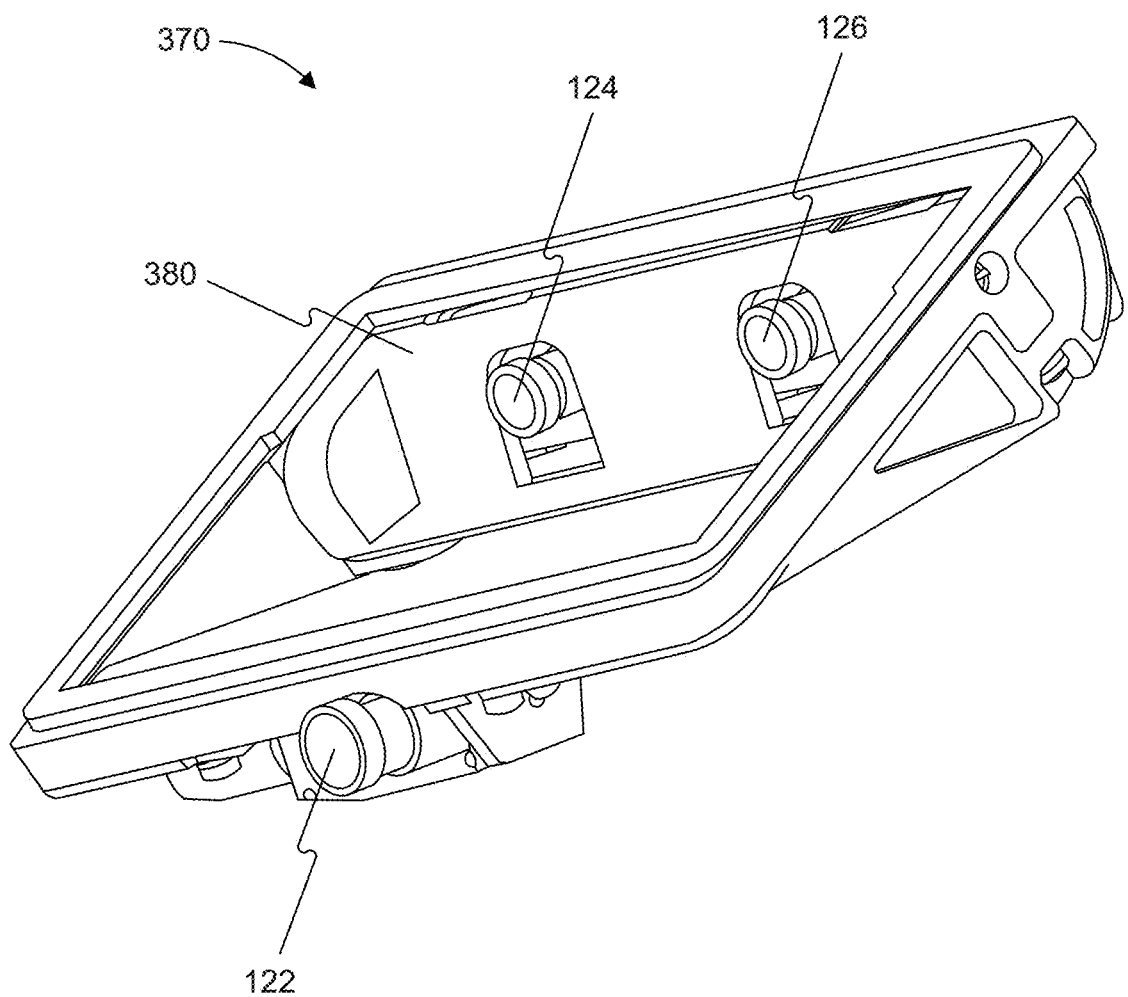
FIG. 3B is an illustration of an example of a camera mount that is configured to be positioned behind a rearview mirror and against a vehicle windshield consistent with the disclosed embodiments.
Figure 3C:
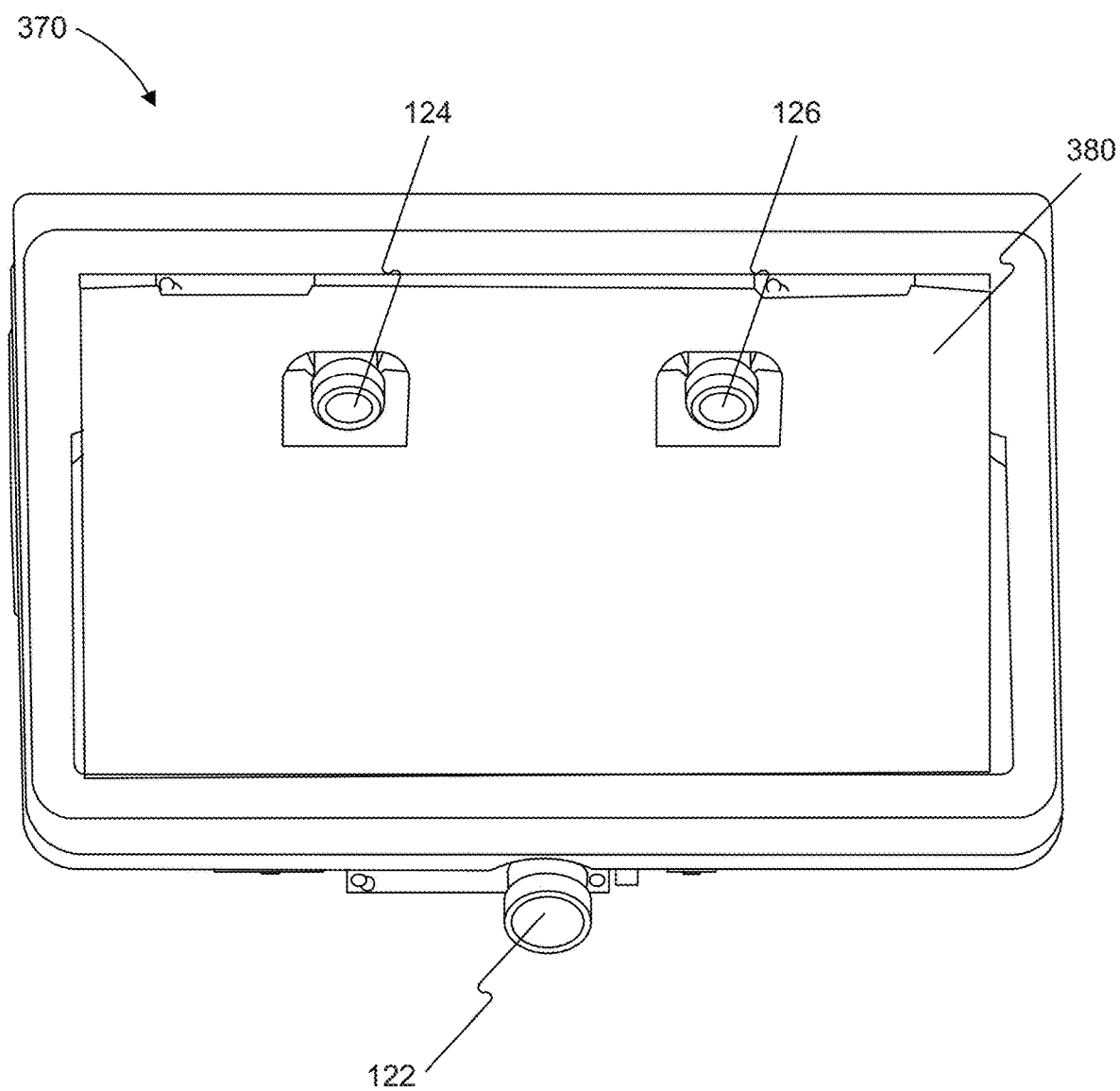
FIG. 3C is an illustration of the camera mount shown in FIG. 3B from a different perspective consistent with the disclosed embodiments.
Figure 3D:
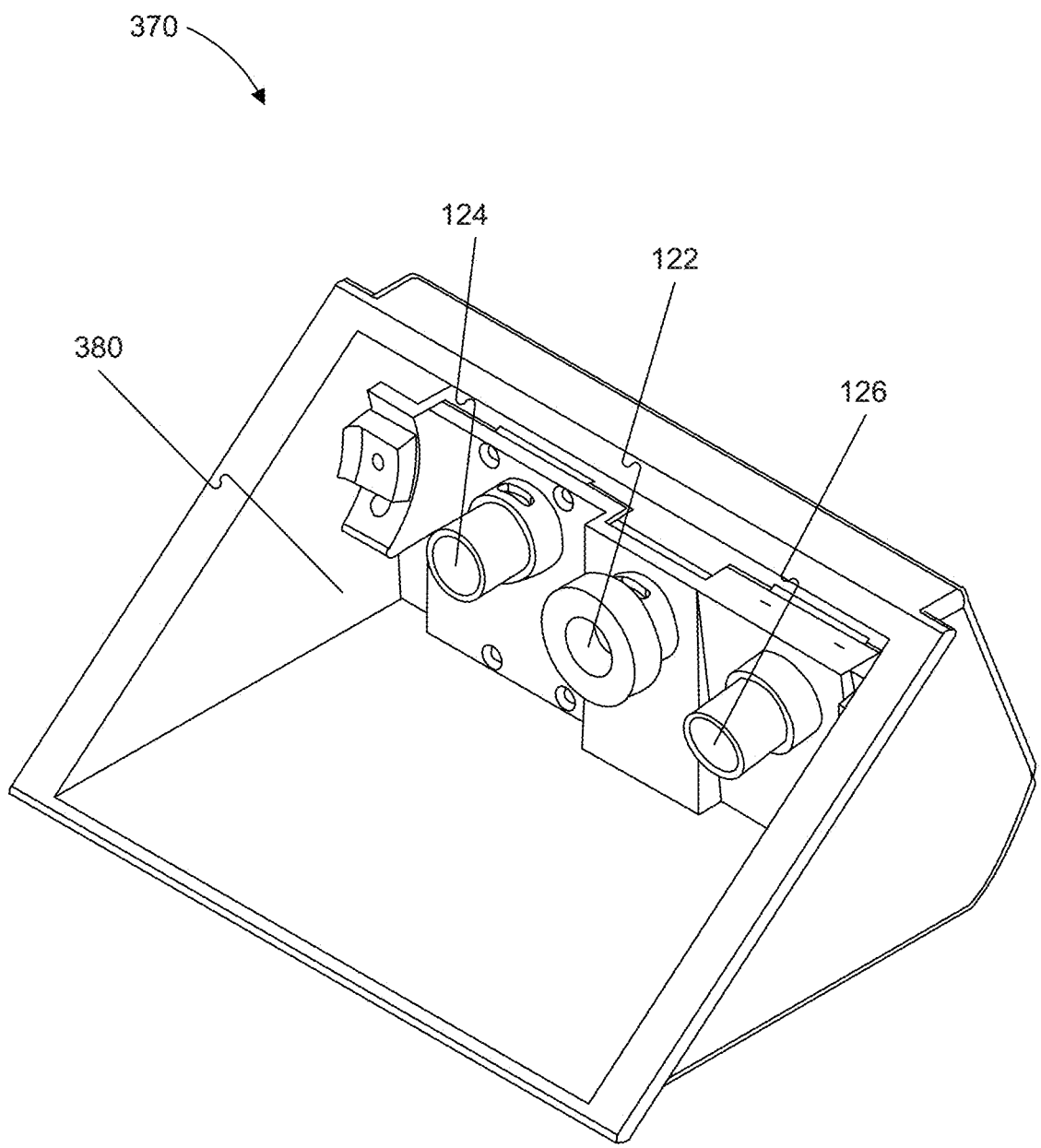
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
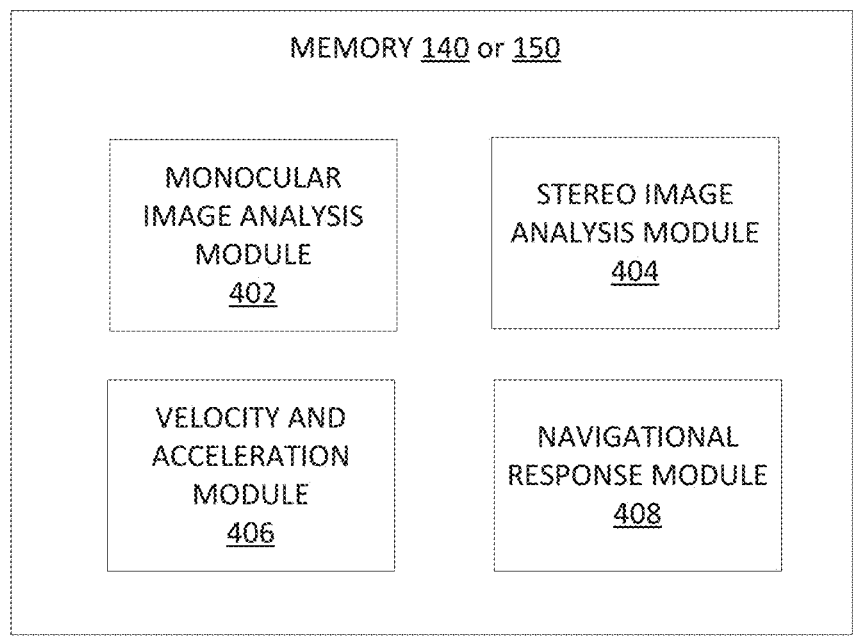
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
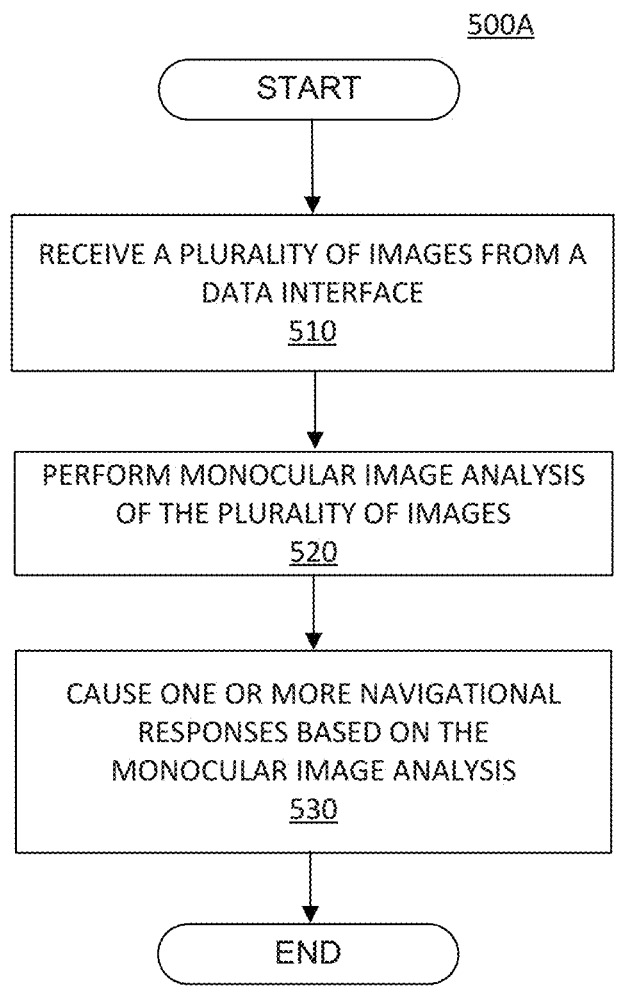
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
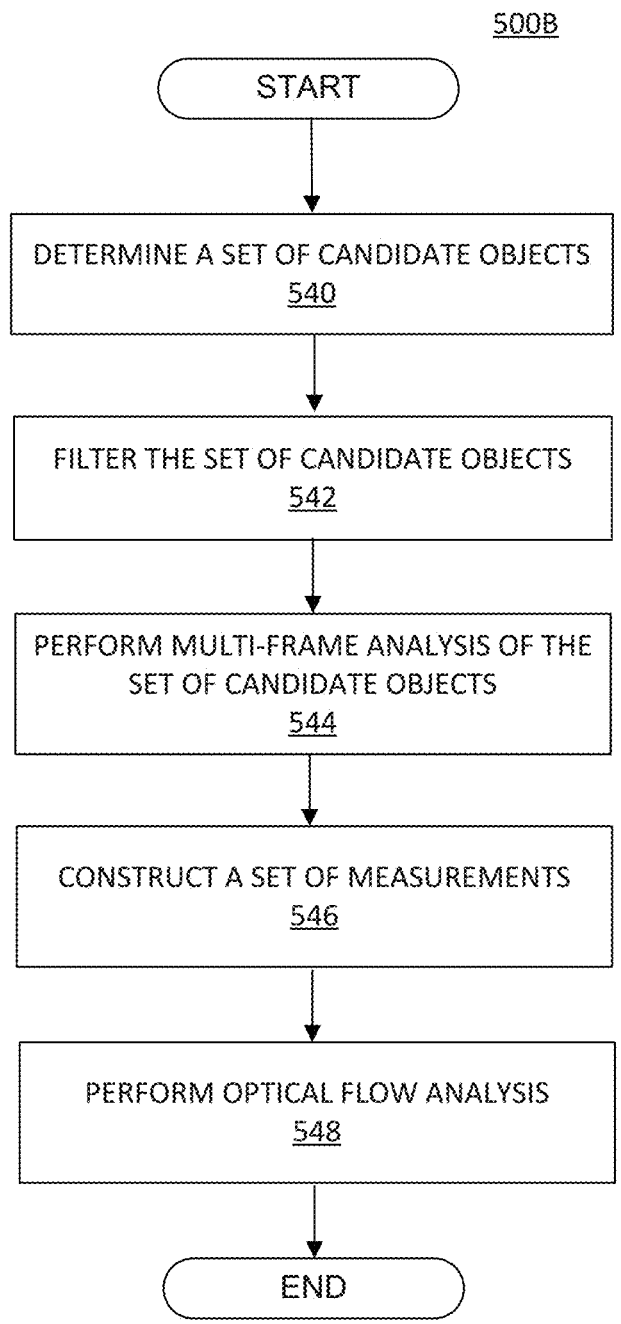
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
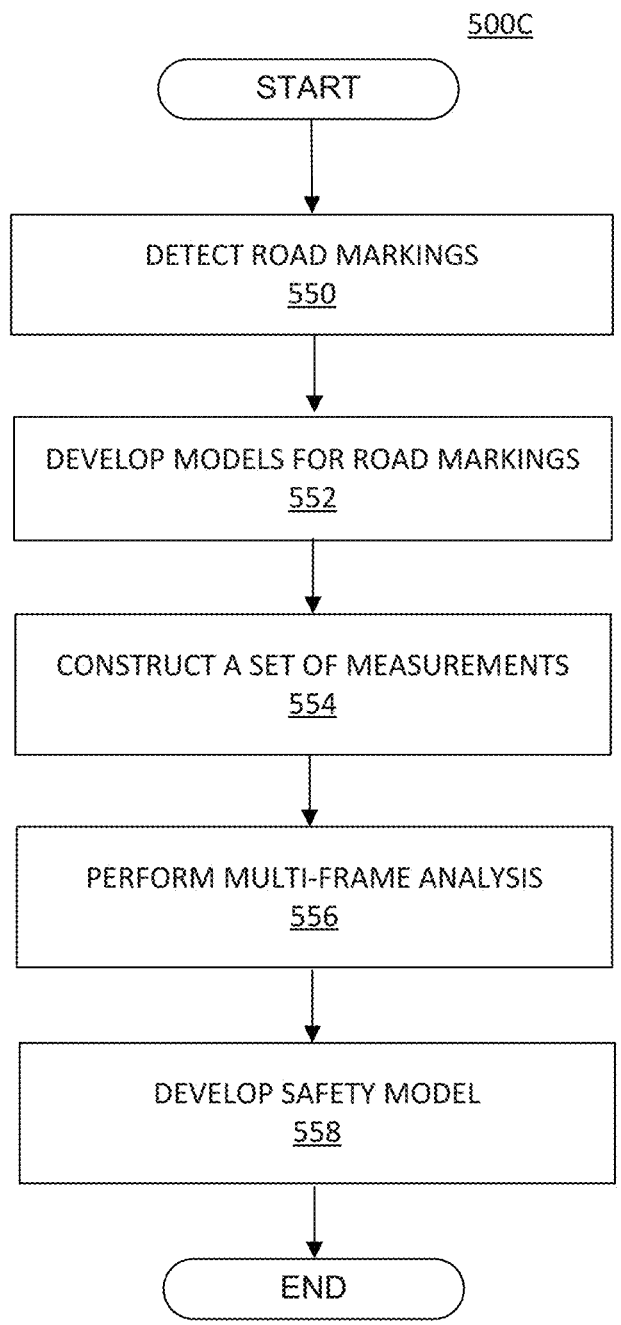
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
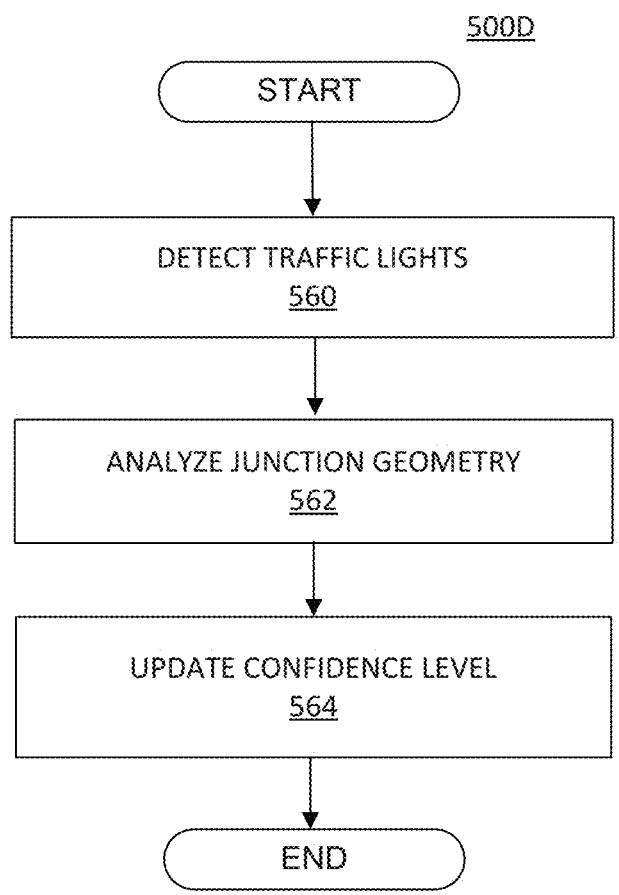
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
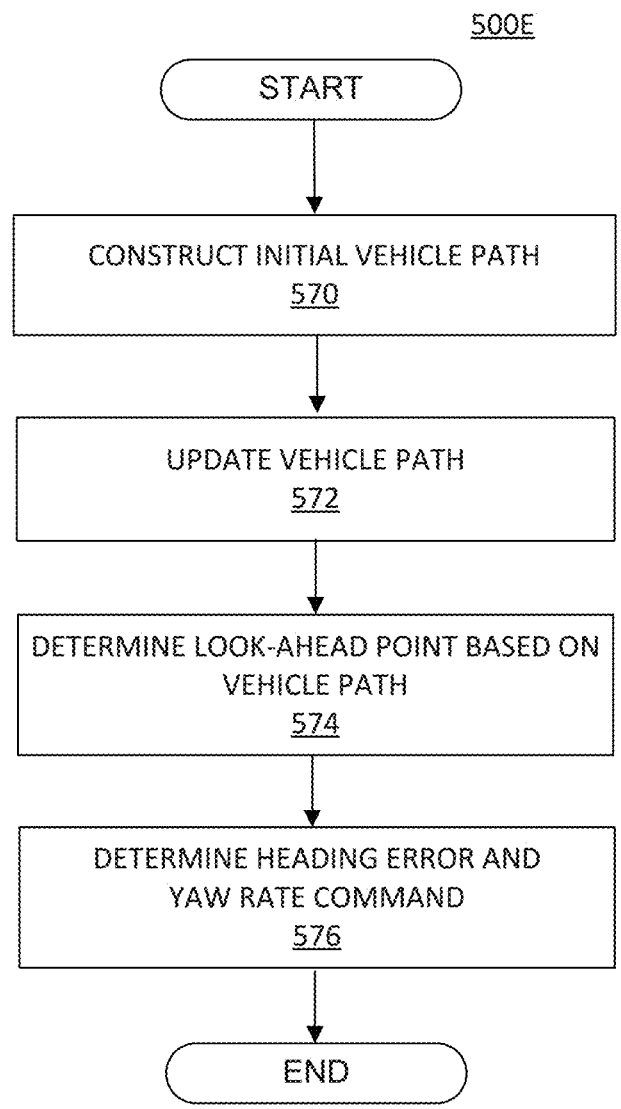
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
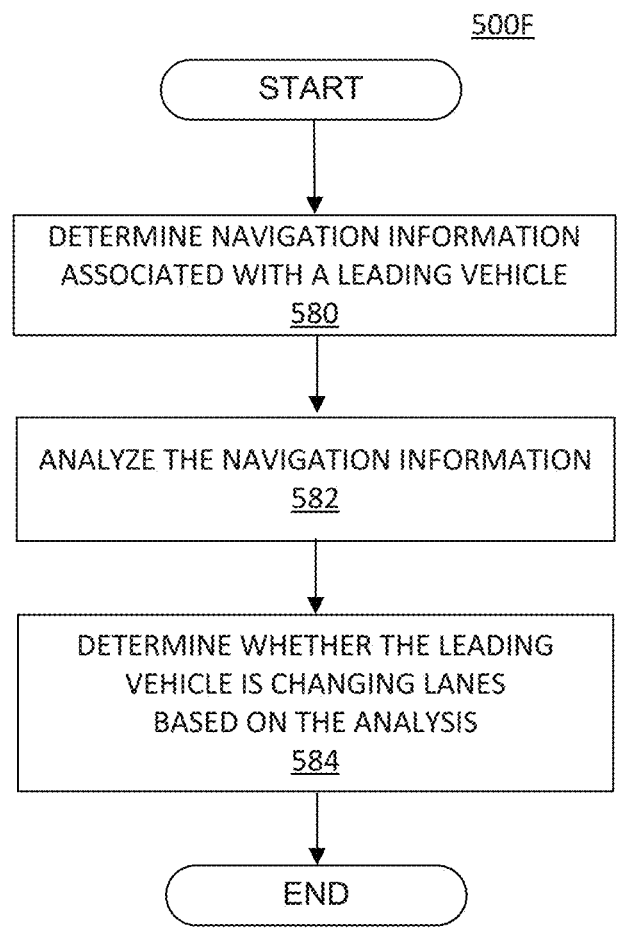
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
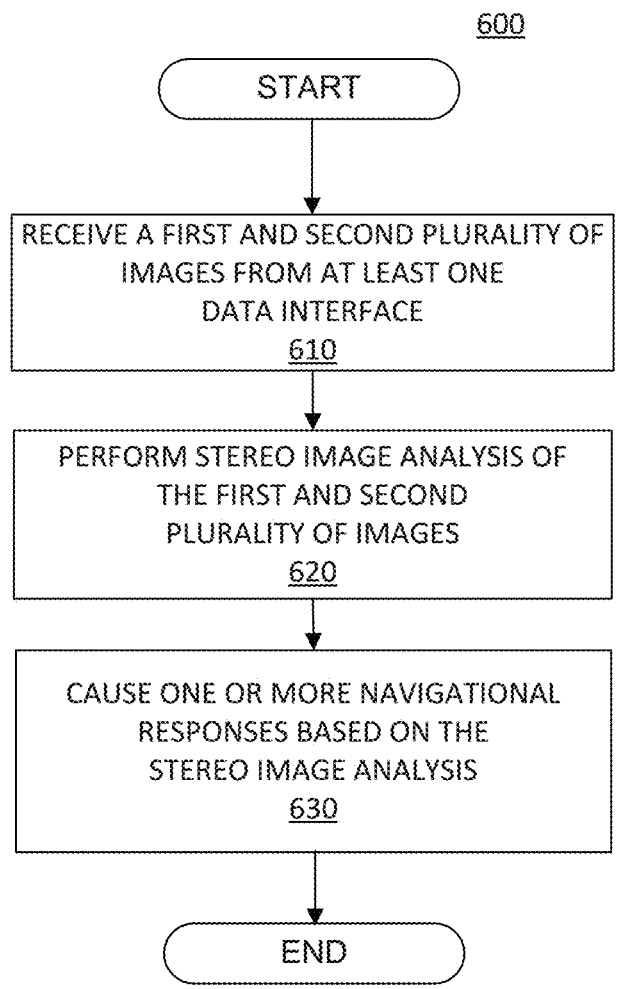
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
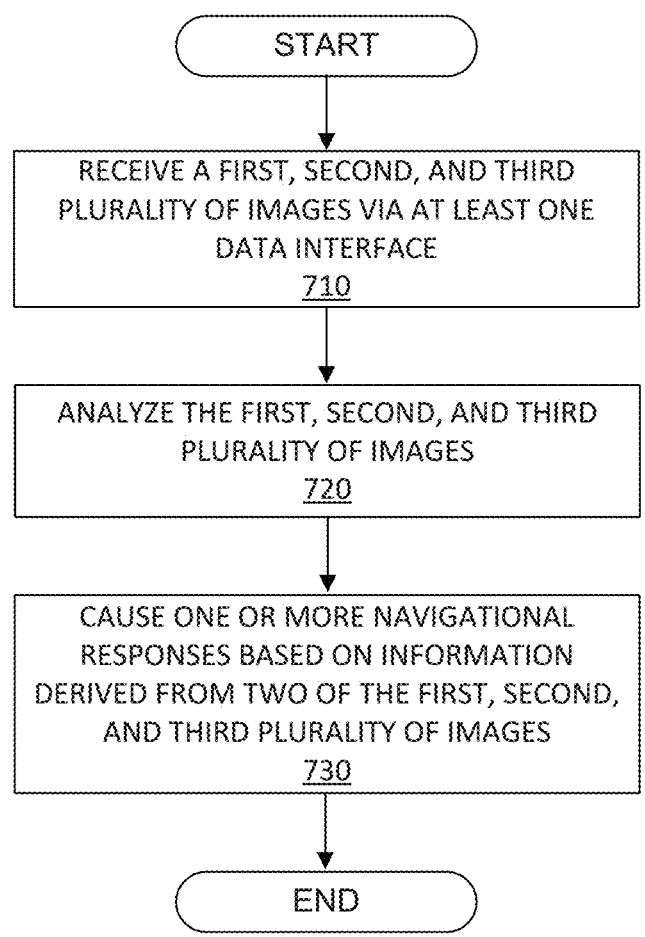
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Estimating Future Paths

Figure 8:
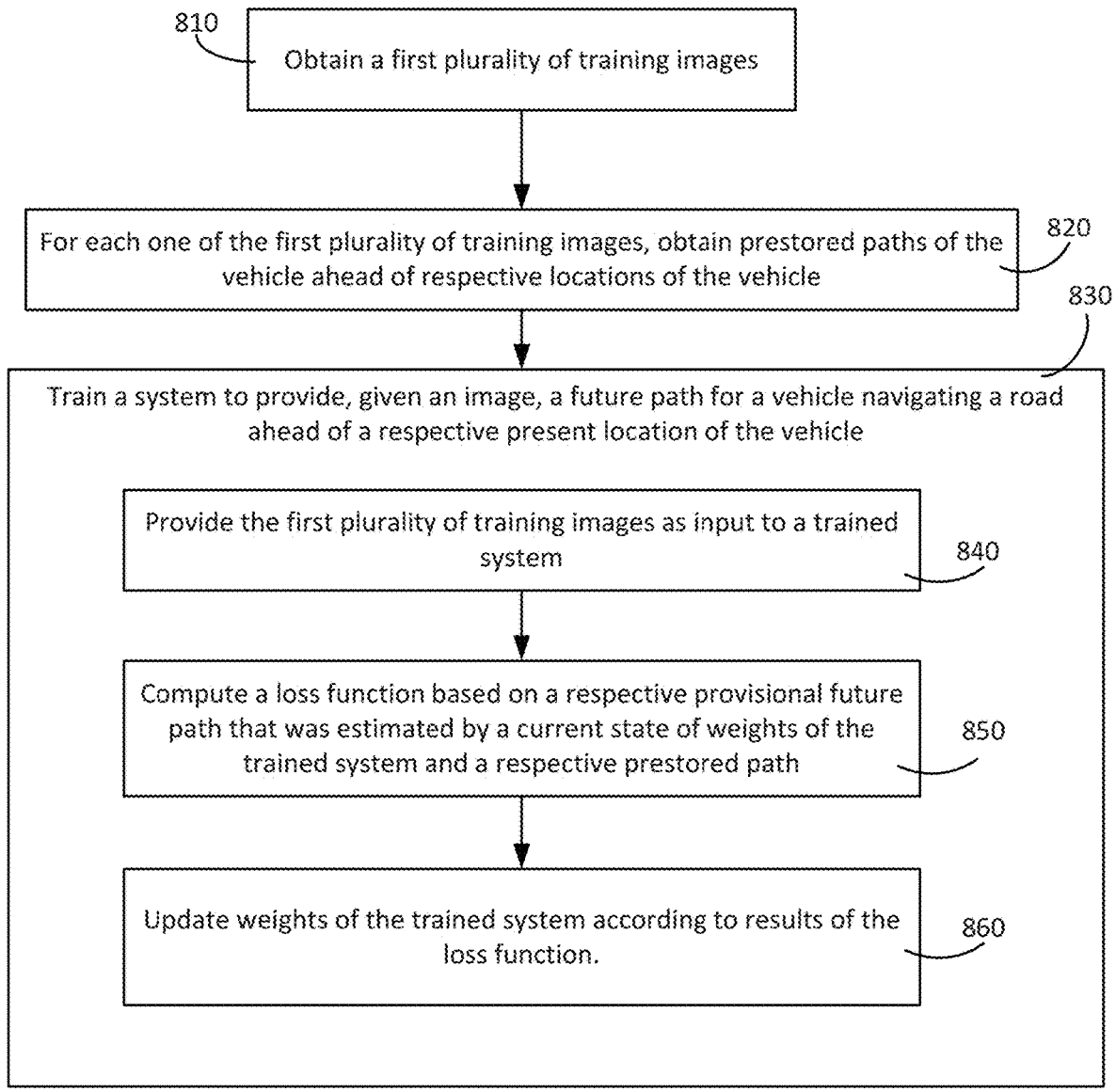
FIG. 8 is a flow chart illustration of a method of processing images to provide a trained system consistent with the disclosed embodiments.

Reference is now made to FIG. 8, which is a flow chart illustration of a method of processing images to provide a trained system which is capable of estimating a future path ahead of a current location of a vehicle based on an image captured at the current location, in accordance with examples of the presently disclosed subject matter. The method of processing images can include: obtaining a first plurality of training images, each one of the first plurality of training images is an image of an environment ahead of a vehicle navigating a road (block 1910). In some embodiments, the first plurality of images are not limited to being images of an environment ahead of a vehicle navigating a road, and can include images of other sides of the vehicle navigating the road, for example of the environment at a side(s) of the vehicle and/or of the environment at a rearward direction.

Figure 9:
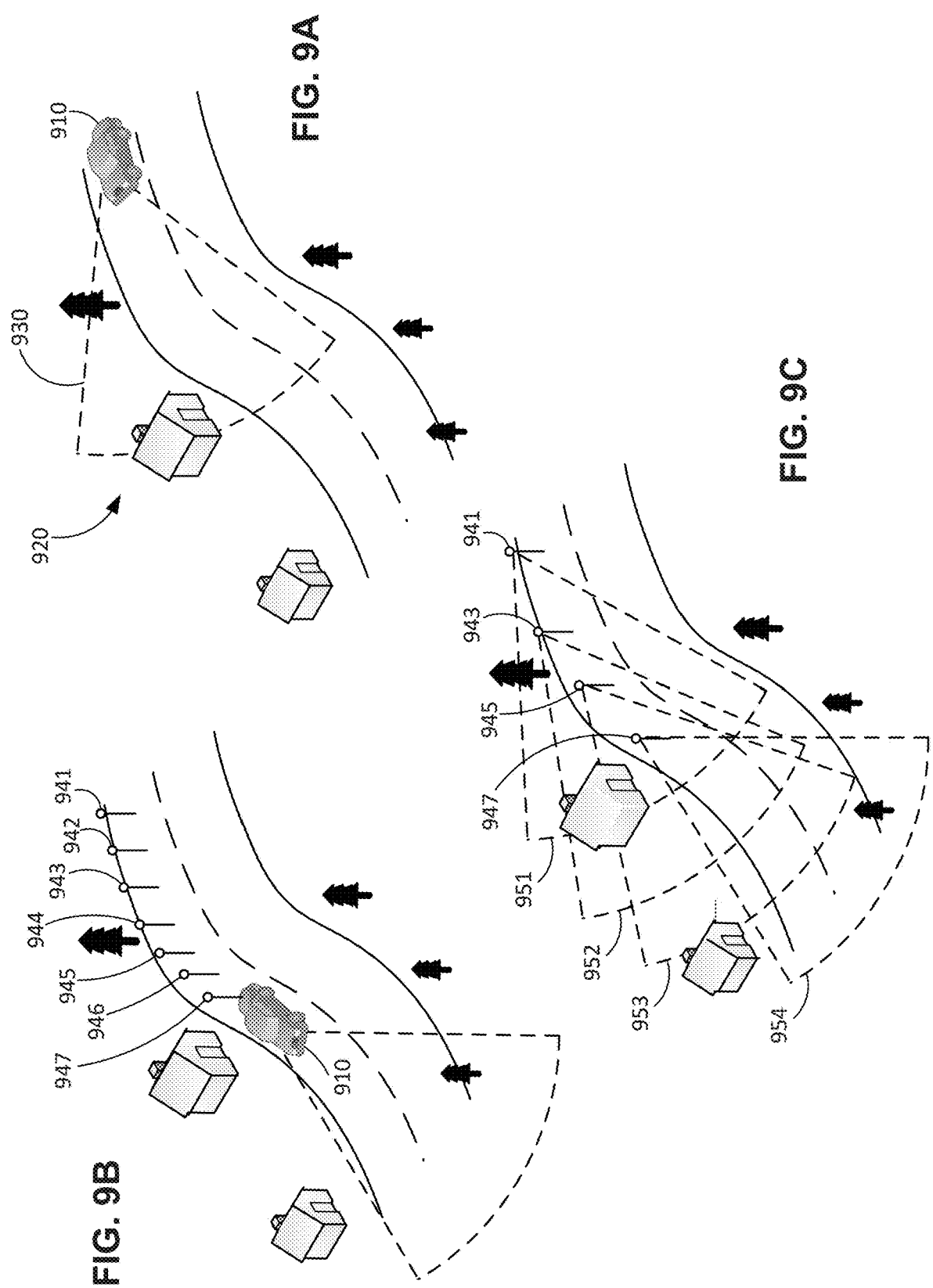
FIGS. 9A-9C are graphical illustrations of features of the method of processing images to provide a trained system consistent with the disclosed embodiments.

For each one of the first plurality of training images, a prestored path of the vehicle ahead of a respective present location of the vehicle can be obtained (block 420). Reference is now additionally made to FIG. 9A-9C, which are graphical illustrations of features of the method of processing images to provide a trained system which is capable of estimating a future path ahead of a current location of a vehicle based on an image captured at the current location, in accordance with examples of the presently disclosed subject matter. As can be seen in FIG. 9A, a vehicle 910 is entering a section of road 920. The vehicle 910 includes a camera (not shown) which captures images. In FIG. 9A, an image is illustrated by cone 930 which represents the FOV of the camera mounted in vehicle 910. The image depicts arbitrary objects in the FOV of the camera. The image typically includes road objects, such as road signs, lane marks, curbs, other vehicles, etc. In addition, at least some of the images that are used in the method of processing images to provide a trained system which is capable of estimating a future path ahead of a current location of a vehicle based on an image captured at the current location, include other arbitrary objects, such as structures and trees at the sides of the road, etc.

In the examples, shown in FIGS. 9A-9C, the images captured by the camera onboard the vehicle 910 are images of an environment ahead of the vehicle 910 navigating the road 920.

As can be seen in FIGS. 9B and 9C, the vehicle 910 travels along (a segment of) road 920, and its path is recorded. The path of vehicle 910 is marked with locations 941-947. The path of the vehicle 910 along the road 920, from location 941 to location 947, is recorded. Thus, the future path of the vehicle from point 941, down road 920, is available. It would be appreciated that the specific location of vehicle 910 and the 2D or 3D shape of the road is arbitrary, and that examples of the presently disclosed subject matter are applicable to various locations on any road. As is shown in FIG. 9C, as the vehicle 910 travels along the road 920, the camera captures a plurality of images, represented by cones 951-954. One or more images can be captured for each of the locations 941-947 or only for some of the recorded locations, however for convenience, in FIG. 9C images are illustrated only for a subset of the recorded locations of vehicle 910 along the road 920.

Resuming the description of FIG. 8, a system (e.g., a neural network, deep learning system, etc.) can be trained to provide, given an image, a future path for a vehicle navigating a road ahead of a respective present location of the vehicle (block 830). Training the system (block 830) can include: providing the first plurality of training images as input to a trained system (block 840); at each iteration of the training, computing a loss function based on a respective provisional future path that was estimated by a current state of weights of the trained system and a respective prestored path (block 850); and updating the weights of the trained system according to results of the loss function (block 860).

Typically, a very large number of images are provided to the trained system during the training phase, and for each image a prestored path of the vehicle ahead of a respective present location of the vehicle is provided. The prestored path can be obtained by recording the future locations of the vehicle along the road on which the vehicle was traveling while the image was captured. In another example, the prestored path can be generated manually or using image processing by identifying, visually or algorithmically, various objects in the road or in a vicinity of the road, which indicate a location of the vehicle on the road. The location of the vehicle on the road can be the actual location of the vehicle on the road during the session when the image was captured, or it can be an estimated or artificially generated location. For example, in one example, images can be taken every few meters or even tens of meters, the future path of the vehicle can be outlined by technicians based on lane markings or based on any other objects which the technician visually identifies in each image. In the lane markings example, the technicians may outline the future path for an image where the lane markings appear, at a certain (say predefined) offset from the lane markings, say in the middle of the lane that is distinguished by lane markings on either side thereof.

Figure 13:
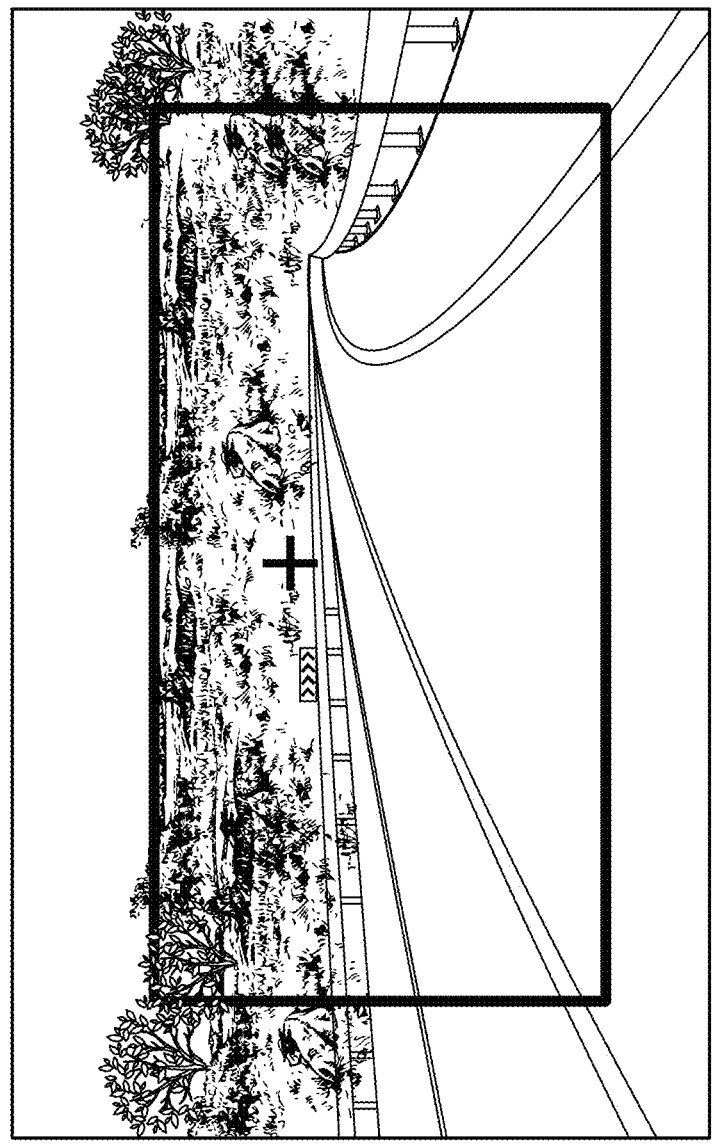
FIG. 13 illustrates an image that is provided to a system during a training phase consistent with some disclosed embodiments.
Figure 14:
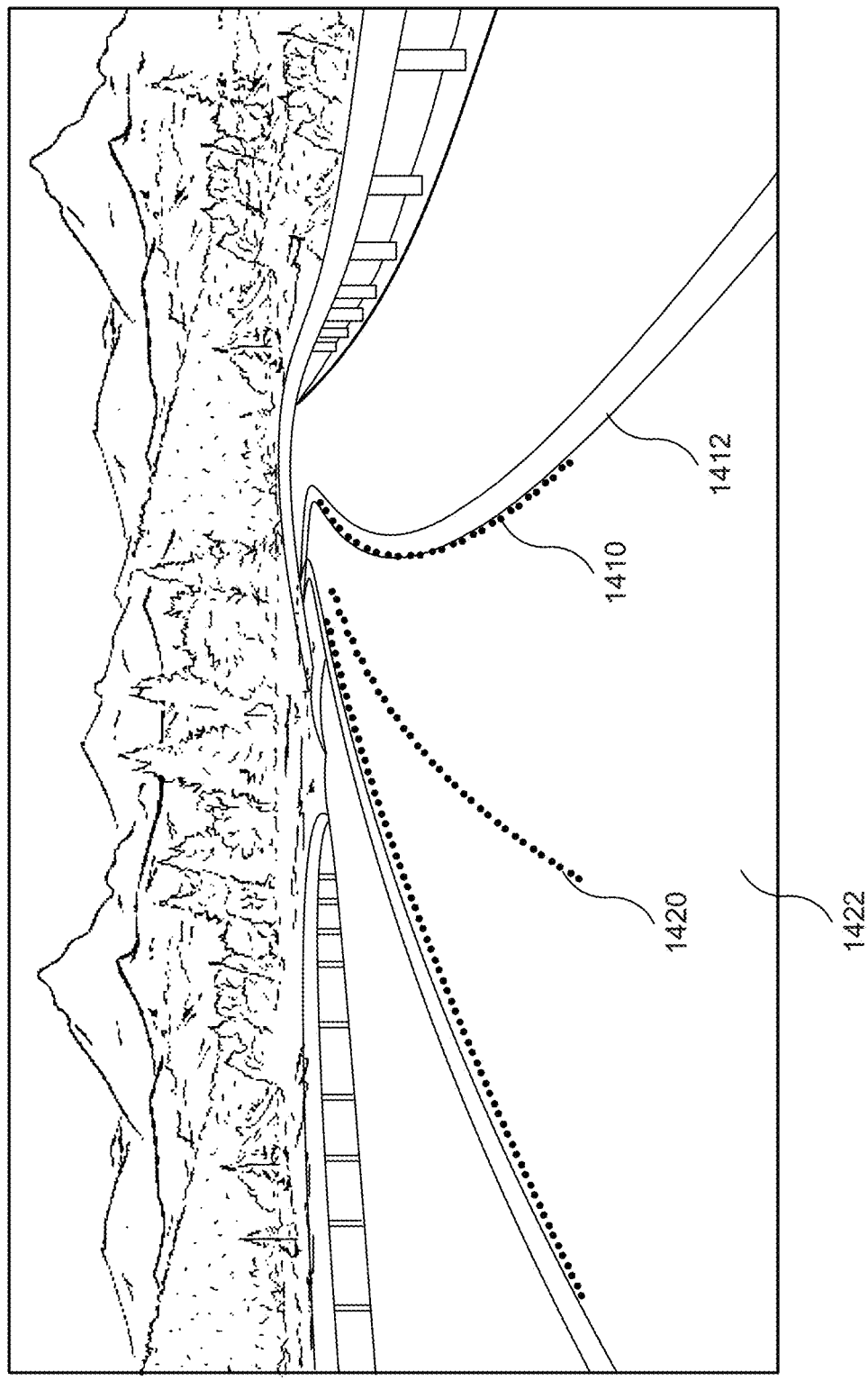
FIG. 14 illustrates an image that is provided to a system during a training phase consistent with some disclosed embodiments.
Figure 16A:
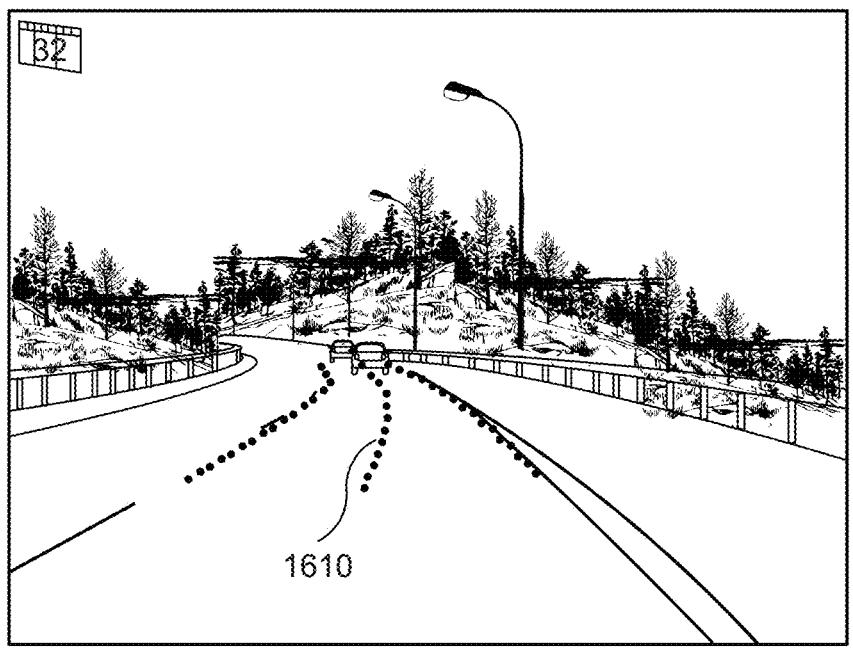
FIGS. 16A and 16B illustrate images including estimated future paths consistent with the disclosed embodiments.
Figure 16B:
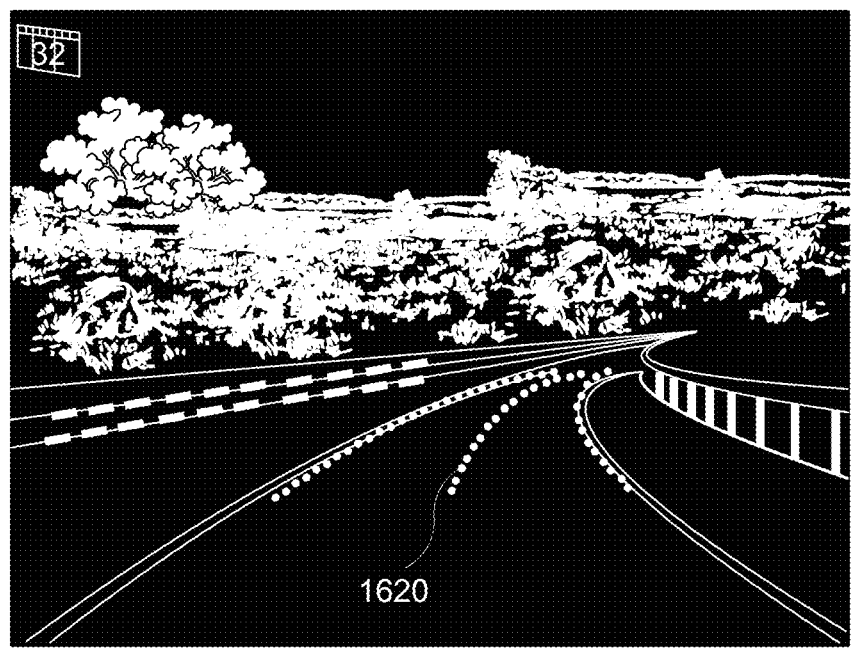
Figure 17A:
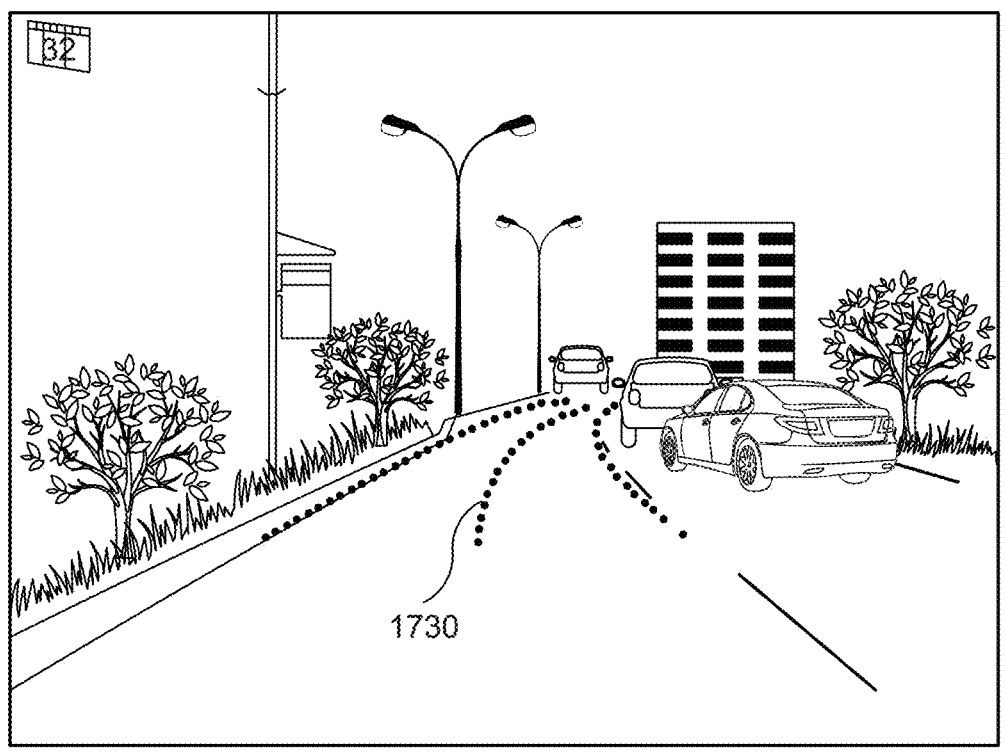
FIGS. 17A and 17B illustrate additional images including estimated future paths consistent with the disclosed embodiments.
Figure 17B:
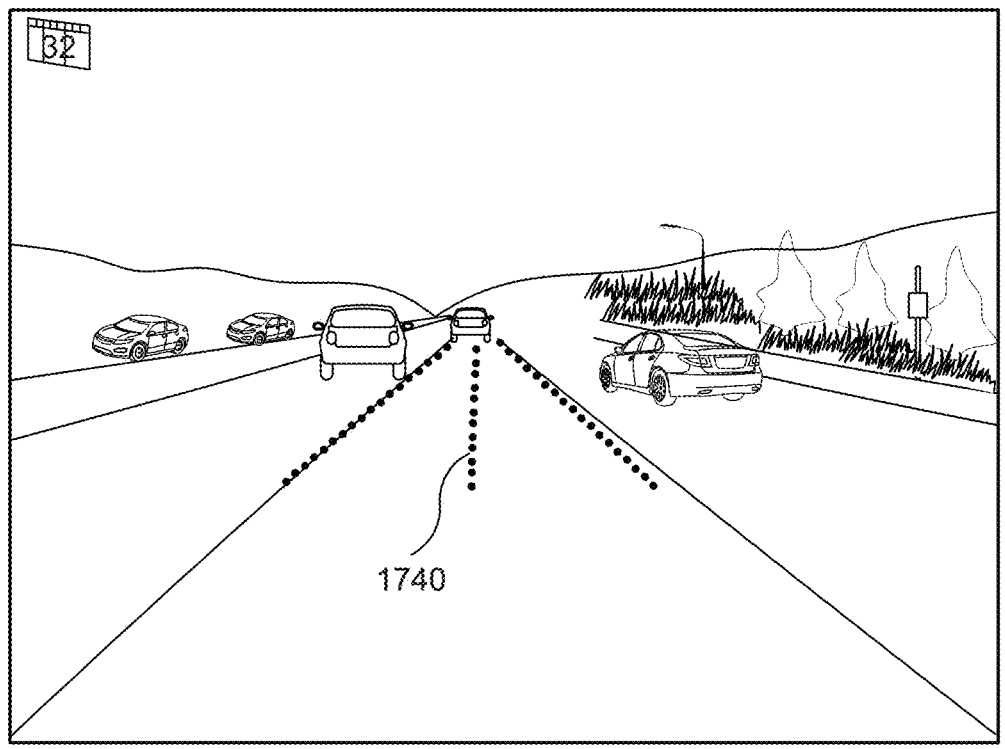

FIGS. 13 and 14 illustrate images that may be provided to a machine learning process, e.g., using a trained system (e.g., a neural network, deep learning system, etc.), during a training phase consistent with some disclosed embodiments. FIG. 14 additionally illustrates points 1410 on lane markings 1412 and points 1420 on the center of the lane, detected by image processing or by technicians.

Figure 12A:
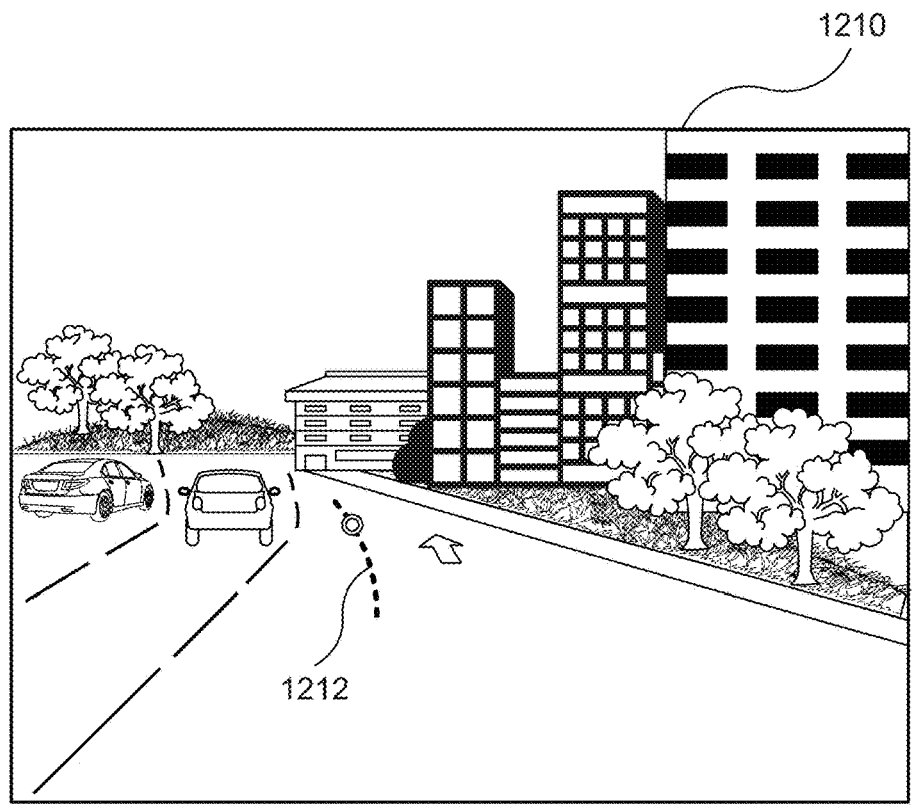
FIG. 12A illustrates an image of an environment ahead of a vehicle navigating a road consistent with some disclosed embodiments.
Figure 12B:
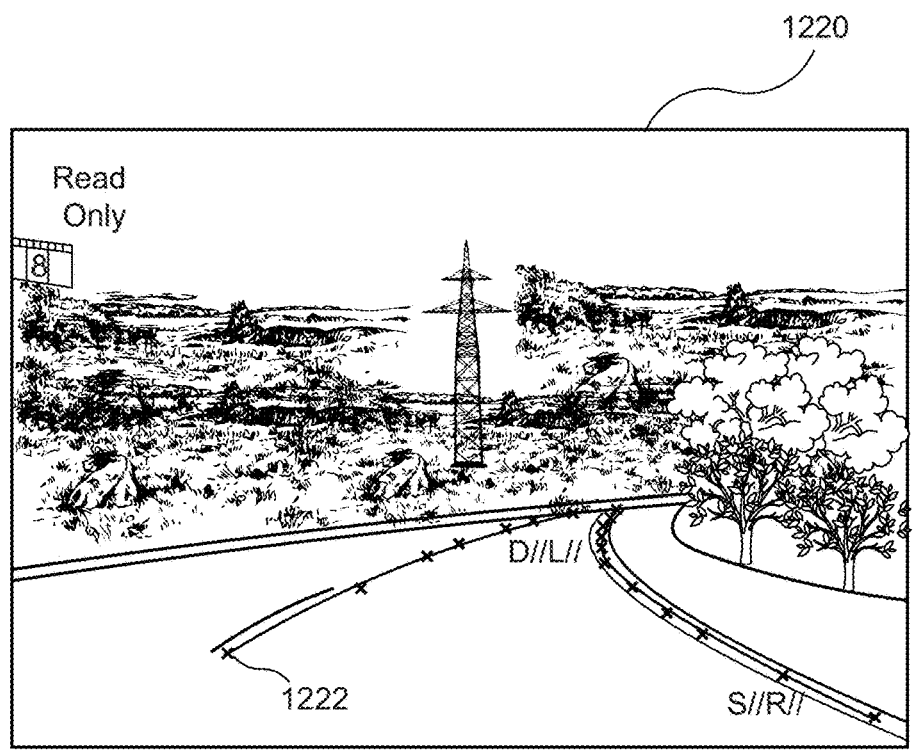
FIG. 12B illustrates an image of an environment ahead of a vehicle navigating a road consistent with some disclosed embodiments.

Reference is now additionally made to FIG. 12A which shows an image 1210 of an environment ahead of a vehicle navigating a road and a prestored path 1212 that was recorded for this image using the vehicle's ego-motion, according to examples of the presently disclosed subject matter; and to FIG. 12B which shows an image 1220 of an environment ahead of a vehicle navigating a road, the image includes marked lane markings 1222 that were marked by a technician or by a computer-vision algorithm, according to examples of the presently disclosed subject matter. The prestored path that is based on the marked lane markings can be generated and prestored for the image shown in FIG. 12B. The ego-motion track of the vehicle for a given image, which can be used to define the path of the vehicle ahead of the current location of the vehicle (the location for where the image was captured) can be determined by processing subsequent image, for example, the subsequent images are images that were captured as the car continued to move ahead the road (e.g., forward of the current location).

Figure 18:
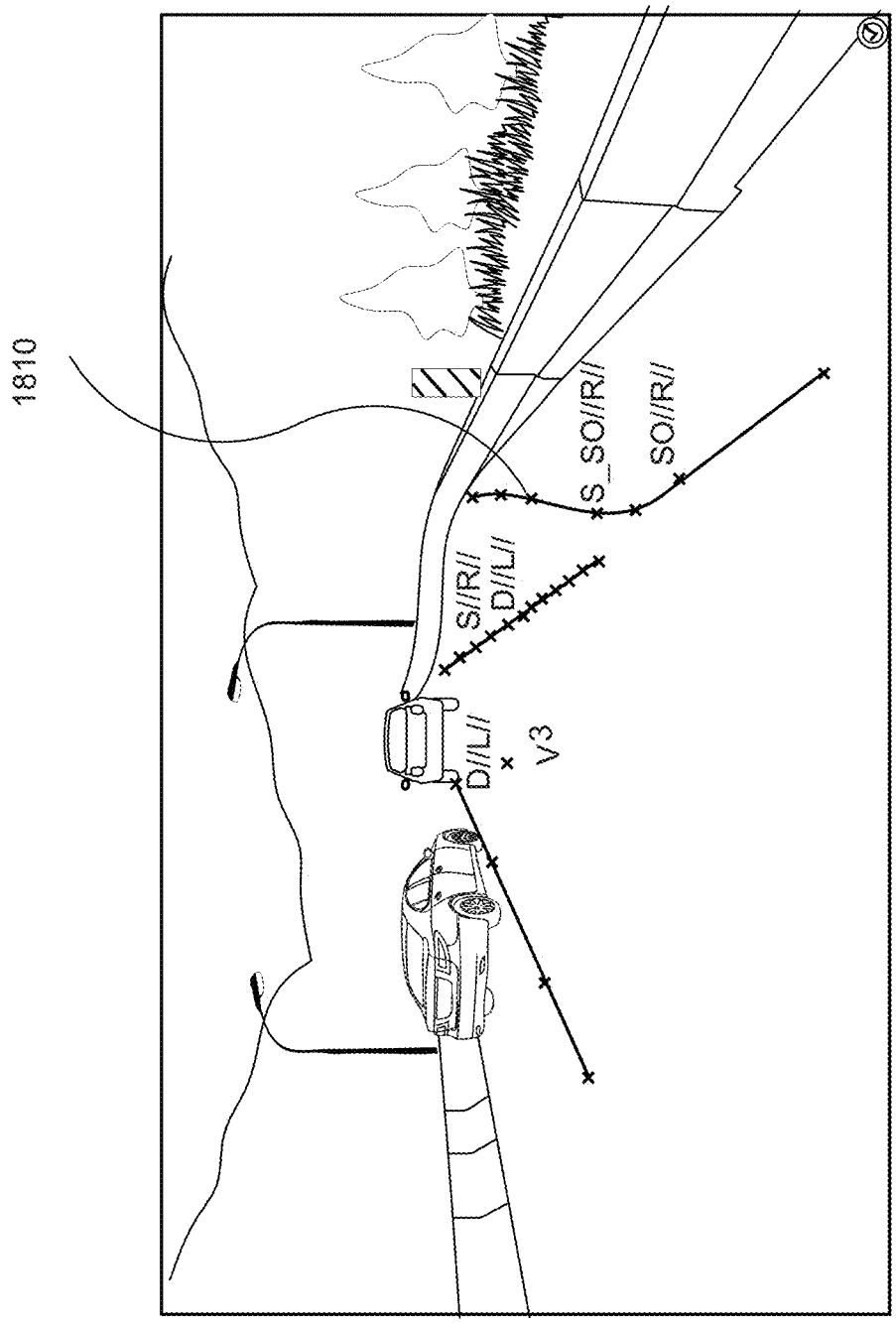
FIG. 18 illustrates an input image with virtual lane marks added to mark a highway exist, consistent with the disclosed embodiments.

As mentioned above, at each iteration of the training, a loss function is computed based on a respective provisional future path that was estimated by a current state of weights and a respective prestored path (block 850). The weights of the trained system can be updated according to results of the loss function (block 860). Reference is now made to FIGS. 15A and 15B, which provide graphical illustrations of certain aspects of the training, according to examples of the presently disclosed subject matter. In FIG. 15A an iteration of the training is shown. In FIG. 15A, a prestored path 1512 was generated based on detection (e.g., by technicians) of lane marks on the road ahead of the location from where an image 1510 was captured. A provisional future path 1514 is computed by the trained system, and a loss function is computed based on a respective provisional future path 1514 that was estimated by a current state of weights and a respective prestored path 1512. According to examples of the presently disclosed subject matter, the loss function uses a top view ("in the world") representation, e.g., using the camera(s) focal length, the camera(s) height and a dynamic horizon, of the prestored path 1512 and of the provisional future path 1514, and absolute loss is computed. The loss function can be configured to penalized errors in meters in the real world (it focalized the scoring on far errors). In some embodiments, the marked object, for example, the lane marking manually marked by technicians, can also include virtual objects, such as junctions, areas where lane marks are missing, unmarked highway exits or merges, etc., as is shown for example, in FIG. 18, where virtual lane marks 1810 are added to mark a highway exist, in accordance with examples of the presently disclosed subject matter.

In FIG. 15B, a prestored path 1522 was generated based on ego-motion of the vehicle, and its subsequent path along the road (which in this case is) ahead of the location from where a 1520 image was captured. According to examples of the presently disclosed subject matter, for ego-motion based prestored path data, an optimal offset between the prestored path 1522 and a provisional future path 1524 provided by the trained system can be determined, and the loss function can be computed after correction by the optimal offset.

According to examples of the presently disclosed subject matter, the training of the system can be carried out until a stop condition is met. In some embodiments, the stop condition can be a certain number of iterations. For example, the first plurality of training images can include a relatively higher number of images of environments which appear relatively rarely on roads, for example, images of environments that comprise a curved road. In another example, the first plurality of training images includes a relatively higher number of images of environments that comprise a lane split, a lane merge, a highway exit, a highway entrance and/or a junction; in yet another example. In yet another example, the first plurality of training images can include a relatively higher number of images of environments that comprise a poor or no lane markings, Botts dots and/or shadows on a road ahead of the vehicle.

Figure 11:
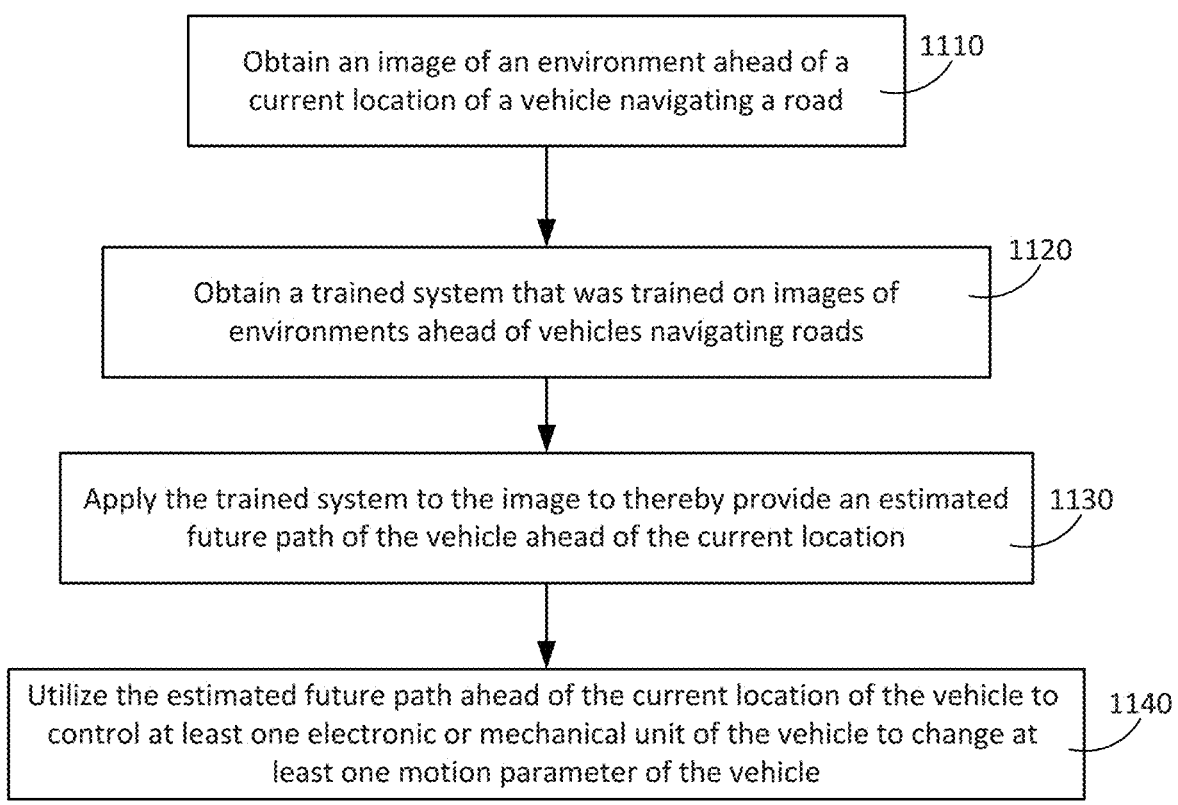
FIG. 11 is a flow chart illustration of a method of estimating a future path ahead of a current location of a vehicle, according to examples of the presently disclosed subject matter.

According to a further aspect of the presently disclosed subject matter, there is provided a system and a method for estimating a future path ahead of a current location of a vehicle. Reference is now made to FIG. 11, which is a flow chart illustration of a method of estimating a future path ahead of a current location of a vehicle, according to examples of the presently disclosed subject matter. The method may be implemented by a processor. According to examples of the presently disclosed subject matter, the method of estimating a future path ahead of a current location of a vehicle can include: obtaining an image of an environment ahead of a current arbitrary location of a vehicle navigating a road (block 1110). A system that was trained to estimate a future path on a first plurality of images of environments ahead of vehicles navigating roads can be obtained (block 1120). In some embodiments, the trained system may include a network, such as a neural network. In other embodiments, the trained system can be a deep leaning system using, for example, machine leaning algorithms. The trained system can be applied to the image of the environment ahead of the current arbitrary location of the vehicle (block 1130). An estimated future path of the vehicle ahead of the current arbitrary location can be provided by the trained system (block 1140).

Figure 10:
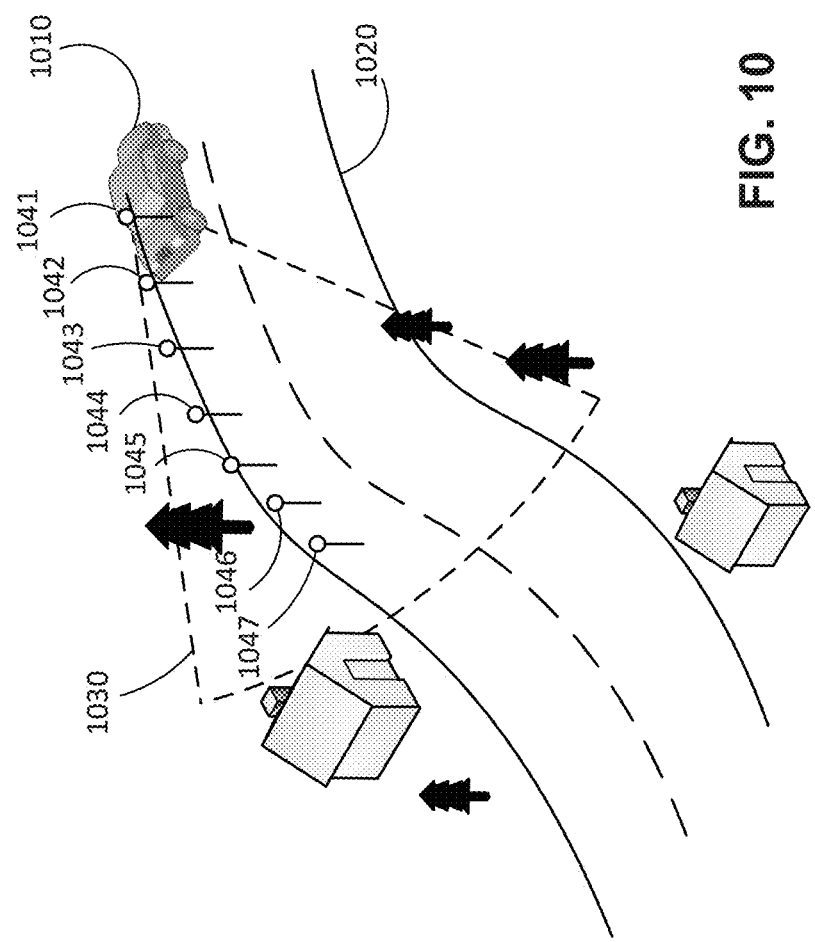
FIG. 10 is a graphical illustration of certain aspects of a method of estimating a future path ahead of a current location of a vehicle consistent with the disclosed embodiments.

Reference is made to FIG. 10, which is a graphical illustration of certain aspects of the method of estimating a future path ahead of a current location of a vehicle, according to examples of the presently disclosed subject matter. As is shown in FIG. 10, a vehicle 1010 is entering a section of road 1020. The road 1020 is an arbitrary road, and images from the road 1020 may or may not have been used in the training of the system (e.g., a neural network, deep learning system, etc.). The vehicle 1010 includes a camera (not shown) which captures images. The images captured by the camera on board the vehicle 1010 may or may not be cropped, or processed in any other way (e.g., down sampled) before being fed to the trained system. In FIG. 10, an image is illustrated by cone 630 which represents the FOV of the camera mounted in vehicle 1010. The image depicts arbitrary objects in the FOV of the camera. The image can, but does not necessarily, include road objects, such as road signs, lane marks, curbs, other vehicles, etc. The image can include other arbitrary objects, such as structures and trees at the sides of the road, etc.

The trained system can be applied to the image 1030 of the environment ahead of the current arbitrary location of the vehicle 1010, and can provide an estimated future path of the vehicle 1010 ahead of the current arbitrary location. In FIG. 10, the estimated future path is denoted by pins 1041-1047. FIGS. 16A, 16B, 17A, and 17B further illustrate images including the estimated future paths 1610, 1620, 1710, and 1720 consistent with the disclosed embodiments.

In some embodiments, the trained system can include piece-wise affine functions of global functions. In some embodiments, the global functions can include: convolutions, max pooling and/or rectifier liner unit (ReLU).

In some embodiments, the method can further include: utilizing the estimated future path ahead of the current location of the vehicle to control at least one electronic or mechanical unit of the vehicle to change at least one motion parameter of the vehicle. In some embodiments, the method can further include: utilizing the estimated future path ahead of the current location of the vehicle to provide a sensory feedback to a driver of the vehicle.

In some embodiments, the estimated future path of the vehicle ahead of the current location can be further based on identifying one or more predefined objects appearing in the image of the environment using at least one classifier.

The method can further include: utilizing the estimated future path ahead of the current location of the vehicle to provide a control point for a steering control function of the vehicle.

In some embodiments, applying the trained system to the image of the environment ahead of the current location of the vehicle provides two or more estimated future paths of the vehicle ahead of the current location.

In some embodiments, the method can further include: utilizing the estimated future path ahead of the current location of the vehicle in estimating a road profile ahead of the current location of the vehicle.

In some embodiments, applying the trained system to the image of the environment ahead of the current location of the vehicle provides two or more estimated future paths of the vehicle ahead of the current location, and can further include estimating a road profile along each one of the two or more estimated future paths of the vehicle ahead of the current location.

In some embodiments, the method can further include: utilizing the estimated future path ahead of the current location of the vehicle in detecting one or more vehicles that are located in or near the future path of the vehicle.

In some embodiments, the method can further include causing at least one electronic or mechanical unit of the vehicle to change at least one motion parameter of the vehicle based on a location of one or more vehicles which were determined to be in or near the future path of the vehicle.

In some embodiments, the method can further include: triggering a sensory alert to indicate to a user of that one or more vehicles are determined to be in or near the future path of the vehicle.

In some embodiments, in addition to processing images of an environment ahead of a vehicle navigating a road for training a system (e.g., a neural network, deep learning system, etc.) to estimate a future path of a vehicle based on images and/or processing images of an environment ahead of a vehicle navigating a road using a trained system to estimate a future path of the vehicle, a confidence level may be provided in the training phase or used in the navigation phase which uses the trained system. A Holistic Path Prediction (HPP) confidence is an output made by a trained system, such as a neural network, similar to a neural network for HPP. The concept may generate a classifier that tries to guess the error of another classifier on the same image. One method of implementing this is using one trained system (e.g., a first neural network) to give the used output (for example, a location of lane, or center of lane, or predicted future path), and to train another system (e.g., a second neural network), using the same input data (or a subset of that data, or features that are extracted from that data) to estimate the error of the first trained system on that image (e.g., estimate absolute-average-loss of the prediction of the first trained system).

With any of the described techniques, a future path for a host vehicle (e.g., a planned trajectory) can be generated, and automated control systems may cause changes in various actuators associated with the host vehicle (e.g., steering actuators, braking actuators, etc.) such that the host vehicle is made to navigate autonomously relative to the planned trajectory. In some cases, the host vehicle may navigate exactly according the planned trajectory. In other cases, however, at least some error in the system may exist such that the host vehicle does not follow the planned trajectory exactly, but rather follows the planned trajectory within some acceptable tolerance. Through use of trained systems, trained using actual drive paths associated with hundreds, thousands, or millions of traversals over a particular road segment under various conditions, the system may be capable of generated planned trajectories in a wide range of conditions. For example, planned trajectories may be generated for road segments having few or no line or lane markings, for road segments whose edges are partially or fully obscured (e.g., by parked cars, etc.), for parking lots, or any other type of navigable surface.

Sparse Map for Autonomous Vehicle Navigation

In some embodiments, the disclosed systems and methods may use a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road. For example, rather than storing detailed representations of a road segment, the sparse data map may store three dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway.

Consistent with disclosed embodiments, an autonomous vehicle system may use a sparse map for navigation. At the core of the sparse maps, one or more three-dimensional contours may represent predetermined trajectories that autonomous vehicles may traverse as they move along associated road segments. The sparse maps may also include data representing one or more road features. Such road features may include recognized landmarks, road signature profiles, and any other road-related features useful in navigating a vehicle. The sparse maps may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle), but may still adequately provide for autonomous vehicle navigation. The small data footprint of the disclosed sparse maps, discussed in further detail below, may be achieved in some embodiments by storing representations of road-related elements that require small amounts of data, but still enable autonomous navigation. For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example during a subsequent drive. In some embodiments, a digital signature may be created such that it has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time. In some embodiments, a size of the data objects may be further associated with a uniqueness of the road feature. For example, for a road feature that is detectable by a camera onboard a vehicle, and where the camera system onboard the vehicle is coupled to a classifier which is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In just one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark. Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features. When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify it as a sign (or as a specific type of sign), and correlate its location with the location of the sign as stored in the sparse map.

In some embodiments, an autonomous vehicle may include a vehicle body and a processor configured to receive data included in a sparse map and generate navigational instructions for navigating the vehicle along a road segment based on the data in the sparse map.

Figure 19:
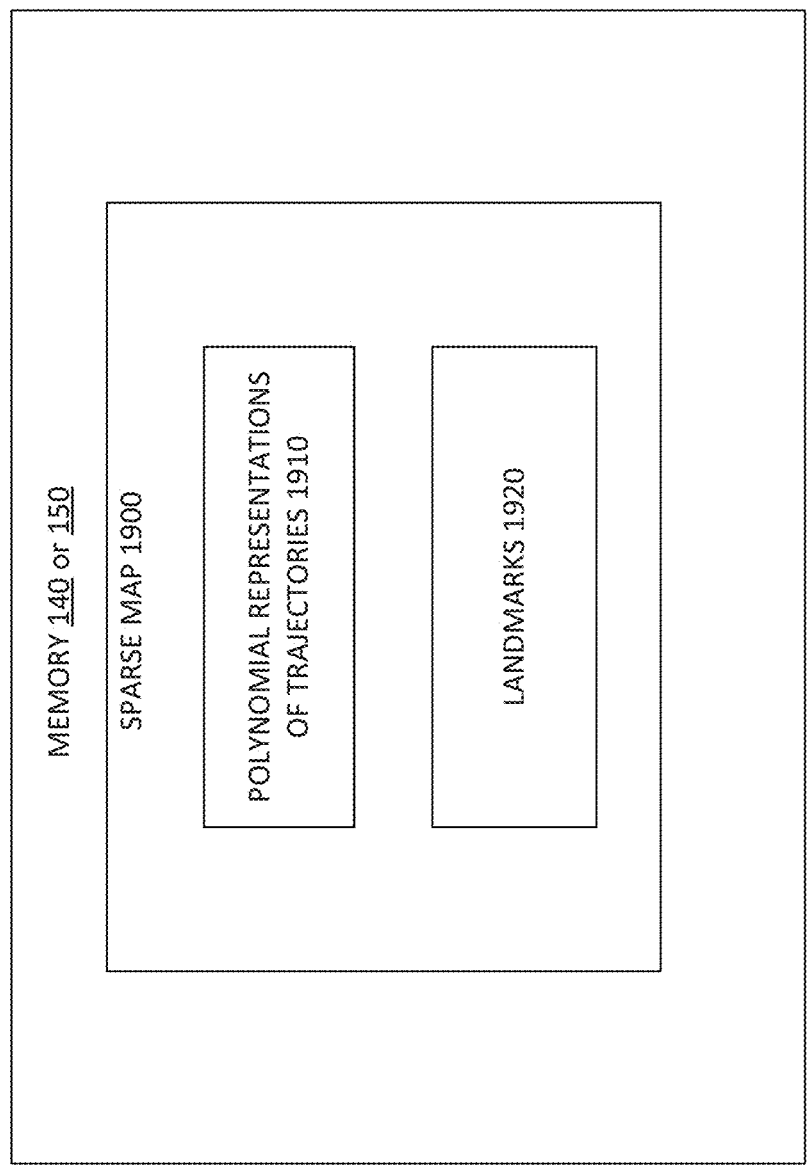
FIG. 19 shows a sparse map for providing autonomous vehicle navigation, consistent with the disclosed embodiments.

FIG. 19 shows a sparse map 1900 that vehicle 200 (which may be an autonomous vehicle) may access for providing autonomous vehicle navigation. Sparse map 1900 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 1900 may be stored in a database (e.g., map database 160) that may be stored in memory 140 or 150, or other types of storage devices.

In some embodiments, sparse map 1900 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 1900 stored in the storage device or computer-readable medium provided onboard vehicle 200 in order to generate navigational instructions for guiding the autonomous vehicle 200 as it traverses a road segment.

Sparse map 1900 need not be stored locally with respect to a vehicle, however. In some embodiments, sparse map 1900 may be stored on a storage device or computer-readable medium provided on a remote server that communicates with vehicle 200 or a device associated with vehicle 200. A processor (e.g., processing unit 110) provided on vehicle 200 may receive data included in sparse map 1900 from the remove server and may execute the data for guiding the autonomous driving of vehicle 200. In such embodiments, sparse map 1900 may be made accessible to a plurality of vehicles traversing various road segments (e.g., tens, hundreds, thousands, or millions of vehicles, etc.). It should be noted also that sparse map 1900 may include multiple sub-maps. For example, in some embodiments, sparse map 1900 may include hundreds, thousands, millions, or more, of sub-maps that can be used in navigating a vehicle. Such sub-maps may be referred to as local maps, and a vehicle traveling along a roadway may access any number of local maps relevant to a location in which the vehicle is traveling. The local map sections of sparse map 1900 may be stored with a Global Navigation Satellite System (GNSS) key as an index to the database of sparse map 1900. Thus, while computation of steering angles for navigating a host vehicle in the present system may be performed without reliance upon a GNSS position of the host vehicle, road features, or landmarks, such GNSS information may be used for retrieval of relevant local maps.

Collection of data and generation of sparse map 1900 is covered in detail in other sections. In general, however, sparse map 1900 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories traveled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, etc. Using the collected information, sparse map 1900 may be generated and distributed (e.g., for local storage or via on-the-fly data transmission) for use in navigating one or more autonomous vehicles. Map generation may not end upon initial generation of the map, however. As will be discussed in greater detail in other sections, sparse map 1900 may be continuously or periodically updated based on data collected from vehicles as those vehicles continue to traverse roadways included in sparse map 1900.

Data recorded in sparse map 1900 may include position information based on Global Positioning System (GPS) data. For example, location information may be included in sparse map 1900 for various map elements, including, for example, landmark locations, road profile locations, etc. Locations for map elements included in sparse map 1900 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 1900) may be repeated as additional vehicles pass the location of the identified landmark. Some or all of the additional location determinations can be used to refine the location information stored in sparse map 1900 relative to the identified landmark. For example, in some embodiments, multiple position measurements relative to a particular feature stored in sparse map 1900 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 1900 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 1900 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most if not all of the roadways of the United States may be navigated autonomously using a sparse map having a total of 4 GB or less of data. These data density values may represent an average over an entire sparse map 1900, over a local map within sparse map 1900, and/or over a particular road segment within sparse map 1900.

As noted, sparse map 1900 may include representations of a plurality of target trajectories 1910 for guiding autonomous driving or navigation along a road segment. Such target trajectories may be stored as three-dimensional splines. The target trajectories stored in sparse map 1900 may be determined based on two or more reconstructed trajectories of prior traversals of vehicles along a particular road segment. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road, one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 1900 may also include data relating to a plurality of predetermined landmarks 1920 associated with particular road segments, local maps, etc. As discussed in detail in other sections, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 1920 may be identified and stored in sparse map 1900 at any suitable spacing. In some embodiments, landmarks may be stored at relatively high densities (e.g., every few meters or more). In some embodiments, however, significantly larger landmark spacing values may be employed. For example, in sparse map 1900, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart. Between landmarks, and therefore between determinations of vehicle position relative to a target trajectory, the vehicle may navigate based on dead reckoning in which it uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 1900 (and their known locations) to remove the dead reckoning-induced errors in position determination. In this way, the identified landmarks included in sparse map 1900 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 1900.

Figure 20A:
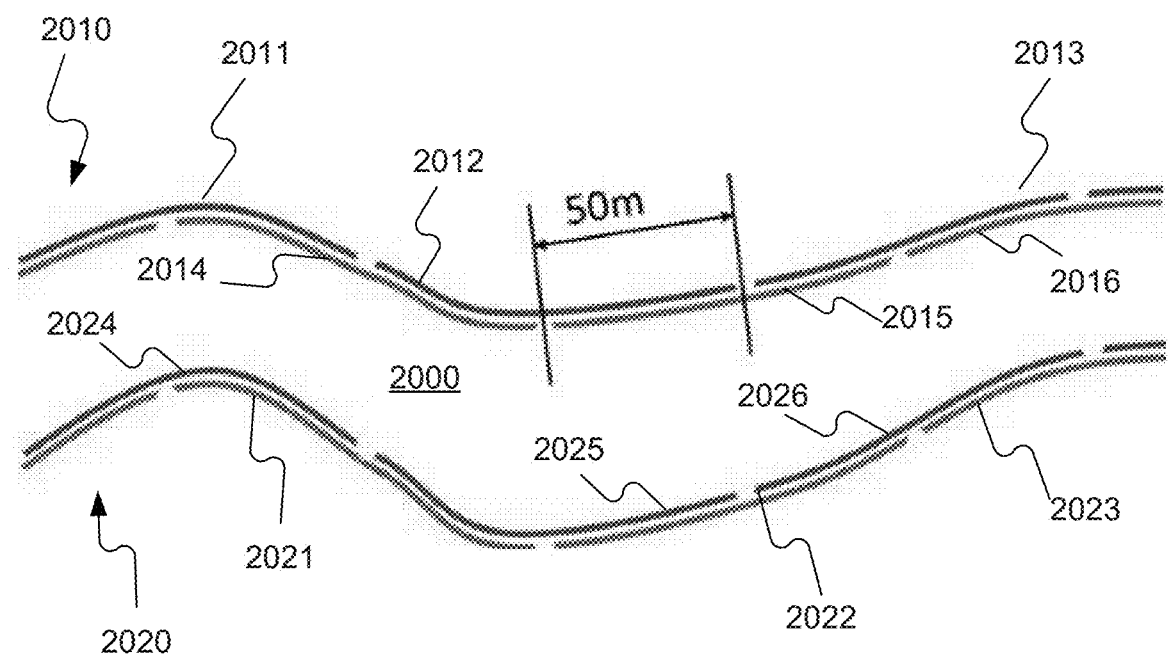
FIG. 20A illustrates a polynomial representation of a portions of a road segment consistent with the disclosed embodiments.

In addition to target trajectories and identified landmarks, sparse map 1900 may include information relating to various other road features. For example, FIG. 20A illustrates a representation of curves along a particular road segment that may be stored in sparse map 1900. In some embodiments, a single lane of a road may be modeled by a three-dimensional polynomial description of left and right sides of the road. Such polynomials representing left and right sides of a single lane are shown in FIG. 20A. Regardless of how many lanes a road may have, the road may be represented using polynomials in a way similar to that illustrated in FIG. 20A. For example, left and right sides of a multi-lane road may be represented by polynomials similar to those shown in FIG. 20A, and intermediate lane markings included on a multi-lane road (e.g., dashed markings representing lane boundaries, solid yellow lines representing boundaries between lanes traveling in different directions, etc.) may also be represented using polynomials such as those shown in FIG. 20A.

As shown in FIG. 20A, a lane 2000 may be represented using polynomials (e.g., a first order, second order, third order, or any suitable order polynomials). For illustration, lane 2000 is shown as a two-dimensional lane and the polynomials are shown as two-dimensional polynomials. Lane 2000 includes a left side 2010 and a right side 2020. In some embodiments, more than one polynomial may be used to represent a location of each side of the road or lane boundary. For example, each of left side 2010 and right side 2020 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 2010 and right side 2020 may be represented by a plurality of third order polynomials separated into segments of about 100 meters in length (an example of the first predetermined range), and overlapping each other by about 50 meters. The polynomials representing the left side 2010 and the right side 2020 may or may not have the same order. For example, in some embodiments, some polynomials may be second order polynomials, some may be third order polynomials, and some may be fourth order polynomials.

In the example shown in FIG. 20A, left side 2010 of lane 2000 is represented by two groups of third order polynomials. The first group includes polynomial segments 2011, 2012, and 2013. The second group includes polynomial segments 2014, 2015, and 2016. The two groups, while substantially parallel to each other, follow the locations of their respective sides of the road. Polynomial segments 2011-2016 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 20A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature.

Figure 20B:
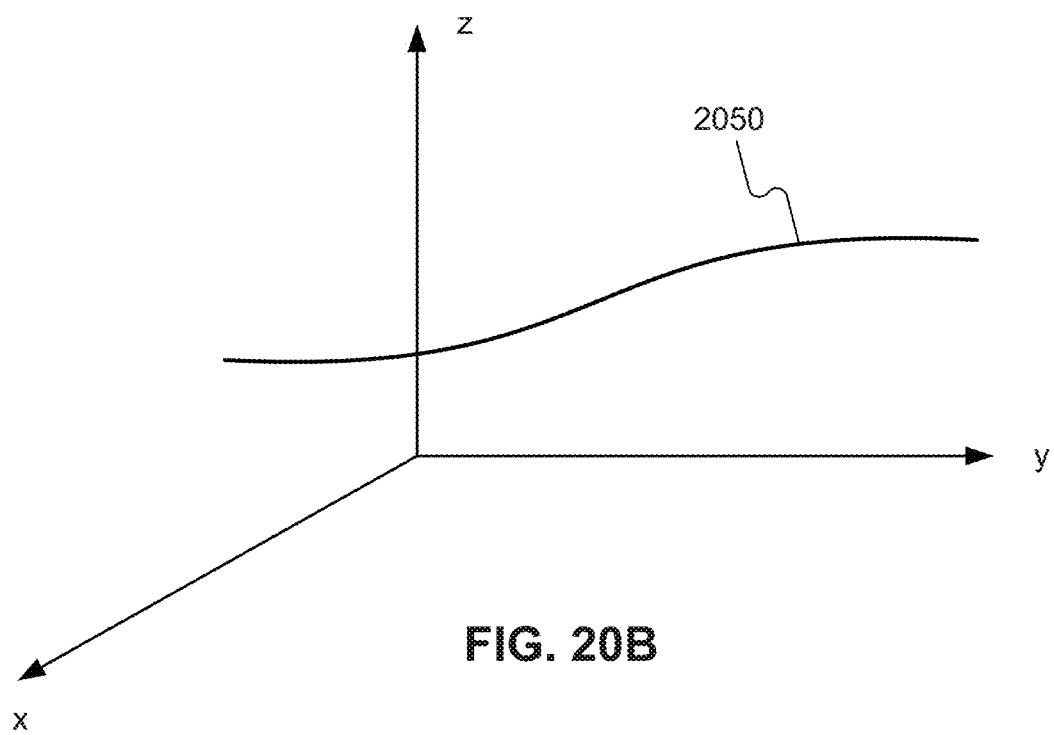
FIG. 20B illustrates a curve in three-dimensional space representing a target trajectory of a vehicle, for a particular road segment, included in a sparse map consistent with the disclosed embodiments.

Returning to the target trajectories of sparse map 1900, FIG. 20B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 1900 may be represented by one or more three-dimensional polynomials, like the three-dimensional polynomial 2050 shown in FIG. 20B. Sparse map 1900 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 1900, in some embodiments, each third degree polynomial may be represented by four parameters, each requiring four bytes of data. Suitable representations may be obtained with third degree polynomials requiring about 192 bytes of data for every 100 m. This translates to approximately 200 kB per hour in data usage/transfer requirements for a host vehicle traveling approximately 100 km/hr.

Sparse map 1900 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

As previously noted, sparse map 1900 may include a plurality of predetermined landmarks associated with a road segment. Rather than storing actual images of the landmarks and relying, for example, on image recognition analysis based on captured images and stored images, each landmark in sparse map 1900 may be represented and recognized using less data than a stored, actual image would require. Data representing landmarks may include sufficient information for describing or identifying the landmarks along a road. Storing data describing characteristics of landmarks, rather than the actual images of landmarks, may reduce the size of sparse map 1900.

Figure 21:
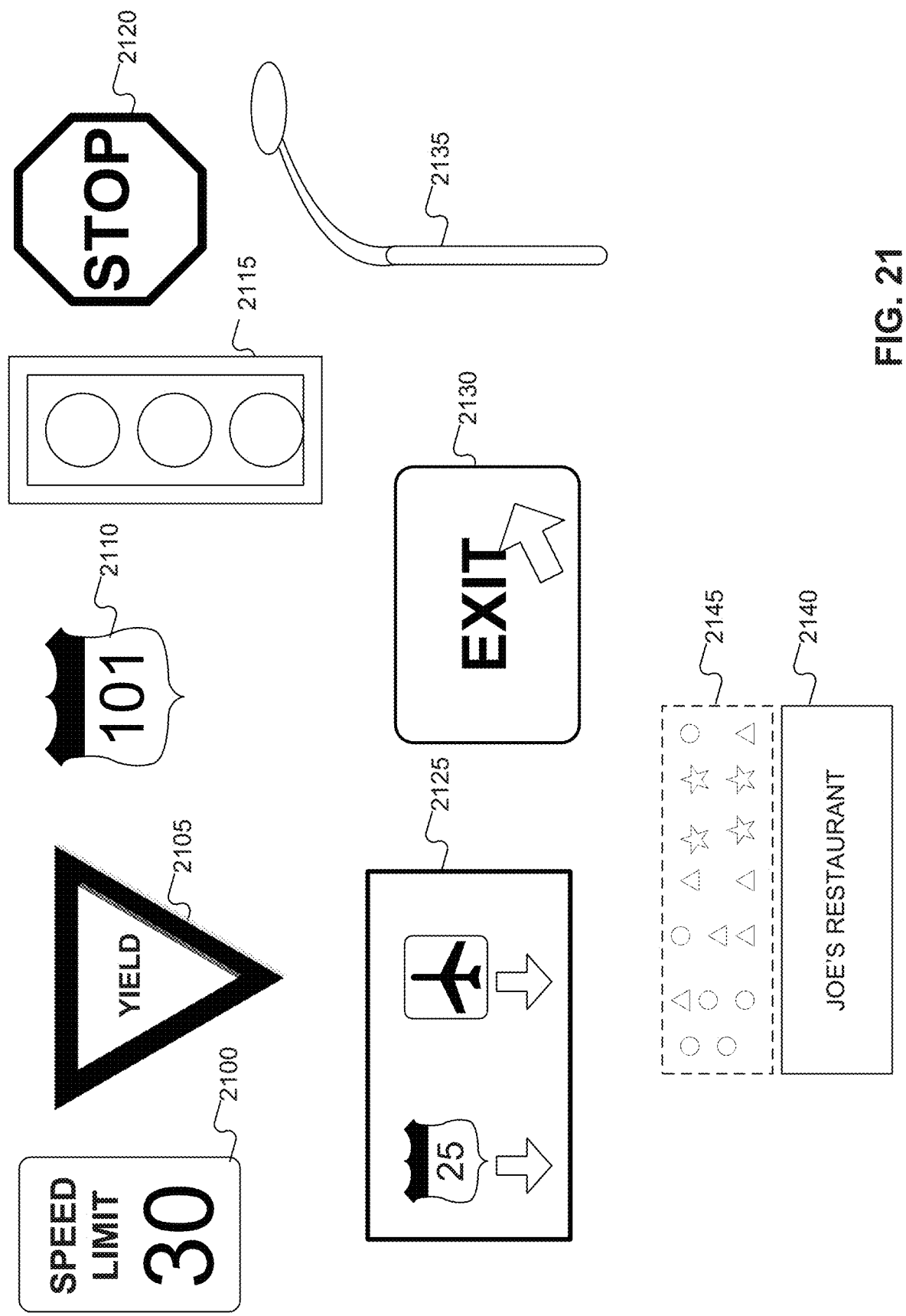
FIG. 21 illustrates example landmarks that may be included in sparse map consistent with the disclosed embodiments.

FIG. 21 illustrates examples of types of landmarks that may be represented in sparse map 1900. The landmarks may include any visible and identifiable objects along a road segment. The landmarks may be selected such that they are fixed and do not change often with respect to their locations and/or content. The landmarks included in sparse map 1900 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 1900.

Examples of landmarks shown in FIG. 21 include traffic signs, directional signs, roadside fixtures, and general signs. Traffic signs may include, for example, speed limit signs (e.g., speed limit sign 2100), yield signs (e.g., yield sign 2105), route number signs (e.g., route number sign 2110), traffic light signs (e.g., traffic light sign 2115), stop signs (e.g., stop sign 2120). Directional signs may include a sign that includes one or more arrows indicating one or more directions to different places. For example, directional signs may include a highway sign 2125 having arrows for directing vehicles to different roads or places, an exit sign 2130 having an arrow directing vehicles off a road, etc.

General signs may be unrelated to traffic. For example, general signs may include billboards used for advertisement, or a welcome board adjacent a border between two countries, states, counties, cities, or towns. FIG. 21 shows a general sign 2140 ("Joe's Restaurant"). Although general sign 2140 may have a rectangular shape, as shown in FIG. 21, general sign 2140 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 2135), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 1900 may be represented by a data object of a predetermined size. The data representing a landmark may include any suitable parameters for identifying a particular landmark. For example, in some embodiments, landmarks stored in sparse map 1900 may include parameters such as a physical size of the landmark (e.g., to support estimation of distance to the landmark based on a known size/scale), a distance to a previous landmark, lateral offset, height, a type code (e.g., a landmark type—what type of directional sign, traffic sign, etc.), a GPS coordinate (e.g., to support global localization), and any other suitable parameters. Each parameter may be associated with a data size. For example, a landmark size may be stored using κ bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 1900 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 1900 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 1900, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 1900 by no more than 100 byte of data. The representation of the generally rectangular object (e.g., general sign 2140) in sparse map 1900 may include a condensed image signature (e.g., condensed image signature 2145) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 21, sparse map 1900 may include or store a condensed image signature 2145 associated with a general sign 2140, rather than an actual image of general sign 2140. For example, after an image capture device (e.g., image capture device 122, 124, or 126) captures an image of general sign 2140, a processor (e.g., image processor 190 or any other processor that can process images either aboard or remotely located relative to a host vehicle) may perform an image analysis to extract/create condensed image signature 2145 that includes a unique signature or pattern associated with general sign 2140. In one embodiment, condensed image signature 2145 may include a shape, color pattern, a brightness pattern, or any other feature that may be extracted from the image of general sign 2140 for describing general sign 2140. For example, in FIG. 21, the circles, triangles, and stars shown in condensed image signature 2145 may represent areas of different colors. The pattern represented by the circles, triangles, and stars may be stored in sparse map 1900, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Figure 22A:
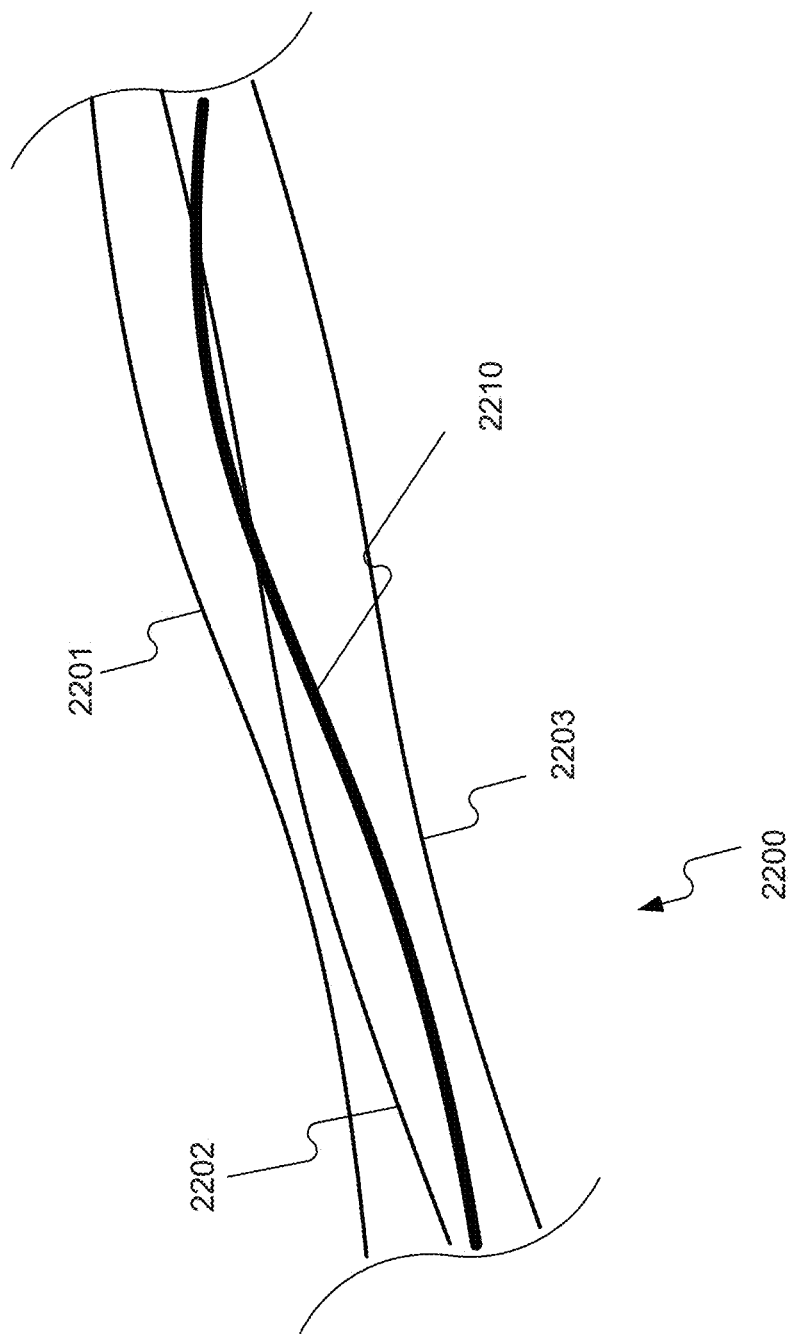
FIG. 22A shows polynomial representations of trajectories consistent with the disclosed embodiments.

Returning to the target trajectories a host vehicle may use to navigate a particular road segment, FIG. 22A shows polynomial representations trajectories capturing during a process of building or maintaining sparse map 1900. A polynomial representation of a target trajectory included in sparse map 1900 may be determined based on two or more reconstructed trajectories of prior traversals of vehicles along the same road segment. In some embodiments, the polynomial representation of the target trajectory included in sparse map 1900 may be an aggregation of two or more reconstructed trajectories of prior traversals of vehicles along the same road segment. In some embodiments, the polynomial representation of the target trajectory included in sparse map 1900 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 22A, a road segment 2200 may be traveled by a number of vehicles 200 at different times. Each vehicle 200 may collect data relating to a path that it took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as it travels along the road segment.

In the example shown in FIG. 22A, a first reconstructed trajectory 2201 may be determined based on data received from a first vehicle traversing road segment 2200 at a first time period (e.g., day 1), a second reconstructed trajectory 2202 may be obtained from a second vehicle traversing road segment 2200 at a second time period (e.g., day 2), and a third reconstructed trajectory 2203 may be obtained from a third vehicle traversing road segment 2200 at a third time period (e.g., day 3). Each trajectory 2201, 2202, and 2203 may be represented by a polynomial, such as a three-dimensional polynomial. It should be noted that in some embodiments, any of the reconstructed trajectories may be assembled onboard the vehicles traversing road segment 2200.

Additionally, or alternatively, such reconstructed trajectories may be determined on a server side based on information received from vehicles traversing road segment 2200. For example, in some embodiments, vehicles 200 may transmit data to one or more servers relating to their motion along road segment 2200 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 2200 at a later time based on the first, second, and third trajectories 2201, 2202, and 2203. While a target trajectory may be associated with a single prior traversal of a road segment, in some embodiments, each target trajectory included in sparse map 1900 may be determined based on two or more reconstructed trajectories of vehicles traversing the same road segment. In FIG. 22A, the target trajectory is represented by 2210. In some embodiments, the target trajectory 2210 may be generated based on an average of the first, second, and third trajectories 2201, 2202, and 2203. In some embodiments, the target trajectory 2210 included in sparse map 1900 may be an aggregation (e.g., a weighted combination) of two or more reconstructed trajectories.

Figure 22B:
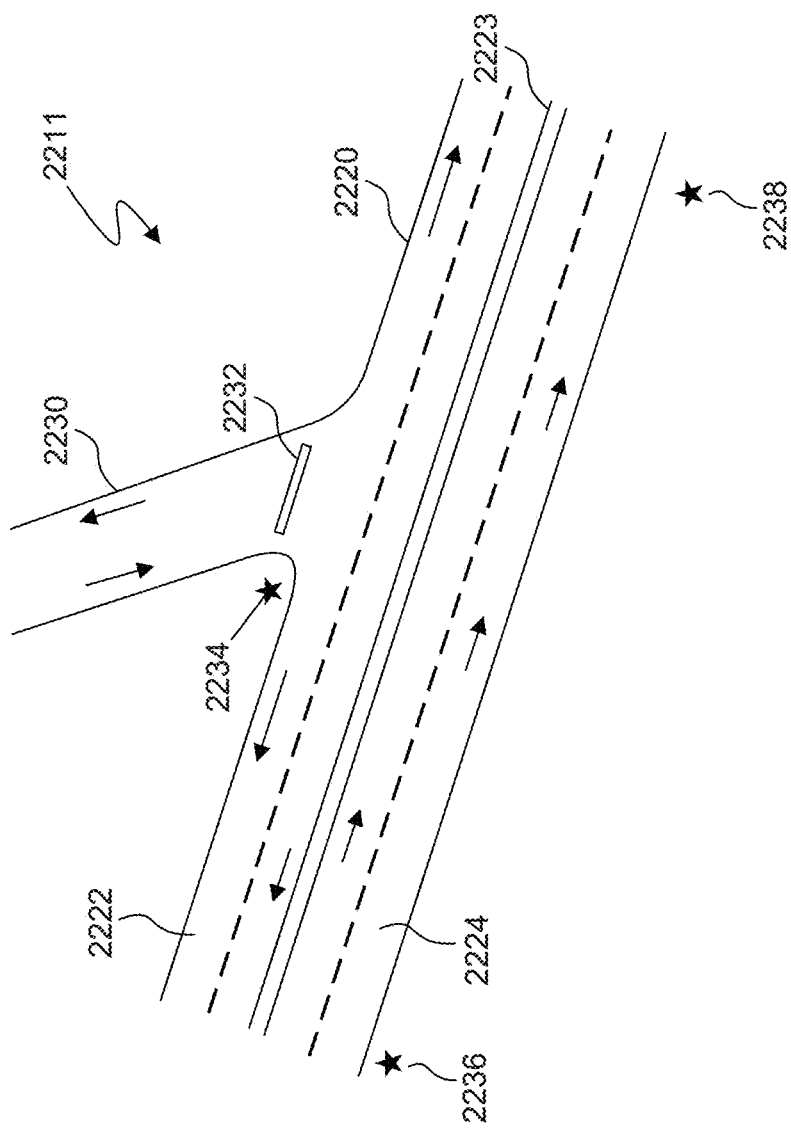
FIGS. 22B and 22C show target trajectories along a multi-lane road consistent with disclosed embodiments.
Figure 22C:
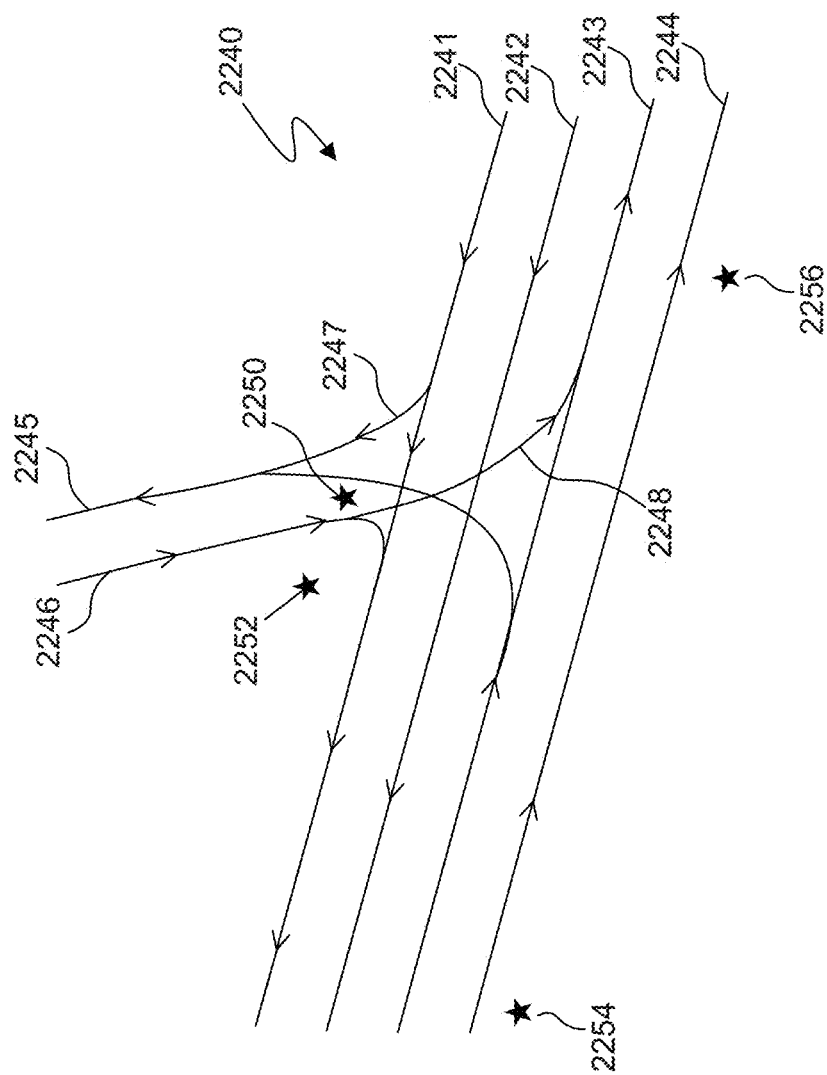

FIGS. 22B and 22C further illustrate the concept of target trajectories associated with road segments present within a geographic region 2211. As shown in FIG. 22B, a first road segment 2220 within geographic region 2211 may include a multilane road, which includes two lanes 2222 designated for vehicle travel in a first direction and two additional lanes 2224 designated for vehicle travel in a second direction opposite to the first direction. Lanes 2222 and lanes 2224 may be separated by a double yellow line 2223. Geographic region 2211 may also include a branching road segment 2230 that intersects with road segment 2220. Road segment 2230 may include a two-lane road, each lane being designated for a different direction of travel. Geographic region 2211 may also include other road features, such as a stop line 2232, a stop sign 2234, a speed limit sign 2236, and a hazard sign 2238.

As shown in FIG. 22C, sparse map 1900 may include a local map 2240 including a road model for assisting with autonomous navigation of vehicles within geographic region 2211. For example, local map 2240 may include target trajectories for one or more lanes associated with road segments 2220 and/or 2230 within geographic region 2211. For example, local map 2240 may include target trajectories 2241 and/or 2242 that an autonomous vehicle may access or rely upon when traversing lanes 2222. Similarly, local map 2240 may include target trajectories 2243 and/or 2244 that an autonomous vehicle may access or rely upon when traversing lanes 2224. Further, local map 2240 may include target trajectories 2245 and/or 2246 that an autonomous vehicle may access or rely upon when traversing road segment 2230. Target trajectory 2247 represents a preferred path an autonomous vehicle should follow when transitioning from lanes 2220 (and specifically, relative to target trajectory 2241 associated with a right-most lane of lanes 2220) to road segment 2230 (and specifically, relative to a target trajectory 2245 associated with a first side of road segment 2230. Similarly, target trajectory 2248 represents a preferred path an autonomous vehicle should follow when transitioning from road segment 2230 (and specifically, relative to target trajectory 2246) to a portion of road segment 2240 (and specifically, as shown, relative to a target trajectory 2243 associated with a left lane of lanes 2224).

Sparse map 1900 may also include representations of other road-related features associated with geographic region 2211. For example, sparse map 1900 may also include representations of one or more landmarks identified in geographic region 2211. Such landmarks may include a first landmark 2250 associated with stop line 2232, a second landmark 2252 associated with stop sign 2234, a third landmark associated with speed limit sign 2254, and a fourth landmark 2256 associated with hazard sign 2238. Such landmarks may be used, for example, to assist an autonomous vehicle in determining its current location relative to any of the shown target trajectories, such that the vehicle may adjust its heading to match a direction of the target trajectory at the determined location.

Figure 22D:
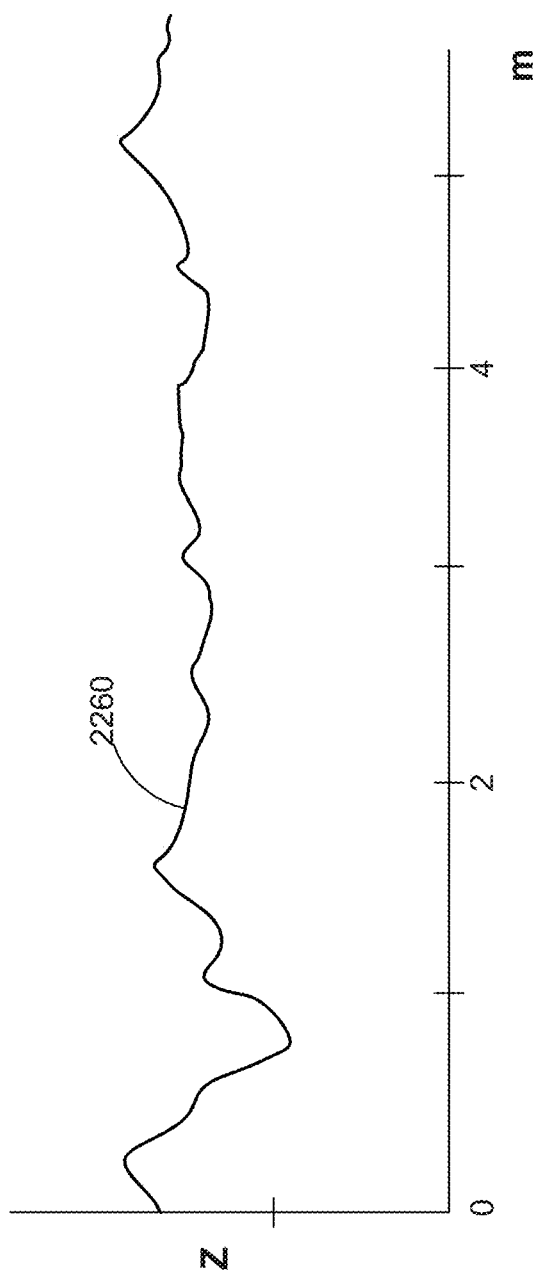
FIG. 22D shows an example road signature profile consistent with disclosed embodiments.

In some embodiments, sparse map 1900 may also include road signature profiles. Such road signature profiles may be associated with any discernible/measurable variation in at least one parameter associated with a road. For example, in some cases, such profiles may be associated with variations in surface roughness of a particular road segment, variations in road width over a particular road segment, variations in distances between dashed lines painted along a particular road segment, variations in road curvature along a particular road segment, etc. FIG. 22D shows an example of a road signature profile 2260. While profile 2260 may represent any of the parameters mentioned above, or others, in one example, profile 2260 may represent a measure of road surface roughness, as obtained, for example, by monitoring one or more sensors providing outputs indicative of an amount of suspension displacement as a vehicle travels a particular road segment. Alternatively, profile 2260 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 1900 may include different trajectories based on different characteristics associated with a user of autonomous vehicles, environmental conditions, and/or other parameters relating to driving. For example, in some embodiments, different trajectories may be generated based on different user preferences and/or profiles. Sparse map 1900 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 1900 based on different environmental conditions, such as day and night, snow, rain, fog, etc. Autonomous vehicles driving under different environmental conditions may be provided with sparse map 1900 generated based on such different environmental conditions. In some embodiments, cameras provided on autonomous vehicles may detect the environmental conditions, and may provide such information back to a server that generates and provides sparse maps. For example, the server may generate or update an already generated sparse map 1900 to include trajectories that may be more suitable or safer for autonomous driving under the detected environmental conditions. The update of sparse map 1900 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 1900 such that the autonomous vehicle may maintain within a specific lane as it follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowd Sourcing Data for Autonomous Vehicle Navigation

In some embodiments, the disclosed systems and methods may construct a road model for autonomous vehicle navigation. For example, disclosed systems and methods may use crowd sourced data for generation of an autonomous vehicle road model that one or more autonomous vehicles may use to navigate along a system of roads. By crowd sourcing, it means that data are received from various vehicles (e.g., autonomous vehicles) travelling on a road segment at different times and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle, or it may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 1900 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as it travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 1900. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include the geometry of the road, its lane structure, and landmarks that may be used to determine the location or position of vehicles along a trajectory included in the model. Generation of the road model may be performed by a remote server that communicates with vehicles travelling on the road and that receives data from the vehicles. The data may include sensed data, trajectories reconstructed based on the sensed data, and/or recommended trajectories that may represent modified reconstructed trajectories. The server may transmit the model back to the vehicles or other vehicles that later travel on the road to aid in autonomous navigation.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign. The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. The server may distribute the model to clients (e.g., vehicles). The server may continuously or periodically update the model when receiving new data from the vehicles. For example, the server may process the new data to evaluate whether it includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before it reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment.

The server may average landmark properties received from multiple vehicles that traveled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles traveled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles traveled along the common road segment and recognized the same landmark. The averaged lateral potion may be used to support lane assignment. The server may average the GPS coordinates of the landmark measured by multiple vehicles traveled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Consistent with disclosed embodiments, the system can store information obtained during autonomous navigation (or regular driver-controlled navigation) for use in later traversals along the same road. The system may share that information with other vehicles when they navigate along the road. Each client system may then further refine the crowd sourced data based on observed local conditions.

Figure 23:
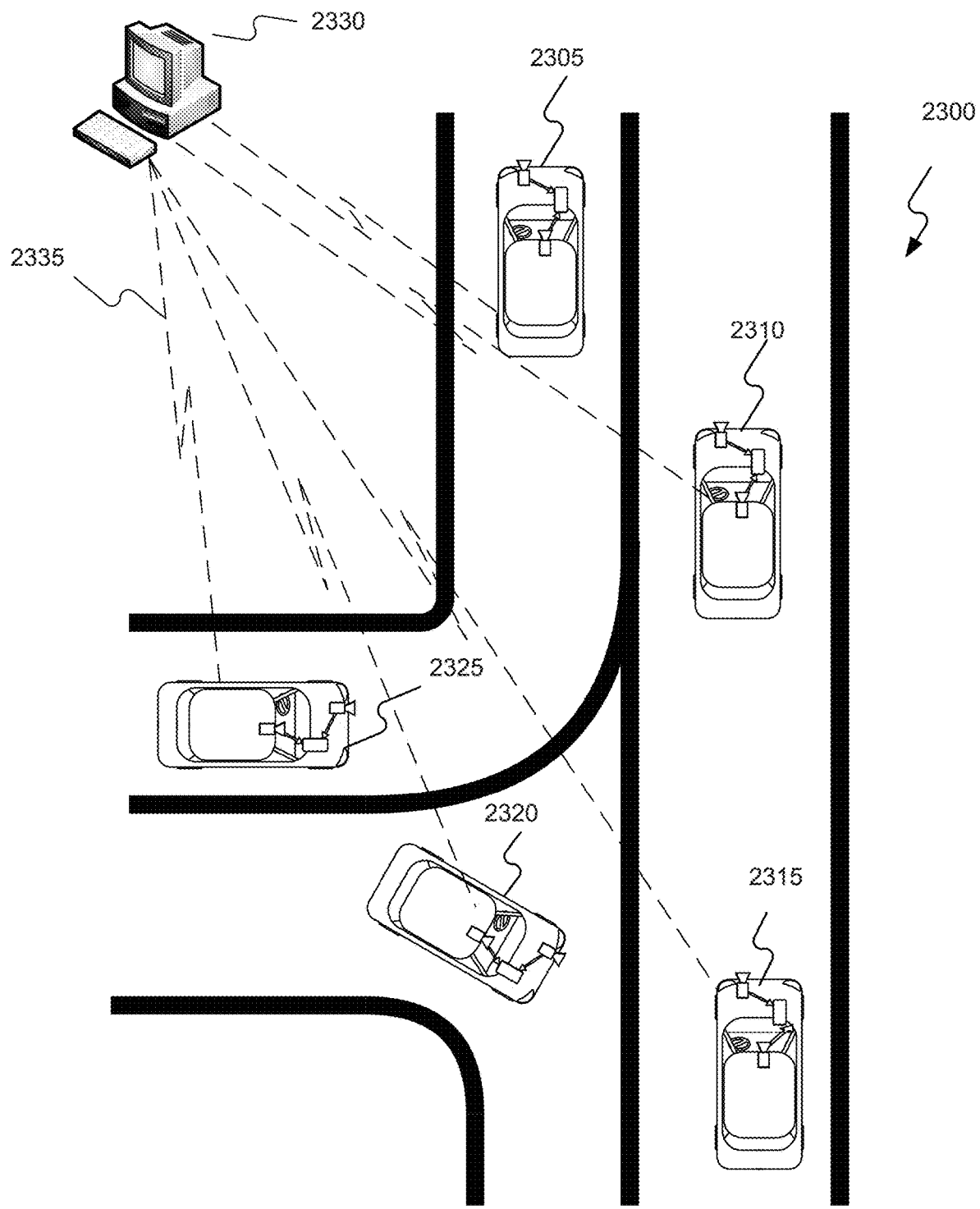
FIG. 23 is a schematic illustration of a system that uses crowd sourcing data received from a plurality of vehicles for autonomous vehicle navigation, consistent with the disclosed embodiments.

FIG. 23 is a schematic illustration of a system that uses crowd sourcing data for autonomous vehicle navigation. FIG. 23 shows a road segment 2300 that includes one or more lanes. A plurality of vehicles 2305, 2310, 2315, 2320, and 2325 may travel on road segment 2300 at the same time or at different times (although shown as appearing on road segment 2300 at the same time in FIG. 23). At least one of vehicles 2305-2325 may be an autonomous vehicle. For simplicity of the present example, all of the vehicles 2305-2325 are presumed to be autonomous vehicles. Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 2330 via one or more networks (e.g., over a cellular network and/or the Internet, etc.) through wireless communication paths 2335, as indicated by the dashed lines. Each vehicle may transmit data to server 2330 and receive data from server 2330. For example, server 2330 may collect data from multiple vehicles travelling on the road segment 2300 at different times, and may process the collected data to generate an autonomous vehicle road navigation model, or an update to the model. Server 2330 may transmit the autonomous vehicle road navigation model or the update to the model to the vehicles that transmitted data to server 2330. Server 2330 may transmit the autonomous vehicle road navigation model or the update to the model to other vehicles that travel on road segment 2300 at later times.

As vehicles 2305-2325 travel on road segment 2300, navigation information collected (e.g., detected, sensed, or measured) by vehicles 2305-2325 may be transmitted to server 2330. In some embodiments, the navigation information may be associated with the common road segment 2300. The navigation information may include a trajectory associated with each of the vehicles 2305-2325 as each vehicle travels over road segment 2300. In some embodiments, the trajectory may be reconstructed based on data sensed by various sensors and devices provided on vehicle 2305. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 2305 sensed by a speed sensor. In addition, in some embodiments, the trajectory may be determined (e.g., by a processor onboard each of vehicles 2305-2325) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 2305 may be determined by a processor provided aboard vehicle 2305 and transmitted to server 2330. In other embodiments, server 2330 may receive data sensed by the various sensors and devices provided in vehicle 2305, and determine the trajectory based on the data received from vehicle 2305.

In some embodiments, the navigation information transmitted from vehicles 2305-2325 to server 2330 may include data regarding the road geometry or profile. The geometry of road segment 2300 may include lane structure and/or landmarks. The lane structure may include the total number of lanes of road segment 2300, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 2330 may store the navigation information on a non-transitory computer-readable medium, such as a hard drive, a compact disc, a tape, a memory, etc. Server 2330 may generate (e.g., through a processor included in server 2330) at least a portion of an autonomous vehicle road navigation model for the common road segment 2300 based on the navigation information received from the plurality of vehicles 2305-2325. Server 2330 may determine a trajectory associated with each lane based on crowd sourced data (e.g., navigation information) received from multiple vehicles (e.g., 2305-2325) that travel on a lane of road segment at different times. Server 2330 may generate the autonomous vehicle road navigation model or a portion of the model (e.g., an updated portion) based on a plurality of trajectories determined based on the crowd sourced navigation data. Server 2330 may transmit the model or the updated portion of the model to one or more of autonomous vehicles 2305-2325 traveling on road segment 2300 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 2300.

In some embodiments, the autonomous vehicle road navigation model may be included in a sparse map (e.g., sparse map 1900 depicted in FIG. 19). Sparse map 1900 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 1900, and may use map data from sparse map 1900 when the model is executed for navigation. In some embodiments, the autonomous vehicle road navigation model may use map data included in sparse map 1900 for determining target trajectories along road segment 2300 for guiding autonomous navigation of autonomous vehicles 2305-2325 or other vehicles that later travel along road segment 2300. For example, when the autonomous vehicle road navigation model is executed by a processor included in a navigation system of vehicle 2305, the model may cause the processor to compare the trajectories determined based on the navigation information received from vehicle 2305 with predetermined trajectories included in sparse map 1900 to validate and/or correct the current traveling course of vehicle 2305.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 2300) or a lane of the road segment 2300.

The autonomous vehicle road navigation model may include other information, such as identification of at least one landmark along road segment 2300. The landmark may be visible within a field of view of a camera (e.g., camera 122) installed on each of vehicles 2305-2325. In some embodiments, camera 122 may capture an image of a landmark. A processor (e.g., processor 180, 190, or processing unit 110) provided on vehicle 2305 may process the image of the landmark to extract identification information for the landmark. The landmark identification information, rather than an actual image of the landmark, may be stored in sparse map 1900. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 1900.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 2305-2325. In some embodiments, the position of the landmark may be determined by averaging the position measurements detected, collected, or received by sensor systems on different vehicles 1205-1225 through multiple drives. For example, vehicles 2305-2325 may transmit position measurements data to server 2330, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 2305) may estimate the physical size of the landmark based on the analysis of the images. Server 2330 may receive multiple estimates of the physical size of the same landmark from different vehicles over different drives. Server 2330 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time. When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega^2+f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 24:
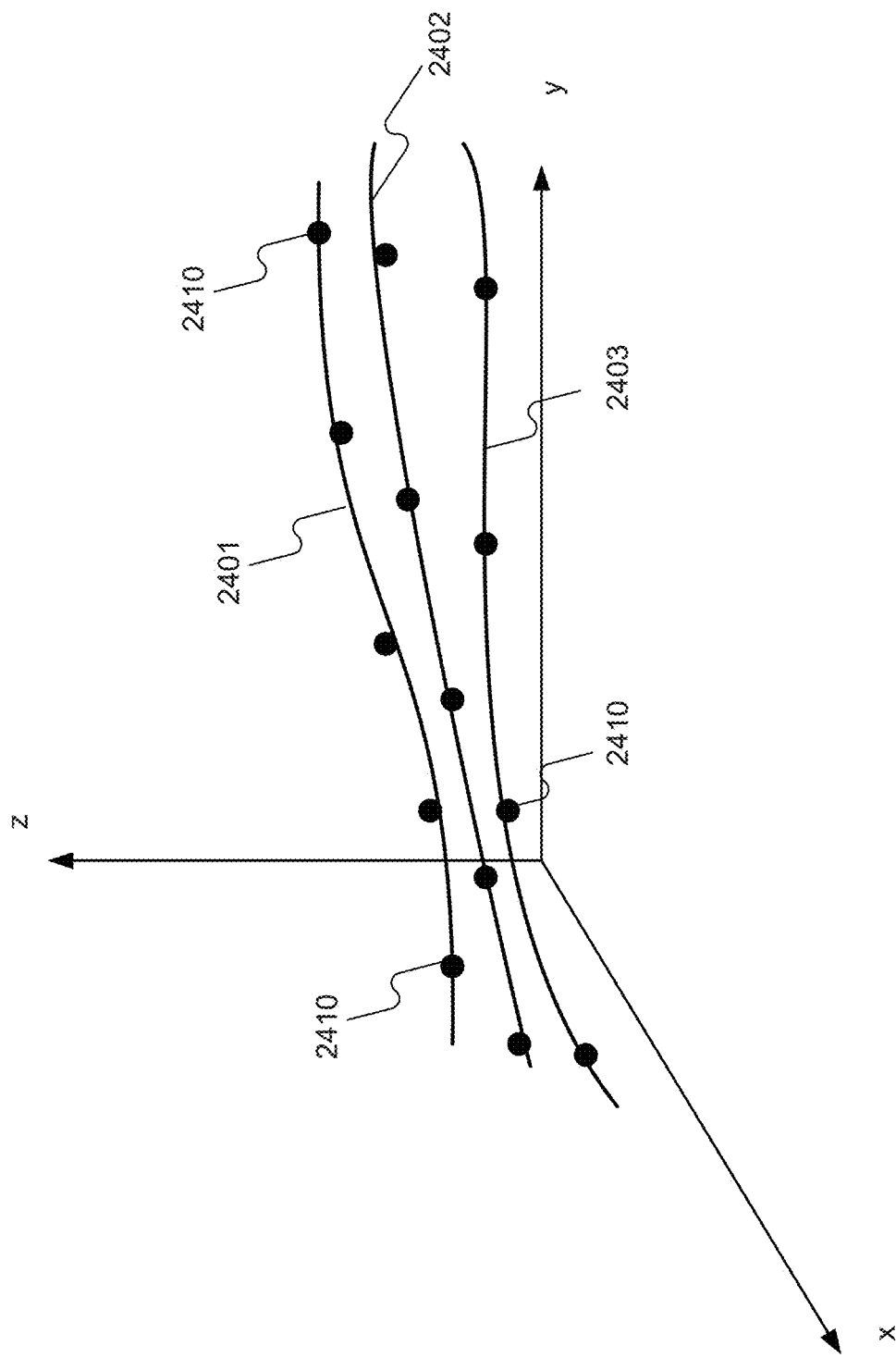
FIG. 24 illustrates an example autonomous vehicle road navigation model represented by a plurality of three dimensional splines, consistent with the disclosed embodiments.

FIG. 24 illustrates an example autonomous vehicle road navigation model represented by a plurality of three dimensional splines 2401, 2402, and 2403. The curves 2401-2403 shown in FIG. 24 are for illustration purpose only. Each spline may include one or more three dimensional polynomials connecting a plurality of data points 2410. Each polynomial may be a first order polynomial, a second order polynomial, a third order polynomial, or a combination of any suitable polynomials having different orders. Each data point 2410 may be associated with the navigation information received from vehicles 2405-2425. In some embodiments, each data point 2410 may be associated with data related to landmarks (e.g., size, location, and identification information of landmarks) and/or road signature profiles (e.g., road geometry, road roughness profile, road curvature profile, road width profile). In some embodiments, some data points 2410 may be associated with data related to landmarks, and others may be associated with data related to road signature profiles.

Figure 25:
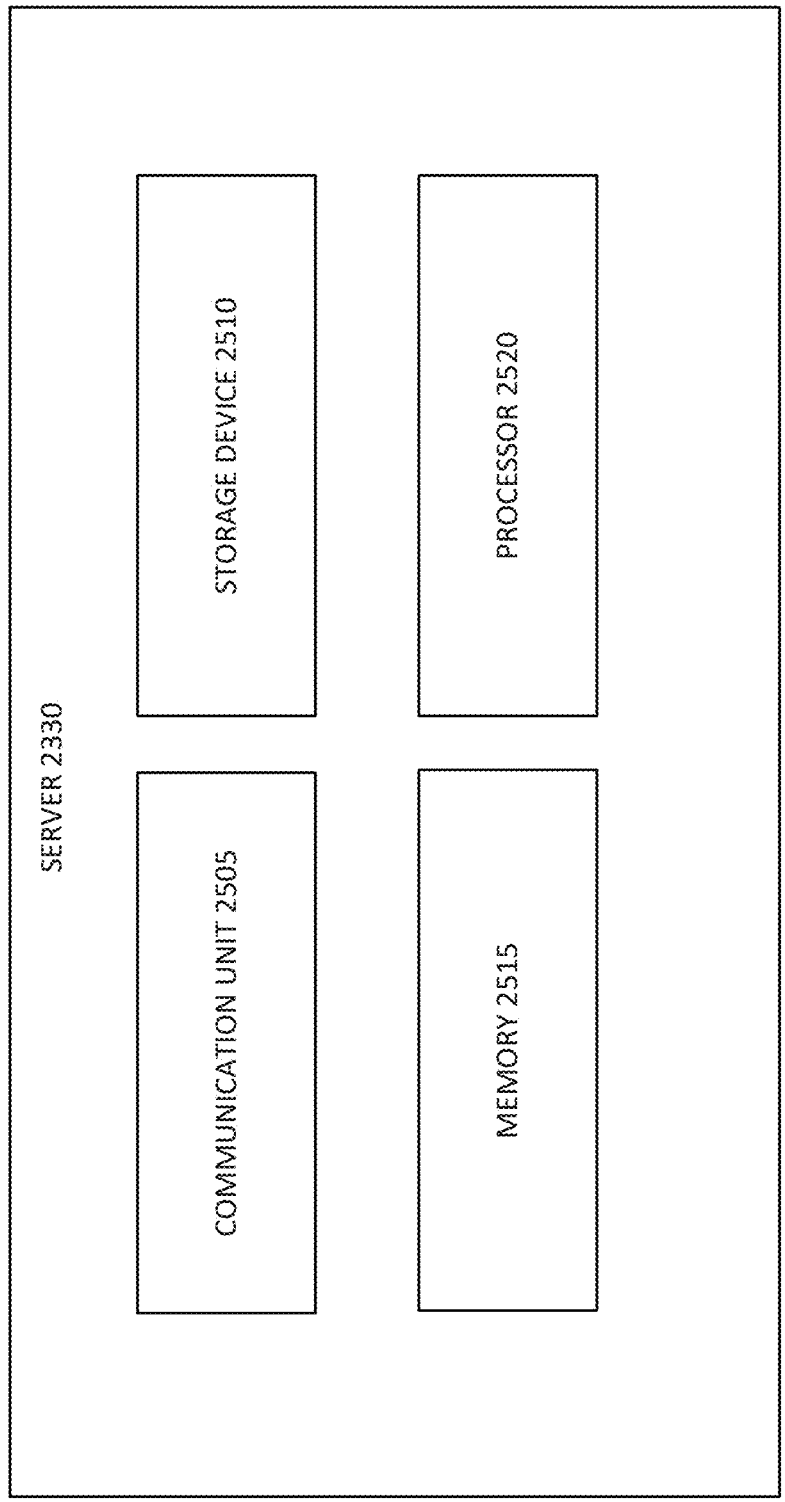
FIG. 25 illustrates a block diagram of a server consistent with the disclosed embodiments.

FIG. 25 illustrates a block diagram of server 2330. Server 2330 may include a communication unit 2505, which may include both hardware components (e.g., communication control circuits, switches, and antenna), and software components (e.g., communication protocols, computer codes). Server 2330 may communicate with vehicles 2305-2325 through communication unit 2505. For example, server 2330 may receive, through communication unit 2505, navigation information transmitted from vehicles 2305-2325. Server 2330 may distribute, through communication unit 2505, the autonomous vehicle road navigation model to one or more autonomous vehicles.

Server 2330 may include one or more storage devices 2510, such as a hard drive, a compact disc, a tape, etc. Storage device 2510 may be configured to store data, such as navigation information received from vehicles 2305-2325 and/or the autonomous vehicle road navigation model that server 2330 generates based on the navigation information. Storage device 2510 may be configured to store any other information, such as a sparse map (e.g., sparse map 1900 discussed in connection with FIG. 19).

In addition to or in place of storage device 2510, server 2330 may include a memory 2515. Memory 2515 may be similar to or different from memory 140 or 150. Memory 2515 may be a non-transitory memory, such as a flash memory, a random access memory, etc. Memory 2515 may be configured to store data, such as computer codes or instructions executable by a processor (e.g., processor 2520), map data (e.g., data of sparse map 1900), the autonomous vehicle road navigation model, and/or navigation information received from vehicles 2305-2325.

Server 2330 may include a processor 2520 configured to execute computer codes or instructions stored in memory 2515 to perform various functions. For example, processor 2520 may analyze the navigation information received from vehicles 2305-2325, and generate the autonomous vehicle road navigation model based on the analysis. Processor 2520 may control communication unit 2505 to distribute the autonomous vehicle road navigation model to one or more autonomous vehicles (e.g., one or more of vehicles 2305-2325 or any vehicle that travels on road segment 2300 at a later time). Processor 2520 may be similar to or different from processor 180, 190, or processing unit 110.

Figure 26:
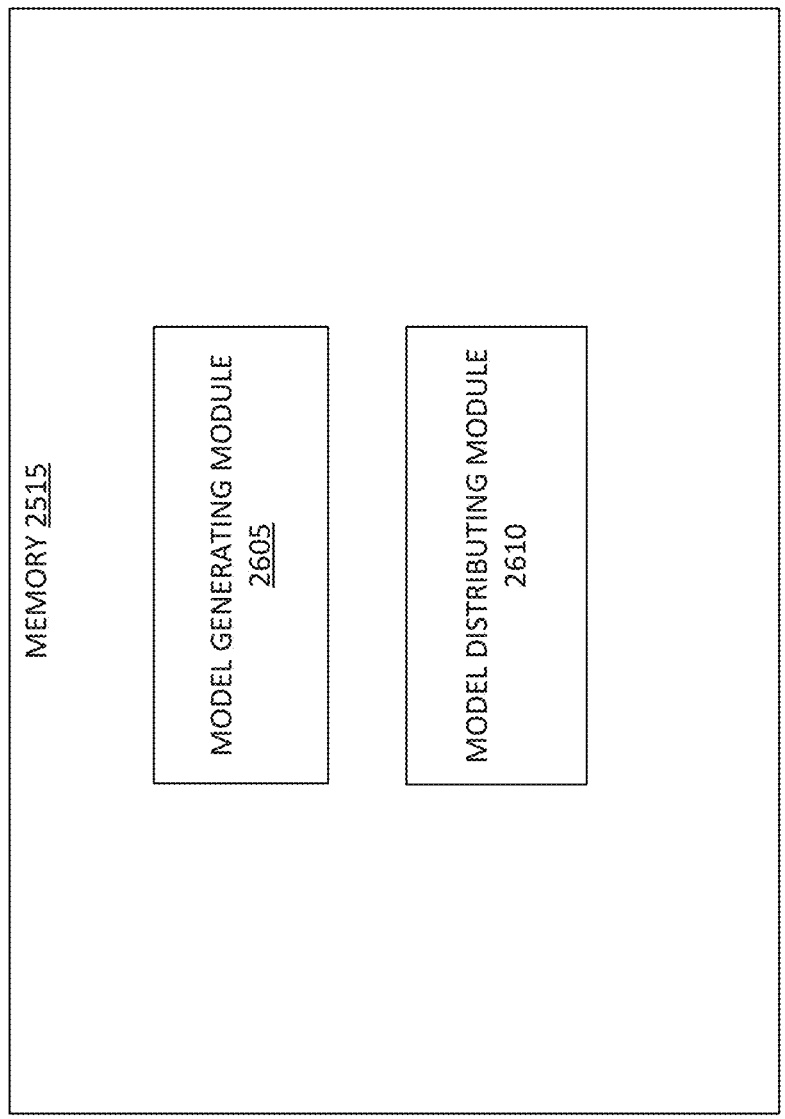
FIG. 26 illustrates a block diagram of a memory consistent with the disclosed embodiments.

FIG. 26 illustrates a block diagram of memory 2515, which may store computer codes or instructions for performing one or more operations for processing vehicle navigation information for use in autonomous vehicle navigation. As shown in FIG. 26, memory 2515 may store one or more modules for performing the operations for processing vehicle navigation information. For example, memory 2515 may include a model generating module 2605 and a model distributing module 2610. Processor 2520 may execute the instructions stored in any of modules 2605 and 2610 included in memory 2515.

Model generating module 2605 may store instructions which, when executed by processor 2520, may generate at least a portion of an autonomous vehicle road navigation model for a common road segment (e.g., road segment 2300) based on navigation information received from vehicles 2305-2425. For example, in generating the autonomous vehicle road navigation model, processor 2520 may cluster vehicle trajectories along the common road segment 2300 into different clusters. Processor 2520 may determine a target trajectory along the common road segment 2300 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 2300. The autonomous vehicle road navigation model may include a plurality of target trajectories each associated with a separate lane of the common road segment 2300. In some embodiments, the target trajectory may be associated with the common road segment 2300 instead of a single lane of the road segment 2300. The target trajectory may be represented by a three dimensional spline. In some embodiments, the spline may be defined by less than 10 kilobytes per kilometer, less than 20 kilobytes per kilometer, less than 100 kilobytes per kilometer, less than 1 megabyte per kilometer, or any other suitable storage size per kilometer.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 2330. Various vehicles travelling along the same road segment at multiple drives may have different trajectories. Server 2330 may identify routes or trajectories associated with each lane from the trajectories received from vehicles through a clustering process.

FIG. 27 illustrates a process of clustering vehicle trajectories associated with vehicles 2305-2325 for determining a target trajectory for the common road segment (e.g., road segment 2300). The target trajectory or a plurality of target trajectories determined from the clustering process may be included in the autonomous vehicle road navigation model or sparse map 1900. In some embodiments, vehicles 2305-2325 traveling along road segment 2300 may transmit a plurality of trajectories 2700 to server 2330. In some embodiments, server 2330 may generate trajectories based on landmark, road geometry, and vehicle motion information received from vehicles 2305-2325. To generate the autonomous vehicle road navigation model, server 2330 may cluster vehicle trajectories 2700 into a plurality of clusters 2705-2730, as shown in FIG. 27.

Clustering may be performed using various criteria. In some embodiments, all drives in a cluster may be similar with respect to the absolute heading along the road segment 2300. The absolute heading may be obtained from GPS signals received by vehicles 2305-2325. In some embodiments, the absolute heading may be obtained using dead reckoning. Dead reckoning, as one of skill in the art would understand, may be used to determine the current position and hence heading of vehicles 2305-2325 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 2300. Trajectories clustered by lane assignment may be useful for identifying lanes along the roadways. In some embodiments, both criteria (e.g., absolute heading and lane assignment) may be used for clustering.

In each cluster 2705-2730, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 2330 may select a reference frame of an arbitrary trajectory C0. For all other trajectories (C1, ..., Cn), server 2330 may find a rigid transformation that maps Ci to C0, where i=1, 2, ..., n, where n is a positive integer number, corresponding to the total number of trajectories included in the cluster. Server 2330 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 2330 may select a reference frame of an arbitrary lane. Server 2330 may map partially overlapping lanes to the selected reference frame. Server 2330 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of a road segment 2300 may be associated with a target trajectory and certain landmarks. The target trajectory or a plurality of such target trajectories may be included in the autonomous vehicle road navigation model, which may be used later by other autonomous vehicles travelling along the same road segment 2300. Landmarks identified by vehicles 2305-2325 while the vehicles travel along road segment 2300 may be recorded in association with the target trajectory. The data of the target trajectories and landmarks may be continuously or periodically updated with new data received from other vehicles in subsequent drives.

For localization of an autonomous vehicle, the disclosed systems and methods may use an extended Kalman filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 1900. The known landmark may have a known location (e.g., GPS data) along a target trajectory stored in the road model and/or sparse map 1900. Based on the current speed and images of the landmark, the distance from the vehicle to the landmark may be estimated. The location of the vehicle along a target trajectory may be adjusted based on the distance to the landmark and the landmark's known location (stored in the road model or sparse map 1900). The landmark's position/location data (e.g., mean values from multiple drives) stored in the road model and/or sparse map 1900 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 seconds ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 28:
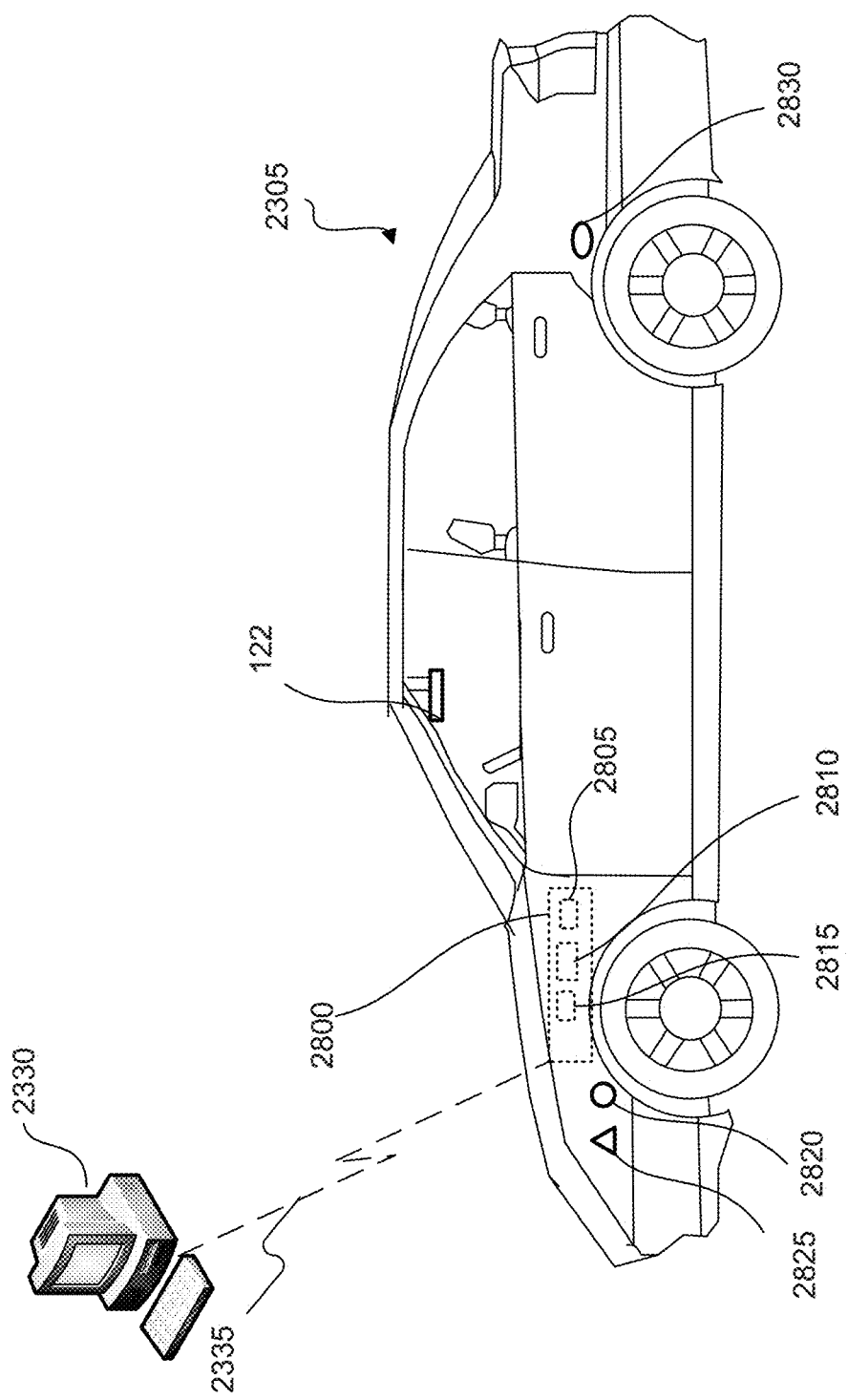
FIG. 28 illustrates a navigation system for a vehicle, which may be used for autonomous navigation, consistent with the disclosed embodiments.

FIG. 28 illustrates a navigation system for a vehicle, which may be used for autonomous navigation. For illustration, the vehicle is referenced as vehicle 2305. The vehicle shown in FIG. 28 may be any other vehicle disclosed herein, including, for example, vehicles 2310, 2315, 2320, and 2325, as well as vehicle 200 shown in other embodiments. As shown in FIG. 28, vehicle 2305 may communicate with server 2330. Vehicle 2305 may include an image capture device 122 (e.g., camera 122). Vehicle 2305 may include a navigation system 2800 configured for providing navigation guidance for vehicle 2305 to travel on a road (e.g., road segment 2300). Vehicle 2305 may also include other sensors, such as a speed sensor 2820 and an accelerometer 2825. Speed sensor 2820 may be configured to detect the speed of vehicle 2305. Accelerometer 2825 may be configured to detect an acceleration or deceleration of vehicle 2305. Vehicle 2305 shown in FIG. 28 may be an autonomous vehicle, and the navigation system 2800 may be used for providing navigation guidance for autonomous driving. Alternatively, vehicle 2305 may also be a non-autonomous, human-controlled vehicle, and navigation system 2800 may still be used for providing navigation guidance.

Navigation system 2800 may include a communication unit 2805 configured to communicate with server 2330 through communication path 2335. Navigation system 2800 may include a GPS unit 2810 configured to receive and process GPS signals. Navigation system 2800 may include at least one processor 2815 configured to process data, such as GPS signals, map data from sparse map 1900 (which may be stored on a storage device provided onboard vehicle 2305 or received from server 2330), road geometry sensed by a road profile sensor 2830, images captured by camera 122, and/or autonomous vehicle road navigation model received from server 2330. The road profile sensor 2830 may include different types of devices for measuring different types of road profile, such as road surface roughness, road width, road elevation, road curvature, etc. For example, the road profile sensor 2830 may include a device that measures the motion of a suspension of vehicle 2305 to derive the road roughness profile. In some embodiments, the road profile sensor 2830 may include radar sensors to measure the distance from vehicle 2305 to road sides (e.g., barrier on the road sides), thereby measuring the width of the road. In some embodiments, the road profile sensor 2830 may include a device configured for measuring the up and down elevation of the road. In some embodiment, the road profile sensor 2830 may include a device configured to measure the road curvature. For example, a camera (e.g., camera 122 or another camera) may be used to capture images of the road showing road curvatures. Vehicle 2305 may use such images to detect road curvatures.

The at least one processor 2815 may be programmed to receive, from camera 122, at least one environmental image associated with vehicle 2305. The at least one processor 2815 may analyze the at least one environmental image to determine navigation information related to the vehicle 2305. The navigation information may include a trajectory related to the travel of vehicle 2305 along road segment 2300. The at least one processor 2815 may determine the trajectory based on motions of camera 122 (and hence the vehicle), such as three dimensional translation and three dimensional rotational motions. In some embodiments, the at least one processor 2815 may determine the translation and rotational motions of camera 122 based on analysis of a plurality of images acquired by camera 122. In some embodiments, the navigation information may include lane assignment information (e.g., in which lane vehicle 2305 is travelling along road segment 2300). The navigation information transmitted from vehicle 2305 to server 2330 may be used by server 2330 to generate and/or update an autonomous vehicle road navigation model, which may be transmitted back from server 2330 to vehicle 2305 for providing autonomous navigation guidance for vehicle 2305.

The at least one processor 2815 may also be programmed to transmit the navigation information from vehicle 2305 to server 2330. In some embodiments, the navigation information may be transmitted to server 2330 along with road information. The road location information may include at least one of the GPS signal received by the GPS unit 2810, landmark information, road geometry, lane information, etc. The at least one processor 2815 may receive, from server 2330, the autonomous vehicle road navigation model or a portion of the model. The autonomous vehicle road navigation model received from server 2330 may include at least one update based on the navigation information transmitted from vehicle 2305 to server 2330. The portion of the model transmitted from server 2330 to vehicle 2305 may include an updated portion of the model. The at least one processor 2815 may cause at least one navigational maneuver (e.g., steering such as making a turn, braking, accelerating, passing another vehicle, etc.) by vehicle 2305 based on the received autonomous vehicle road navigation model or the updated portion of the model.

The at least one processor 2815 may be configured to communicate with various sensors and components included in vehicle 2305, including communication unit 2805, GPS unit 2810, camera 122, speed sensor 2820, accelerometer 2825, and road profile sensor 2830. The at least one processor 2815 may collect information or data from various sensors and components, and transmit the information or data to server 2330 through communication unit 2805. Alternatively or additionally, various sensors or components of vehicle 2305 may also communicate with server 2330 and transmit data or information collected by the sensors or components to server 2330.

In some embodiments, vehicles 2305-2325 may communicate with each other, and may share navigation information with each other, such that at least one of the vehicles 2305-2325 may generate the autonomous vehicle road navigation model based on information shared by other vehicles. In some embodiments, vehicles 2305-2325 may share navigation information with each other and each vehicle may update its own the autonomous vehicle road navigation model provided in the vehicle. In some embodiments, at least one of the vehicles 2305-2325 (e.g., vehicle 2305) may function as a hub vehicle. The at least one processor 2815 of the hub vehicle (e.g., vehicle 2305) may perform some or all of the functions performed by server 2330. For example, the at least one processor 2815 of the hub vehicle may communicate with other vehicles and receive navigation information from other vehicles. The at least one processor 2815 of the hub vehicle may generate the autonomous vehicle road navigation model or an update to the model based on the shared information received from other vehicles. The at least one processor 2815 of the hub vehicle may transmit the autonomous vehicle road navigation model or the update to the model to other vehicles for providing autonomous navigation guidance.

Figure 29:
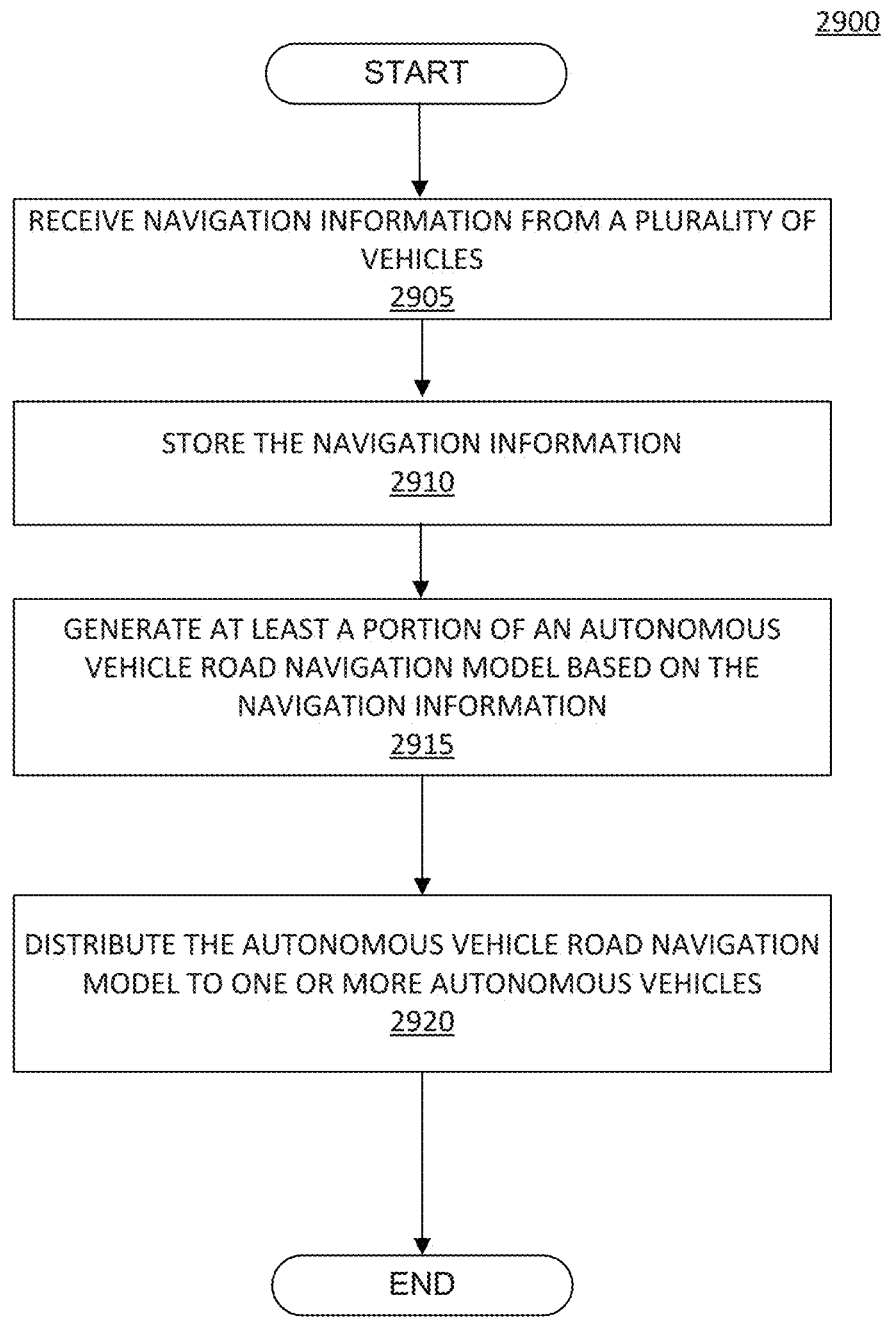
FIG. 29 is a flowchart showing an example process for processing vehicle navigation information for use in autonomous vehicle navigation, consistent with the disclosed embodiments.

FIG. 29 is a flowchart showing an example process 2900 for processing vehicle navigation information for use in autonomous vehicle navigation. Process 2900 may be performed by server 2330 or processor 2815 included in a hub vehicle. In some embodiments, process 2900 may be used for aggregating vehicle navigation information to provide an autonomous vehicle road navigation model or to update the model. Process 2900 may include receiving navigation information from a plurality of vehicles (step 2905). For example, server 2330 may receive the navigation information from vehicles 23205-2325. The navigation information may be associated with a common road segment (e.g., road segment 2300) along which the vehicles 2305-2325 travel. Process 2900 may include storing the navigation information associated with the common road segment (step 2910). For example, server 2330 may store the navigation information in storage device 2510 and/or memory 2515. Process 2900 may include generating at least a portion of an autonomous vehicle road navigation model based on the navigation information (step 2915). For example, server 2330 may generate at least a portion of the autonomous vehicle road navigation model for common road segment 2300 based on the navigation information received from vehicles 2305-2325 that travel on the common road segment 2300. Process 2900 may further include distributing the autonomous vehicle road navigation model to one or more autonomous vehicles (step 2920). For example, server 2330 may distribute the autonomous vehicle road navigation model or a portion (e.g., an update) of the model to vehicles 2305-2325, or any other vehicles later travel on road segment 2300 for use in autonomously navigating the vehicles along road segment 2300.

Process 2900 may include additional operations or steps. For example, generating the autonomous vehicle road navigation model may include clustering vehicle trajectories received from vehicles 2305-2325 along road segment 2300 into a plurality of clusters. Process 2900 may include determining a target trajectory along common road segment 2300 by averaging the clustered vehicle trajectories in each cluster. Process 2900 may also include associating the target trajectory with a single lane of common road segment 2300. Process 1900 may include determining a three dimensional spline to represent the target trajectory in the autonomous vehicle road navigation model.

Figure 30:
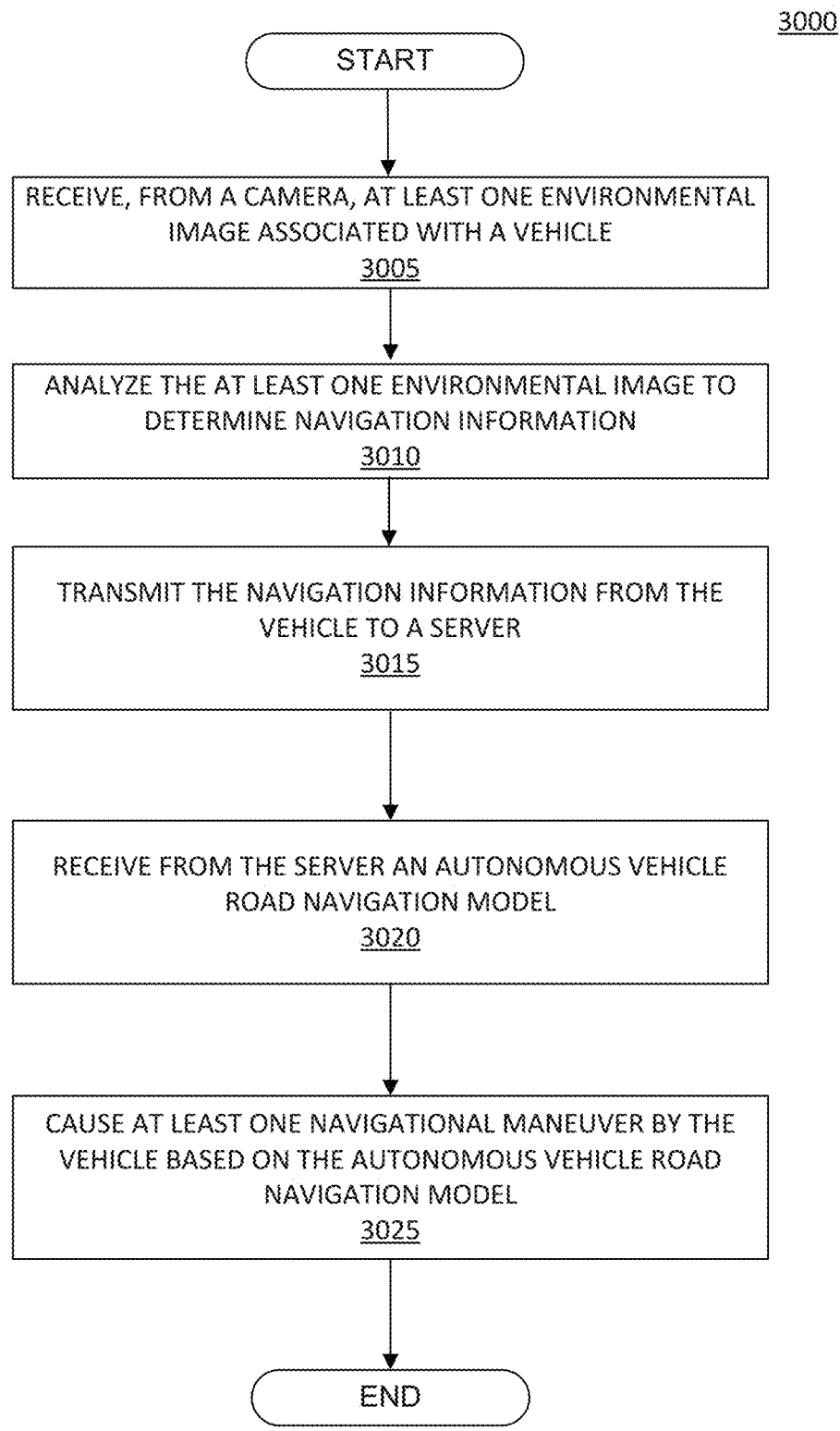
FIG. 30 is a flowchart showing an example process performed by a navigation system of a vehicle, consistent with the disclosed embodiments.

FIG. 30 is a flowchart showing an example process 3000 performed by a navigation system of a vehicle. Process 3000 may be performed by processor 2815 included in navigation system 2800. Process 3000 may include receiving, from a camera, at least one environmental image associated with the vehicle (step 3005). For example, processor 2815 may receive, from camera 122, at least one environmental image associated with vehicle 2305. Camera 122 may capture one or more images of the environment surrounding vehicle 2305 as vehicle 2305 travels along road segment 2300. Process 3000 may include analyzing the at least one environmental image to determine navigation information related to the vehicle (step 3010). For example, processor 2815 may analyze the environmental images received from camera 122 to determine navigation information, such as a trajectory of travel along road segment 2300. Processor 2815 may determine the trajectory of travel of vehicle 2305 based on camera ego motions (e.g., three dimensional translation and/or three dimensional rotational motions) sensed by, e.g., the analysis of the images.

Process 3000 may include transmitting the navigation information from the vehicle to a server (step 3015). In some embodiments, the navigation information may be transmitted along with road information from the vehicle to server 2330. For example, processor 2815 may transmit, via communication unit 2805, the navigation information along with road information, such as the lane assignment, road geometry, from vehicle 2305 to server 2330. Process 3000 may include receiving from the server an autonomous vehicle road navigation model or a portion of the model (step 3020). For example, processor 2815 may receive the autonomous vehicle road navigation model or a portion of the model from server 2330. The model or the portion of the model may include at least one update to the model based on the navigation information transmitted from vehicle 2305. Processor 2815 may update an existing model provided in navigation system 2800 of vehicle 2305. Process 3000 may include causing at least one navigational maneuver by the vehicle based on the autonomous vehicle road navigation model (step 3025). For example, processor 2815 may cause vehicle 2305 to steer, make a turn, change lanes, accelerate, brake, stop, etc. Processor 2815 may send signals to at least one of throttling system 220, braking system 230, and steering system 240 to cause vehicle 2305 to perform the navigational maneuver.

Process 3000 may include other operations or steps performed by processor 2815. For example, the navigation information may include a target trajectory for vehicles to travel along a road segment, and process 3000 may include clustering, by processor 2815, vehicle trajectories related to multiple vehicles travelling on the road segment and determining the target trajectory based on the clustered vehicle trajectories. Clustering vehicle trajectories may include clustering, by processor 2815, the multiple trajectories related to the vehicles travelling on the road segment into a plurality of clusters based on at least one of the absolute heading of vehicles or lane assignment of the vehicles. Generating the target trajectory may include averaging, by processor 2815, the clustered trajectories. Other processes or steps performed by server 2330, as described above, may also be included in process 3000.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle must know its position and orientation relative to the map. It seems natural to use a GPS device on board, in order to position the vehicle on the map and in order to find the rotation transformation between the body reference frame and the world reference frame (say, North, East and Down). Once the body reference frame is aligned with the map reference frame, then the desired route may be expressed in the body reference frame and the steering commands may be computed or generated.

However, one possible issue with this strategy is that current GPS technology does not usually provide the body location and pose with sufficient accuracy and availability. To overcome this problem, it has been proposed to use landmarks whose world coordinates are known. The idea is to construct very detailed maps (called High Definition or HD maps), that contain landmarks of different kinds. The assumption is that the vehicle is equipped with a sensor that can detect and locate the landmarks in its own reference frame. Once the relative position between the vehicle and the landmarks is found, the landmarks' world coordinates are taken from the HD map, and the vehicle can use them to compute its own location and pose.

This method is still using the global world coordinate system as a mediator that establishes the alignment between the map and the body reference frames. Namely, the landmarks are used to compensate for the limitations of the GPS device onboard the vehicles. The landmarks, together with an HD map, may enable to compute the precise vehicle pose in global coordinates, and hence the map-body alignment problem is solved.

In the disclosed systems and methods, instead of using one global map of the world, many map pieces or local maps may be used for autonomous navigation. Each piece of a map or each local map may define its own coordinate frame. These coordinate frames may be arbitrary. The vehicle's coordinates in the local maps may not need to indicate where the vehicle is located on the surface of earth. Moreover, the local maps may not be required to be accurate over large scales, meaning there may be no rigid transformation that can embed a local map in the global world coordinate system.

There are two main processes associated with this representation of the world, one relates to the generation of the maps and the other relates to using them. With respect to maps generation, this type of representation may be created and maintained by crowd sourcing. There may be no need to apply sophisticated survey equipment, because the use of HD maps is limited, and hence crowd sourcing becomes feasible. With respect to usage, an efficient method to align the local map with the body reference frame without going through a standard world coordinate system may be employed. Hence there may be no need, at least in most scenarios and circumstances, to have a precise estimation of the vehicle location and pose in global coordinates. The memory footprint of the local maps may be kept very small.

The principle underlying the maps generation is the integration of ego motion. The vehicles sense the motion of the camera in space (3D translation and 3D rotation). The vehicles or the server may reconstruct the trajectory of the vehicle by integration of ego motion over time, and this integrated path may be used as a model for the road geometry. This process may be combined with sensing of close range lane marks, and then the reconstructed route may reflect the path that a vehicle should follow, and not the particular path that it did follow. In other words, the reconstructed route or trajectory may be modified based on the sensed data relating to close range lane marks, and the modified reconstructed trajectory may be used as a recommended trajectory or target trajectory, which may be saved in the road model or sparse map for use by other vehicles navigating the same road segment.

In some embodiments, the map coordinate system may be arbitrary. A camera reference frame may be selected at an arbitrary time, and used as the map origin. The integrated trajectory of the camera may be expressed in the coordinate system of that particular chosen frame. The value of the route coordinates in the map may not directly represent a location on earth.

The integrated path may accumulate errors. This may be due to the fact that the sensing of the ego motion may not be absolutely accurate. The result of the accumulated error is that the local map may diverge, and the local map may not be regarded as a local copy of the global map. The larger the size of the local map piece, the larger the deviation from the "true" geometry on earth.

The arbitrariness and the divergence of the local maps may not be a design principle but rather may be a consequence. These properties may be a consequence of the integration method, which may be applied in order to construct the maps in a crowd sourcing manner (by vehicles traveling along the roads). However, vehicles may successfully use the local maps for steering.

The proposed map may diverge over long distances. Since the map is used to plan a trajectory in the immediate vicinity of the vehicle, the effect of the divergence may be acceptable. At any time instance, the system (e.g., server 2330 or vehicle 2305) may repeat the alignment procedure, and use the map to predict the road location (in the camera coordinate frame) some 1.3 seconds ahead (or any other seconds, such as 1.5 seconds, 1.0 second, 1.8 seconds, etc.). As long as the accumulated error over that distance is small enough, then the steering command provided for autonomous driving may be used.

In some embodiments, a local map may focus on a local area, and may not cover a too large area. This means that a vehicle that is using a local map for steering in autonomous driving, may arrive at some point to the end of the map and may have to switch to another local piece of map. The switching may be enabled by the local maps overlapping each other. Once the vehicle enters the area that is common to both maps, the system (e.g., server 1230 or vehicle 1205) may continue to generate steering commands based on a first local map (the map that is being used), but at the same time the system may localize the vehicle on the other map (or second local map) that overlaps with the first local map. In other words, the system may simultaneously align the present coordinate frame of the camera both with the coordinate frame of the first map and with the coordinate frame of the second map. When the new alignment is established, the system may switch to the other map and plan the vehicle trajectory there.

The disclosed systems may include additional features, one of which is related to the way the system aligns the coordinate frames of the vehicle and the map. As explained above that landmarks may be used for alignment, assuming the vehicle may measure its relative position to them. This is useful in autonomous driving, but sometimes it may result in a demand for a large number of landmarks and hence a large memory footprint. The disclosed systems may therefore use an alignment procedure that addresses this problem. In the alignment procedure, the system may compute a 1D estimator for the location of the vehicle along the road, using sparse landmarks and integration of ego speed. The system may use the shape of the trajectory itself to compute the rotation part of the alignment, using a tail alignment method discussed in details below in other sections. The idea is that the vehicle reconstructs its own trajectory while driving the "tail" and computes a rotation around its assumed position along the road, in order to align the tail with the map.

In the disclosed systems and methods, a GPS device may still be used. Global coordinates may be used for indexing the database that stores the trajectories and/or landmarks. The relevant piece of local map and the relevant landmarks in the vicinity of the vehicles may be be stored in memory and retrieved from the memory using global GPS coordinates. However, in some embodiments, the global coordinates may not be used for path planning, and may not be accurate. In one example, the usage of global coordinates may be limited for indexing of the information.

In situations where "tail alignment" cannot function well, the system may compute the vehicle's pose using a larger number of landmarks. This may be a rare case, and hence the impact on the memory footprint may be moderate. Road intersections are examples of such situations.

The disclosed systems and methods may use semantic landmarks (e.g., traffic signs), since they can be reliably detected from the scene and matched with the landmarks stored in the road model or sparse map. In some cases the disclosed systems may use non-semantic landmarks (e.g., general purpose signs) as well, and in such cases the non-semantic landmarks may be attached to an appearance signature, as discussed above. The system may use a learning method for the generation of signatures that follows the "same or not-same" recognition paradigm.

For example, given many drives with GPS coordinates along them, the disclosed systems may produce the underlying road structure junctions and road segments. The roads are assumed to be far enough from each other to be able to differentiate them using the GPS. Only a coarse grained map may be needed. To generate the underlying road structure graph, the space may be divided into a lattice of a given resolution (e.g., 50 m by 50 m). Every drive may be seen as an ordered list of lattice sites. The system may color every lattice site belonging to a drive to produce an image of the merged drives. The colored lattice points may be represented as nodes on the merged drives. The drives passing from one node to another may be represented as links. The system may fill small holes in the image, to avoid differentiating lanes and correct for GPS errors. The system may use a suitable thinning algorithm (e.g., an algorithm named "Zhang-Suen" thinning algorithm) to obtain the skeleton of the image. This skeleton may represent the underlying road structure, and junctions may be found using a mask (e.g., a point connected to at least three others). After the junctions are found, the segments may be the skeleton parts that connect them. To match the drives back to the skeleton, the system may use a Hidden Markov Model. Every GPS point may be associated with a lattice site with a probability inverse to its distance from that site. Use a suitable algorithm (e.g., an algorithm named the "Viterbi" algorithm) to match GPS points to lattice sites, while not allowing consecutive GPS points to match to non-neighboring lattice sites.

A plurality of methods may be used for mapping the drives back to the map. For example, a first solution may include keeping track during the thinning process. A second solution may use proximity matching. A third solution may use hidden Markov model. The hidden Markov model assumes an underlying hidden state for every observation, and assigns probabilities for a given observation given the state, and for a state given the previous state. A Viterbi algorithm may be used to find the most probable states given a list of observations.

The disclosed systems and methods may include additional features. For example, the disclosed systems and methods may detect highway entrances/exits. Multiple drives in the same area may be merged using GPS data to the same coordinate system. The system may use visual feature points for mapping and localization.

In some embodiments, generic visual features may be used as landmarks for the purpose of registering the position and orientation of a moving vehicle, in one drive (localization phase), relative to a map generated by vehicles traversing the same stretch of road in previous drives (mapping phase). These vehicles may be equipped with calibrated cameras imaging the vehicle surroundings and GPS receivers. The vehicles may communicate with a central server (e.g., server 1230) that maintains an up-to-date map including these visual landmarks connected to other significant geometric and semantic information (e.g. lane structure, type and position of road signs, type and position of road marks, shape of nearby drivable ground area delineated by the position of physical obstacles, shape of previously driven vehicle path when controlled by human driver, etc.). The total amount of data that may be communicated between the central server and vehicles per length of road is small, both in the mapping and localization phases.

In the mapping phase, the disclosed systems (e.g., vehicles or server) may detect feature points (FPs) and compute their descriptors (e.g. using the FAST/BRISK/ORB detectors and descriptors or a detector/descriptor pair that was trained using the database discussed below).

The system may track FPs between frames in which they appear using their motion in the image plane and by matching their descriptors using e.g. Euclidean or Hamming distance in descriptor space. The system may use tracked FPs to estimate camera motion and world positions of objects on which FPs were detected and tracked. The system may classify FPs as ones that will likely be detected in future drives (e.g. FPs detected on momentarily moving objects, parked cars and shadow texture will likely not reappear in future drives). This reproducibility classification (RC) may be a function of both the intensities in a region of the image pyramid surrounding the detected FP, the motion of the tracked FP in the image plane, the extent of viewpoints in which it was successfully tracked/detected and its relative 3D position. In some embodiments, the vehicles may send representative FP descriptors (computed from a set of observations), estimated 3D position relative to vehicle and momentary vehicle GPS coordinates to server 1230.

During the mapping phase, when communication bandwidth between the mapping vehicles and central server is limited, the vehicles may send FPs to the server at a high frequency when the presence of FPs or other semantic landmarks in the map (such as road signs and lane structure) is limited and insufficient for the purpose of localization. Although vehicles in the mapping phase may send FPs at a low spatial frequency these may be agglomerated in the server. Detection of reoccurring FPs may also be performed by the server and the server may store the set of reoccurring FPs. Visual appearance of landmarks may at least in some cases be sensitive to the time of day or the season in which they were captured. To increase reproducibility probability of FPs, these may be binned by the server into time-of-day and season bins.

The vehicles may send the server other semantic and geometric information in the nearby FP coordinate system (lane shape, structure of road plane, 3D position of obstacles, free space in mapping clip momentary coordinate system, path driven by human driver in a setup drive to a parking location).

In a localization phase, the server may send a map containing landmarks in the form of FP positions and descriptors to vehicles. Feature points (FPs) may be detected and tracked in near real time within a set of current consecutive frames. Tracked FPs may be used to estimate camera motion and world positions of FPs. Currently detected FP descriptors may be searched to match a list of map FPs having GPS coordinates within an estimated finite GPS uncertainty radius from the momentary GPS reading. Matching may be done by searching all pairs of current and mapping FPs that minimize an Euclidean or Hamming distance in descriptor space. Using the FP matches and their current and map positions, rotation and translation between the momentary vehicle position and the local map coordinate system may be registered.

The disclosed systems and methods may include a method for training a reproducibility classifier. Training may be performed in one of the following schemes in order of growing labeling cost and resulting classifier accuracy.

In the first scheme, a database including a large number of clips recorded by vehicle cameras with matching momentary vehicle GPS position may be collected. This database may include a representative sample of drives (with respect to various properties: e.g., time of day, season, weather condition, type of roadway). Feature points (FPs) extracted from frames of different drives at a similar GPS position and heading may be potentially matched within a GPS uncertainty radius. Unmatched FPs may be labeled unreproducible and those matched may be labeled reproducible. A classifier may then be trained to predict the reproducibility label of an FP given its appearance in the image pyramid, its momentary position relative to the vehicle and the extent of viewpoints positions in which it was successfully tracked.

In the second scheme, FP pairs extracted from the clip database described in the first scheme may also be labeled by a human responsible for annotating FP matches between clips.

In a third scheme, a database augmenting that of the first scheme with precise vehicle position, vehicle orientation and image pixel depth using Light Detection and Ranging (LIDAR) measurements may be used to accurately match world positions in different drives. Feature point descriptors may then be computed at the image region corresponding to these world points at different viewpoints and drive times. The classifier may then be trained to predict the average distance in descriptor space a descriptor is located from its matched descriptors. In this case reproducibility may be measured by likely having a low descriptor distance.

Navigation Based on Recognized Landmarks

Consistent with disclosed embodiments, the system may use landmarks, for example, to determine the position of a host vehicle along a path representative of a target road model trajectory (e.g., by identifying an intersection point of a relative direction vector to the landmark with the target road model trajectory). Once this position is determined, a steering direction can be determined by comparing a heading direction to the target road model trajectory at the determined position. Landmarks may include, for example, any identifiable, fixed object in an environment of at least one road segment or any observable characteristic associated with a particular section of the road segment. In some cases, landmarks may include traffic signs (e.g., speed limit signs, hazard signs, etc.). In other cases, landmarks may include road characteristic profiles associated with a particular section of a road segment. In yet other cases, landmarks may include road profiles as sensed, for example, by a suspension sensor of the vehicle. Further examples of various types of landmarks are discussed in previous sections, and some landmark examples are shown in FIG. 10.

Figure 31:
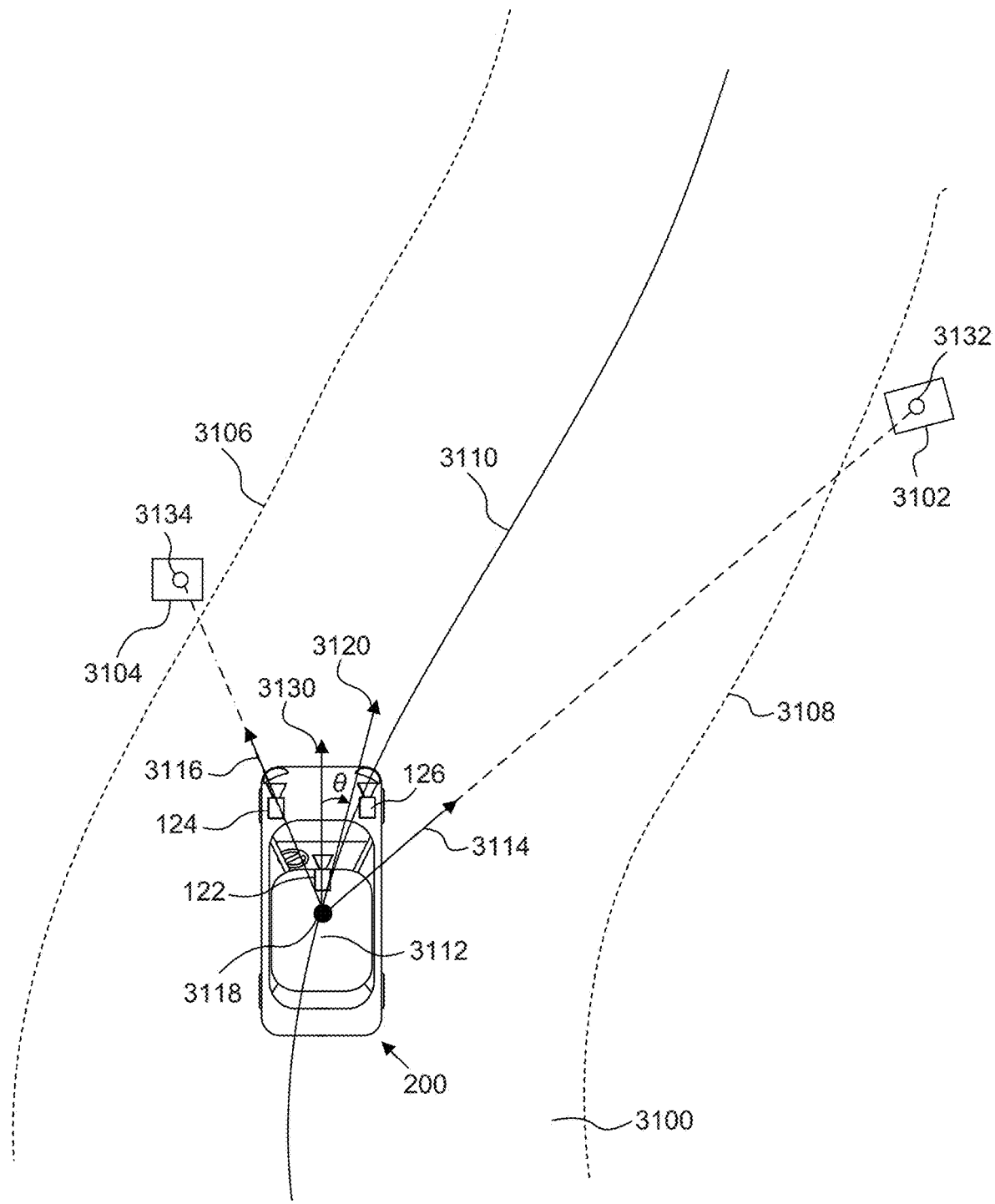
FIG. 31 is a diagrammatic top view representation of an exemplary vehicle including a system consistent with the disclosed embodiments in which the vehicle navigates using a landmark.

FIG. 31 illustrates vehicle 200 (which may be an autonomous vehicle) travelling on road segment 3100 in which the disclosed systems and methods for navigating vehicle 200 using one or more recognized landmarks 3102, 3104 may be used. Although, FIG. 31 depicts vehicle 200 as equipped with image capture devices 122, 124, 126, more or fewer image capture devices may be employed on any particular vehicle 200. As illustrated in FIG. 31, road segment 3100 may be delimited by left side 3106 and right side 3108. A predetermined road model trajectory 3110 may define a preferred path (e.g., a target road model trajectory) within road segment 3100 that vehicle 200 may follow as vehicle 200 travels along road segment 3100. In some exemplary embodiments, predetermined road model trajectory 3110 may be located equidistant from left side 3106 and right side 3108. It is contemplated however that predetermined road model trajectory 3110 may be located nearer to one or the other of left side 3106 and right side 3108 of road segment 3100. Further, although FIG. 31 illustrates one lane in road segment 3100, it is contemplated that road segment 3100 may have any number of lanes. It is also contemplated that vehicle 200 travelling along any lane of road segment 3100 may be navigated using one or more landmarks 3102, 3104 according to the disclosed methods and systems.

Image acquisition unit 120 may be configured to acquire an image representative of an environment of vehicle 200. For example, image acquisition unit 120 may obtain an image showing a view in front of vehicle 200 using one or more of image capture devices 122, 124, 126. Processing unit 110 of vehicle 200 may be configured to detect one or more landmarks 3102, 3104 in the one or more images acquired by image acquisition unit 120. Processing unit 110 may detect the one or more landmarks 3102, 3104 using one or more processes of landmark identification discussed above. Although FIG. 31 illustrates only two landmarks 3102, 3104, it is contemplated that vehicle 200 may detect fewer than or more than landmarks 3102, 3104 based on the images acquired by image acquisition unit 120.

Processing unit 110 may be configured to determine positions 3132, 3134 of the one or more landmarks 3102, 3104, respectively, relative to a current position 3112 of vehicle 200. Processing unit 110 may also be configured to determine a distance between current position 3112 of vehicle 200 and the one or more landmarks 3102, 3104. Further, processing unit 110 may be configured to determine one or more directional indicators 3114, 3116 of the one or more landmarks 3102, 3104 relative to current position 3112 of vehicle 200. Processing unit 110 may be configured to determine directional indicators 3114, 3116 as vectors originating from current position 3112 of vehicle 200 and extending towards, for example, positions 3132, 3134 of landmarks 3102, 3104, respectively.

Processing unit 110 may also be configured to determine an intersection point 3118 of the one or more directional indicators 3114, 116 with predetermined road model trajectory 3110. In one exemplary embodiment as illustrated in FIG. 31, intersection point 3118 may coincide with current position 3112 of vehicle 200. This may occur, for example, when vehicle 200 is located on predetermined road model trajectory 3110. Although generally vehicle 200 may be expected to be located on or very near predetermined road model trajectory 3110, it is contemplated that vehicle 200 may not be located on predetermined road model trajectory 3110 as will be discussed below with respect to FIG. 32.

Processing unit 110 may be configured to determine a direction 3120 of predetermined road model trajectory 3110 at intersection point 3118. Processing unit 110 may determine direction 3120 as a direction tangential to predetermined road model trajectory 3110. In one exemplary embodiment, processing unit 110 may be configured to determine direction 3120 based on a gradient or slope of a three-dimensional polynomial representing predetermined road model trajectory 3110.

Processing unit 110 may also be configured to determine heading direction 3130 of vehicle 200. As illustrated in FIG. 14, heading direction 3130 of vehicle 200 may be a direction along which image capture device 122 may be oriented relative to a local coordinate system associated with vehicle 200. Processing unit 110 may be configured to determine whether heading direction 3130 of vehicle 200 is aligned with (i.e., generally parallel to) direction 3120 of predetermined road model trajectory 3110. When heading direction 3130 is not aligned with direction 3420 of predetermined road model trajectory 3110 at intersection point 3118, processing unit 110 may determine an autonomous steering action such that heading direction 3130 of vehicle 200 may be aligned with direction 3120 of predetermined road model trajectory 3110. In one exemplary embodiment, an autonomous steering action may include, for example, a determination of an angle by which the steering wheel or front wheels of vehicle 200 may be turned to help ensure that heading direction 3130 of vehicle 200 may be aligned with direction 3120 of predetermined road model trajectory 3110. In another exemplary embodiment, an autonomous steering action may also include a reduction or acceleration in a current velocity of vehicle 200 to help ensure that heading direction 3130 of vehicle 200 may be aligned with direction 3120 of predetermined road model trajectory 3110 in a predetermined amount of time. Processing unit 110 may be configured to execute instructions stored in navigational response module 408 to trigger a desired navigational response by, for example, turning the steering wheel of vehicle 200 to achieve a rotation of a predetermined angle. Rotation by the predetermined angle may help align heading direction 3130 of vehicle 200 with direction 3120.

Processing unit 110 may include additional considerations when determining the autonomous steering action. For example, in some exemplary embodiments, processing unit 110 may determine the autonomous steering action based on a kinematic and physical model of the vehicle, which may include the effects of a variety of possible autonomous steering actions on the vehicle or on a user of vehicle 200. Processing unit 110 may implement a selection criteria for selecting at least one autonomous steering action from the plurality of autonomous steering actions. In other exemplary embodiments, processing unit 110 may determine an autonomous steering action based on a "look ahead" operation, which may evaluate portions of road segment 3100 located in front of current location 3118 of vehicle 200. Processing unit 110 may determine an effect of one or more autonomous steering actions on the behavior of vehicle 200 or on a user of vehicle 200 at a location in front of current location 3118, which may be caused by the one or more autonomous steering actions. In yet other exemplary embodiments, processing unit 110 may further account for the presence and behavior of one or more other vehicles in the vicinity of vehicle 200 and a possible (estimated) effect of one or more autonomous steering actions on such one or more other vehicles. Processing unit 110 may implement the additional considerations as overrides. Thus, for example, processing unit 110 may initially determine an autonomous steering action that may help ensure that heading direction 3130 of vehicle 200 may be aligned with direction 3120 of predetermined road model trajectory 3110 at current location 3118. When processing unit 110 determines that the determined autonomous steering does not comply with one or more constraints imposed by the additional considerations, processing unit 110 may modify the autonomous steering action to help ensure that all the constraints may be satisfied.

Image acquisition unit 120 may repeatedly acquire an image of the environment in front of vehicle 200, for example, after a predetermined amount of time. Processing unit 110 may also be configured to repeatedly detect the one or more landmarks 3102, 3104 in the image acquired by image acquisition unit 120 and determine the autonomous steering action as discussed above. Thus, image acquisition unit 120 and processing unit 110 may cooperate to navigate vehicle 200 along road segment 3100 using one or more landmarks 3102, 3104.

Figure 32:
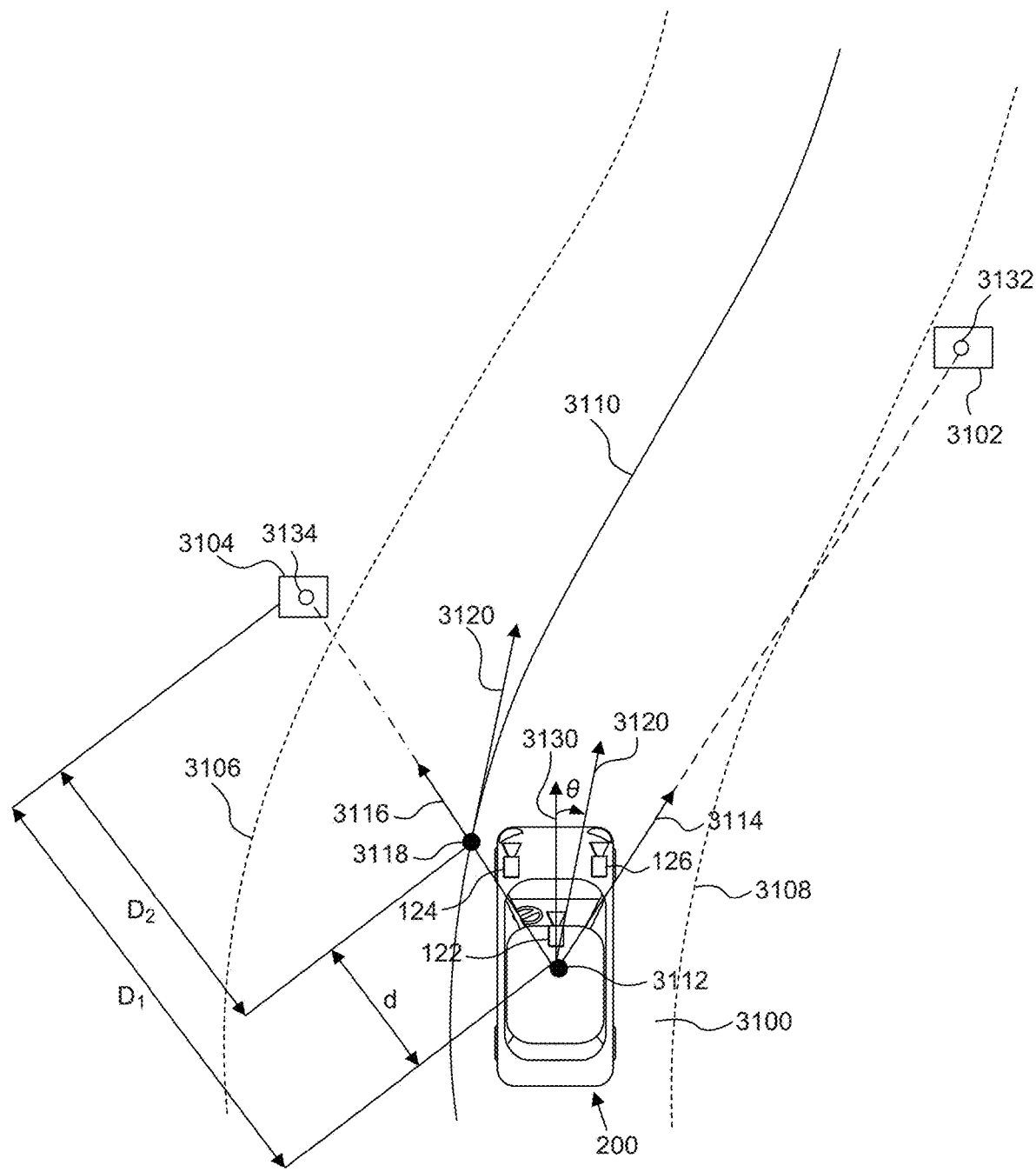
FIG. 32 is another diagrammatic top view representation of an exemplary vehicle including a system consistent with the disclosed embodiments in which the vehicle navigates using a landmark.

FIG. 32 illustrates a vehicle 200 travelling on road segment 3100 in which the disclosed systems and methods for navigating vehicle 200 using one or more recognized landmarks 3102, 3104 may be used. Unlike FIG. 31, vehicle 200 of FIG. 32 is not located on predetermined road model trajectory 3110. As a result, as illustrated in FIG. 32, intersection point 3118 of directional indicator 3116 may not coincide with current position 3212 of vehicle 200.

As discussed above with respect to FIG. 31, processing unit 110 may be configured to determine a direction 3120 of predetermined road model trajectory 3110 at intersection point 3118. Processing unit 110 may also be configured to determine whether heading direction 3130 of vehicle 200 is aligned with (i.e. generally parallel to) direction 3120. When heading direction 3130 is not aligned with direction 3120 of predetermined road model trajectory 3110 at intersection point 3118, processing unit 110 may determine a first autonomous steering action such that heading direction 3130 of vehicle 200 may be aligned with direction 3120 of predetermined road model trajectory 3110. For example, as illustrated in FIG. 32, processing unit 110 may determine the first autonomous steering action to require a rotation by an angle to help ensure that heading direction 3130 of vehicle 200 may be aligned with direction 3120.

In addition, when current position 3112 of vehicle 200 is not located on predetermined road model trajectory 3110, processing unit 110 may determine a second autonomous steering action to help ensure that vehicle 200 may move from current position 3112 to intersection point 3118 on predetermined road model trajectory 3110. For example, as illustrated in FIG. 32, processing unit 110 may determine a distance "d" by which vehicle 200 must be translated to move current position 3112 to coincide with intersection point 3118 on predetermined road model trajectory 3110. Although not illustrated in FIG. 32, processing unit 110 may also be configured to determine a rotation that may be required to help ensure that vehicle 200 may move from current position 3112 to intersection point 3118 on predetermined road model trajectory 3110. Processing unit 110 may be configured to execute instructions stored in navigational response module 408 to trigger a desired navigational response corresponding to the first autonomous steering action, the second autonomous steering action, or some combination of the first and the second autonomous steering actions. In some embodiment, processing unit 110 may execute instructions to trigger a desired navigational response corresponding to the first autonomous steering action and the second autonomous steering action sequentially in any order.

Figure 33:
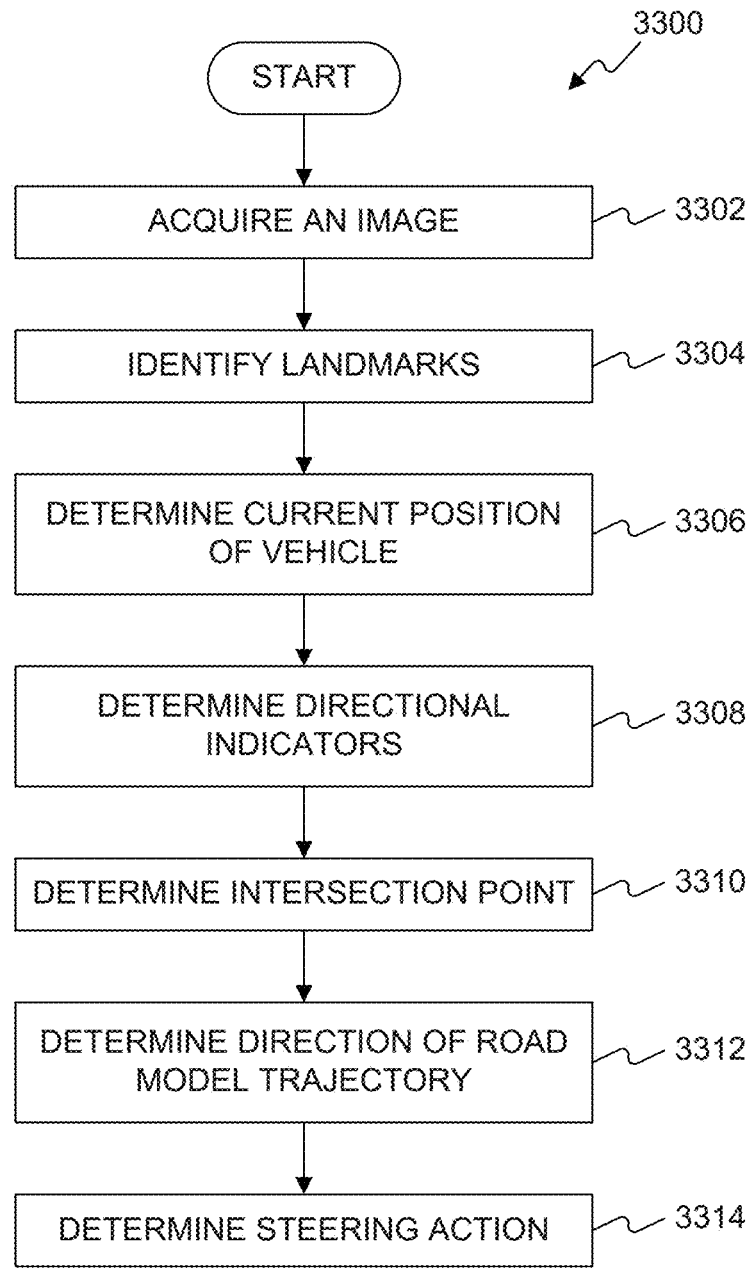
FIG. 33 is a flowchart showing an exemplary process for navigating an exemplary vehicle using a landmark.

FIG. 33 is a flowchart showing an exemplary process 3300, for navigating vehicle 200 along road segment 3100, using one or more landmarks, consistent with disclosed embodiments. Steps of process 3300 may be performed by one or more of processing unit 110 and image acquisition unit 120, with or without the need to access memory 140 or 150. The order and arrangement of steps in process 3300 is provided for purposes of illustration. As will be appreciated from this disclosure, modifications may be made to process 3300 by, for example, adding, combining, removing, and/or rearranging the steps for the process.

Figure 36:
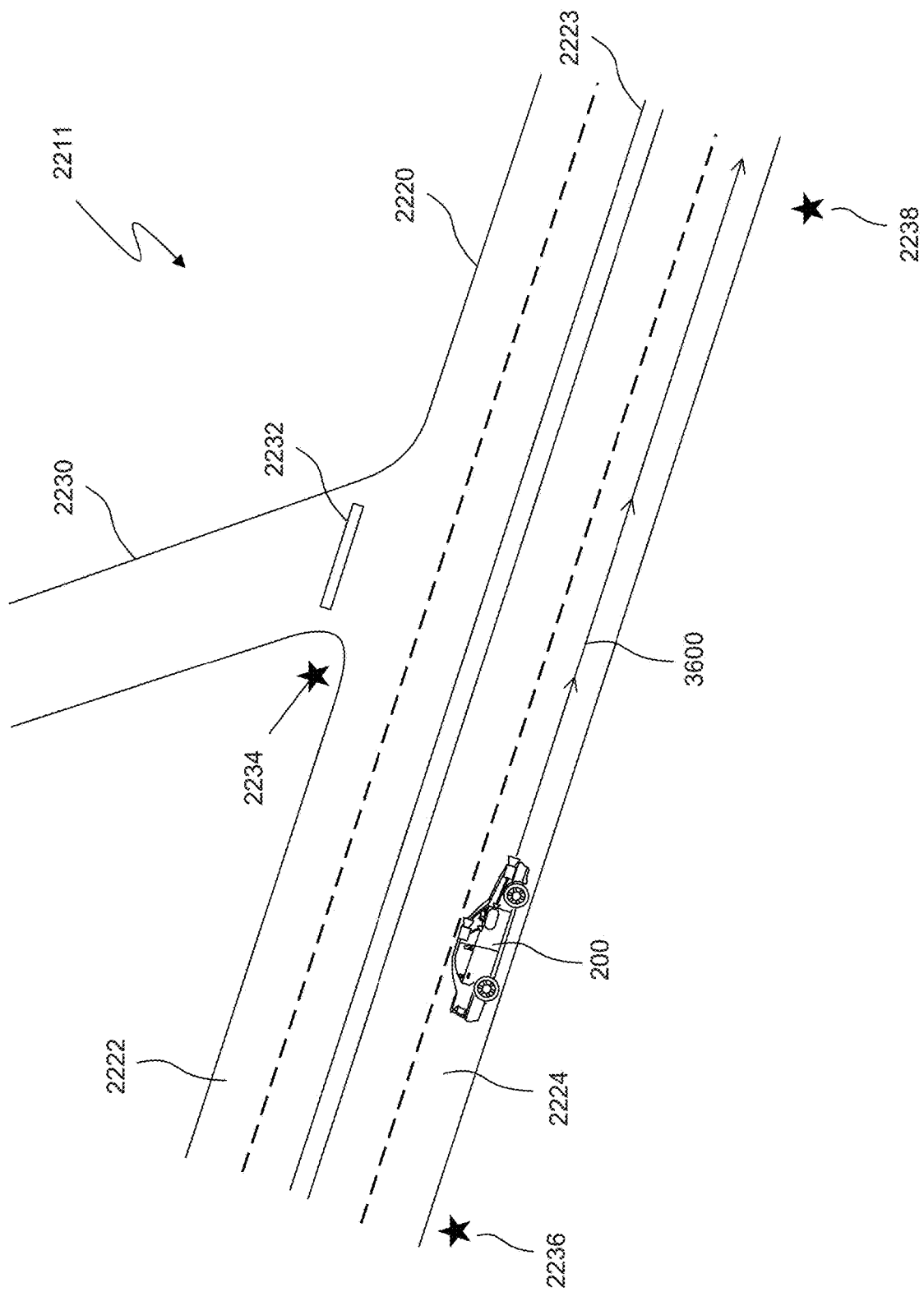
FIG. 36 shows a vehicle navigating using target trajectories along a multi-lane road, consistent with disclosed embodiments.

As illustrated in FIG. 36, process 3300 may include a step 3302 of acquiring an image representative of an environment of the vehicle. In one exemplary embodiment, image acquisition unit 120 may acquire one or more images of an area forward of vehicle 200 (or to the sides or rear of a vehicle, for example). For example, image acquisition unit 120 may obtain an image using image capture device 122 having a field of view 202. In other exemplary embodiments, image acquisition unit 120 may acquire images from one or more image capture devices 122, 124, 126, having fields of view 202, 204, 206. Image acquisition unit 120 may transmit the one or more images to processing unit 110 over a data connection (e.g., digital, wired, USB, wireless, Bluetooth, etc.).

Process 3300 may also include a step 3304 of identifying one or more landmarks 3202, 3204 in the one or more images. Processing unit 110 may receive the one or more images from image acquisition unit 120. Processing unit 110 may execute monocular image analysis module 402 to analyze the plurality of images at step 3304, as described in further detail in connection with FIGS. 5B-5D. By performing the analysis, processing unit 110 may detect a set of features within the set of images, for example, one or more landmarks 3102, 3104. Landmarks 3102, 3104 may include one or more traffic signs, arrow markings, lane markings, dashed lane markings, traffic lights, stop lines, directional signs, reflectors, landmark beacons, lampposts, a change is spacing of lines on the road, signs for businesses, and the like.

In some embodiments, processing unit 110 may execute monocular image analysis module 402 to perform multi-frame analysis on the plurality of images to detect landmarks 3102, 3104. For example, processing unit 110 may estimate camera motion between consecutive image frames and calculate the disparities in pixels between the frames to construct a 3D-map of the road. Processing unit 110 may then use the 3D-map to detect the road surface, as well as landmarks 3102, 3104. In another exemplary embodiment, image processor 190 of processing unit 110 may combine a plurality of images received from image acquisition unit 120 into one or more composite images. Processing unit 110 may use the composite images to detect the one or more landmarks 3102, 3104.

In some embodiments, processing unit 110 may be able to recognize various attributes of objects that may qualify as potential landmarks. This information may be uploaded to a server, for example, remote from the vehicle. The server may process the received information and may establish a new, recognized landmark within sparse data map 1900, for example. It may also be possible for the server to update one or more characteristics (e.g., size, position, etc.) of a recognized landmark already included in sparse data map 1900.

In some cases, processing unit 110 may receive information from a remote server that may aid in locating recognized landmarks (e.g., those landmarks that have already been identified and represented in sparse data map 1900). For example, as a vehicle travels along a particular road segment, processor 110 may access one or more local maps corresponding to the road segment being traversed. The local maps may be part of sparse data map 1900 stored on a server located remotely with respect to the vehicle, and the one or more local maps may be wirelessly downloaded as needed. In some cases, the sparse map 1900 may be stored locally with respect to the navigating vehicle. The local maps may include various features associated with a road segment. For example, the local maps may include a polynomial spline representative of a target trajectory that the vehicle should follow along the road segment. The local maps may also include representations of recognized landmarks. In some cases, as previously described, the recognized landmarks may include information such as a landmark type, position, size, distance to another landmark, or other characteristics. In the case of non-semantic signs (e.g., general signs not necessarily associated with road navigation), for example, the information stored in sparse data map 1900 may include a condensed image signature associated with the non-semantic road sign.

Such information received from sparse data map 1900 may aid processor unit 110 in identifying recognized landmarks along a road segment. For example, processor unit 110 may determine based on its current position (determined, for example, based on GPS data, dead reckoning relative to a last determined position, or any other suitable method) and information included in a local map (e.g., a localized position of the next landmark to be encountered and/or information indicating a distance from the last encountered landmark to the next landmark) that a recognized landmark should be located at a position approximately 95 meters ahead of the vehicle and 10 degrees to the right of a current heading direction. Processor unit 110 may also determine from the information in the local map that the recognized landmark is of a type corresponding to a speed limit sign and that the sign has a rectangular shape of about 2 feet wide by 3 feet tall.

Thus, when processor unit 110 receives images captured by the onboard camera, those images may be analyzed by searching for an object at the expected location of a recognized landmark from sparse map 1900. In the speed limit sign example, processor unit 110 may review captured images and look for a rectangular shape at a position in the image 10 degrees to the right of a heading direction of the vehicle. Further, the processor may look for a rectangular shape occupying a number of pixels of the image that a 2 foot by 3 foot rectangular sign would be expected to occupy at a relative distance of 95 meters. Upon identifying such an object in the image, where expected, the processor may develop a certain confidence level that the expected recognized landmark has been identified. Further confirmation may be obtained, for example, by analyzing the image to determine what text or graphics appear on the sign in the captured images. Through textual or graphics recognition processes, the processor unit may determine that the rectangular shape in the captured image includes the text "Speed Limit 55." By comparing the captured text to a type code associated with the recognized landmark stored in sparse data map 1900 (e.g., a type indicating that the next landmark to be encountered is a speed limit sign), this information can further verify that the observed object in the captured images is, in fact, the expected recognized landmark.

Process 3300 may include a step 3306 of determining a current position 3112 of vehicle 200 relative to a target trajectory. Processing unit 110 may determine current position 3112 of vehicle 200 in many different ways. For example, processing unit 110 may determine current position 3112 based on signals from position sensor 130, for example, a GPS sensor. In another exemplary embodiment, processing unit 110 may determine current position 3212 of vehicle 200 by integrating a velocity of vehicle 200 as vehicle 200 travels along predetermined road model trajectory 3110. For example, processing unit 110 may determine a time "t" required for vehicle 200 to travel between two locations on predetermined road model trajectory 3110. Processing unit 110 may integrate the velocity of vehicle 200 over time t to determine current position 3112 of vehicle 200 relative to the two locations on predetermined road model trajectory 3110.

Once a recognized landmark is identified in a captured image, predetermined characteristics of the recognized landmark may be used to assist a host vehicle in navigation. For example, in some embodiments, the recognized landmark may be used to determine a current position of the host vehicle. In some cases, the current position of the host vehicle may be determined relative to a target trajectory from sparse data model 1900. Knowing the current position of the vehicle relative to a target trajectory may aid in determining a steering angle needed to cause the vehicle to follow the target trajectory (for example, by comparing a heading direction to a direction of the target trajectory at the determined current position of the vehicle relative to the target trajectory).

A position of the vehicle relative to a target trajectory from sparse data map 1900 may be determined in a variety of ways. For example, in some embodiments, a 6D Kalman filtering technique may be employed. In other embodiments, a directional indicator may be used relative to the vehicle and the recognized landmark. For example, process 3300 may also include a step 3308 of determining one or more directional indicators 3114, 3116 associated with the one or more landmarks 3102, 3104, respectively. Processing unit 110 may determine directional indicators 3114, 3116 based on the relative positions 3132, 3134 of the one or more landmarks 3102, 3104, respectively, relative to current position 3112 of vehicle 200. For example, processing unit 110 may receive landmark positions 3132, 3134 for landmarks 3102, 3104, respectively, from information, which may be stored in one or more databases in memory 140 or 150. Processing unit 110 may also determine distances between current position 3112 of vehicle 200 and landmark positions 3132, 3134 for landmarks 3102, 3104, respectively. In addition, processing unit 110 may determine directional indicator 3114 as a vector extending from current position 3112 of vehicle 200 and extending along a straight line passing through current position 3112 and landmark position 3132. Likewise, processing unit 110 may determine directional indicator 3116 as a vector extending from current position 3112 of vehicle 200 and extending along a straight line passing through current position 3112 and landmark position 3134. Although two landmarks 3102, 3104 are referenced in the above discussion, it is contemplated that processing unit 110 may determine landmark positions 3132, 3134, distances between current position 3112 and landmark positions 3102, 3114, and directional indicators 3114, 3116 for fewer than or more than landmarks 3102, 3104.

Process 3300 may include a step 3310 of determining an intersection point 3118 of directional indicator 3416 with predetermined road model trajectory 3110. Processing unit 110 may determine a location of intersection point 3118 at which predetermined road model trajectory 3110 intersects with a straight line extending between current position 3112 of vehicle 200 and landmark position 3134. Processing unit 110 may obtain a mathematical representation of predetermined road model trajectory 3110 from information stored in memories 140, 150. Processing unit 110 may also generate a mathematical representation of a straight line passing through both current position 3112 of vehicle 200 and landmark position 3134 of landmark 3104. Processing unit 110 may use the mathematical representation of predetermined road model trajectory 3110 and the mathematical representation of a straight line extending between current position 3112 and landmark position 3134 to determine a location of intersection point 3118.

In one exemplary embodiment as illustrated in FIG. 31, intersection point 3118 may coincide with current position 3112 of vehicle 200 (e.g., a position of a point of reference, which may be arbitrarily assigned, associated with the vehicle). This may happen, for example, when vehicle 200 is located on predetermined road model trajectory 3110. In another exemplary embodiment as illustrated in FIG. 32, intersection point 3118 may be separated from current position 3212. Processing unit 110 may detect that vehicle 200 is not located on predetermined road model trajectory 3110 by comparing a first distance "$D_1$" (see, e.g., FIG. 35) between current position 3112 and landmark position 3134 with a second distance "$D_2$" between intersection point 3118 and landmark position 3134.

When intersection point 3118 is separated from current position 3112 of vehicle 200, processing unit 110 may determine an amount of translation and/or rotation that may be required to help move vehicle 200 from current position 3112 to intersection point 3118 on predetermined road model trajectory 3110. In some exemplary embodiments, processing unit 110 may execute navigation module 408 to cause one or more navigational responses in vehicle 200 based on the analysis performed at step 520 and the techniques as described above in connection with FIG. 4. For example, processing unit 110 may issue commands to steering system 240 to move vehicle 200 so that a current position 3112 of vehicle 200 may coincide with intersection point 3118.

Process 3300 may include a step 3312 of determining direction 3120 of predetermined road model trajectory 3110 at intersection point 3118. In one exemplary embodiment, processing unit 110 may obtain a mathematical representation (e.g. three-dimensional polynomial) of predetermined road model trajectory 3110. Processing unit 110 may determine direction 3120 as a vector oriented tangentially to predetermined road model trajectory 3110 at intersection point 3118. For example, processing unit 110 may determine direction 3220 as a vector pointing along a gradient of the mathematical representation of predetermined road model trajectory 3110 at intersection point 3118.

Process 3300 may also include a step 3314 of determining an autonomous steering action for vehicle 200. In one exemplary embodiment, processing unit 110 may determine a heading direction 3130 of vehicle 200. For example, as illustrated in FIGS. 31 and 32, processing unit 110 may determine heading direction 3130 of vehicle 200 as the direction in which image capture device 122 may be oriented relative to a local coordinate system associated with vehicle 200. In another exemplary embodiment, processing unit 200 may determine heading direction 3130 as the direction of motion of vehicle 200 at current position 3112. Processing unit 110 may also determine a rotational angle between heading direction 3130 and direction 3120 of predetermined road model trajectory 3110. Processing unit 110 may execute the instructions in navigational module 408 to determine an autonomous steering action for vehicle 200 that may help ensure that heading direction 3130 of vehicle 200 is aligned (i.e., parallel) with direction 3120 of predetermined road model trajectory 3110 at intersection point 3118. Processing unit 110 may also send control signals to steering system 240 to adjust rotation of the wheels of vehicle 200 to turn vehicle 200 so that heading direction 3130 may be aligned with direction 3120 of predetermined road model trajectory 3110 at intersection point 3118. In one exemplary embodiment, processing unit 110 may send signals to steering system 240 to adjust rotation of the wheels of vehicle 200 to turn vehicle 200 until a difference between heading direction 3130 and direction 3120 of predetermined road model trajectory 3110 at intersection point 3118 may be less than a predetermined threshold value.

Processing unit 110 and/or image acquisition unit 120 may repeat steps 3302 through 3314 after a predetermined amount of time. In one exemplary embodiment, the predetermined amount of time may range between about 0.5 seconds to 1.5 seconds. By repeatedly determining intersection point 3118, heading direction 3130, direction 3120 of predetermined road model trajectory 3110 at intersection point 3118, and the autonomous steering action required to align heading direction 3130 with direction 3120, processing unit 110 and/or image acquisition unit 120 may help to navigate vehicle 200, using the one or more landmarks 3102, 3104, so that vehicle 200 may travel along road segment 3100.

Sparse Map Autonomous Vehicle Navigation

In some embodiments, the disclosed systems and methods may use a sparse map for autonomous vehicle navigation. As discussed above, the sparse map may provide sufficient information for navigation without requiring excessive data storage or data transfer rates. Further, a vehicle (which may be an autonomous vehicle) may use the sparse map to navigate one or more roads. For example, as discussed below in further detail, vehicle 200 may determine an autonomous navigational response based on analysis of the sparse map and at least one image representative of an environment of vehicle 200.

In some embodiments, vehicle 200 may access a sparse map that may include data related to a road on which vehicle 200 is traveling and potentially landmarks along the road that may be sufficient for vehicle navigation. As described in sections above, the sparse data maps accessed by vehicle 200 may require significantly less storage space and data transfer bandwidth as compared with digital maps including detailed map information, such as image data collected along a road. For example, rather than storing detailed representations of a road segment on which vehicle 200 is traveling, the sparse data map may store three dimensional polynomial representations of preferred vehicle paths along the road. A polynomial representation of a preferred vehicle path along the road may be a polynomial representation of a target trajectory along a road segment. These paths may require very little data storage space.

Consistent with disclosed embodiments, an autonomous vehicle system may use a sparse map for navigation. As discussed earlier, at the core of the sparse maps, one or more three-dimensional contours may represent predetermined trajectories that autonomous vehicles may traverse as they move along associated road segments. As also discussed earlier, the sparse maps may also include other features, such as one or more recognized landmarks, road signature profiles, and any other road-related features useful in navigating a vehicle.

In some embodiments, an autonomous vehicle may include a vehicle body and a processor configured to receive data included in a sparse map and generate navigational instructions for navigating the vehicle along a road segment based on the data in the sparse map.

As discussed above in connection with FIG. 19, vehicle 200 (which may be an autonomous vehicle) may access sparse map 1900 to navigate. As shown in FIG. 19, in some embodiments, sparse map 1900 may be stored in a memory, such as memory 140 or 150. For example, sparse map 1900 may be stored on a storage device or a non-transitory computer-readable medium provided onboard vehicle 200 (e.g., a storage device included in a navigation system onboard vehicle 200). A processor (e.g., processing unit 110) provided on vehicle 200 may access a sparse map stored in the storage device or computer-readable medium provided onboard vehicle 200 in order to generate navigational instructions for guiding the autonomous vehicle 200 as it traverses a road segment.

Figure 34:
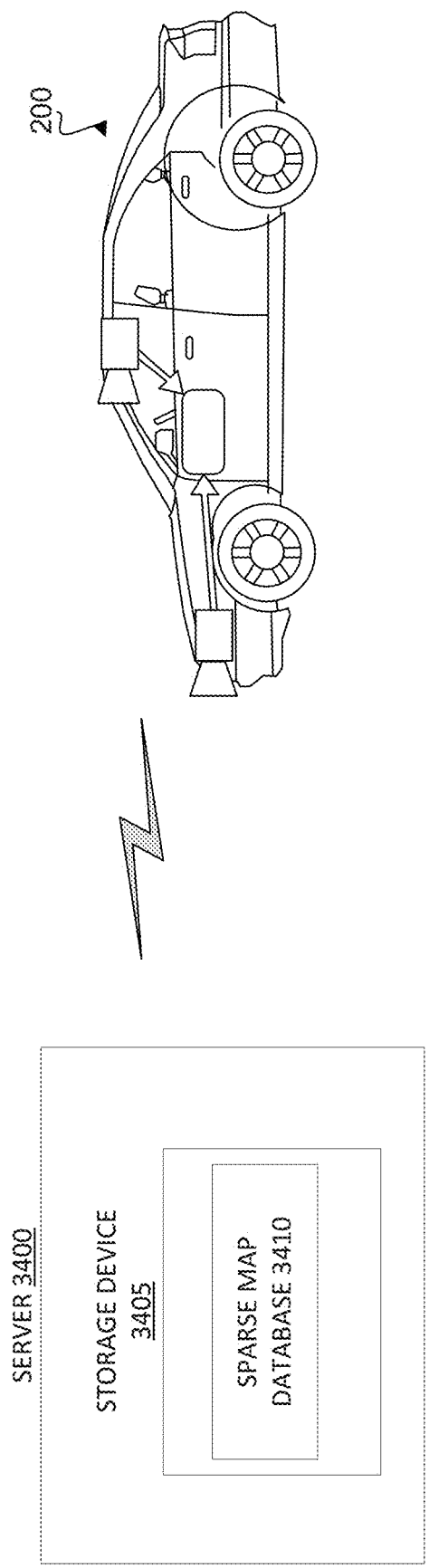
FIG. 34 shows an exemplary remote server in communication a vehicle, consistent with the disclosed embodiments.

In some embodiments, sparse map 1900 may be stored remotely. FIG. 34 shows an example of vehicle 200 receiving data from a remote server 4400, consistent with disclosed embodiments. As shown in FIG. 34, remote server 3400 may include a storage device 3405 (e.g., a computer-readable medium) provided on remote server 3400 that communicates with vehicle 200. For example, remote server 3400 may store a sparse map database 3410 in storage device 3405. Sparse map database 3410 may include sparse map 1900. In some embodiments, sparse map database 3410 may include a plurality of sparse maps. Sparse map database 3410 may be indexed based on certain regions (e.g., based on geographical boundaries, country boundaries, state boundaries, etc.) or based on any appropriate parameter (e.g., type or size of vehicle, climate, etc.). Vehicle 200 may communicate with remote server 440 via one or more networks (e.g., over a cellular network and/or the Internet, etc.) through a wireless communication path. In some embodiments, a processor (e.g., processing unit 110) provided on vehicle 200 may receive data included in sparse map database 3410 over one or more networks from remove server 3400. Furthermore, vehicle 200 may execute instructions for navigating vehicle 200 using sparse map 1900, as discussed below in further detail.

As discussed above in reference to FIG. 19, sparse map 1900 may include representations of a plurality of target trajectories 1910 for guiding autonomous driving or navigation along a road segment. Such target trajectories may be stored as three-dimensional splines. The target trajectories stored in sparse map 1900 may be determined based on two or more reconstructed trajectories of prior traversals of vehicles along a particular road segment. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment.

Sparse map 1900 may also include data relating to a plurality of predetermined landmarks 1920 associated with particular road segments, local maps, etc. As discussed in detail in other sections, these landmarks may be used in navigation of vehicle 200. For example, in some embodiments, the landmarks may be used to determine a current position of vehicle 200 relative to a stored target trajectory. With this position information, vehicle 200 may be able to adjust a heading direction to match a direction of the target trajectory at the determined location.

Landmarks may include, for example, any identifiable, fixed object in an environment of at least one road segment or any observable characteristic associated with a particular section of a particular road segment. In some cases, landmarks may include traffic signs (e.g., speed limit signs, hazard signs, etc.). In other cases, landmarks may include road characteristic profiles associated with a particular section of a road segment. Further examples of various types of landmarks are discussed in previous sections, and some landmark examples are shown and discussed above in connection with FIG. 21.

Figure 35:
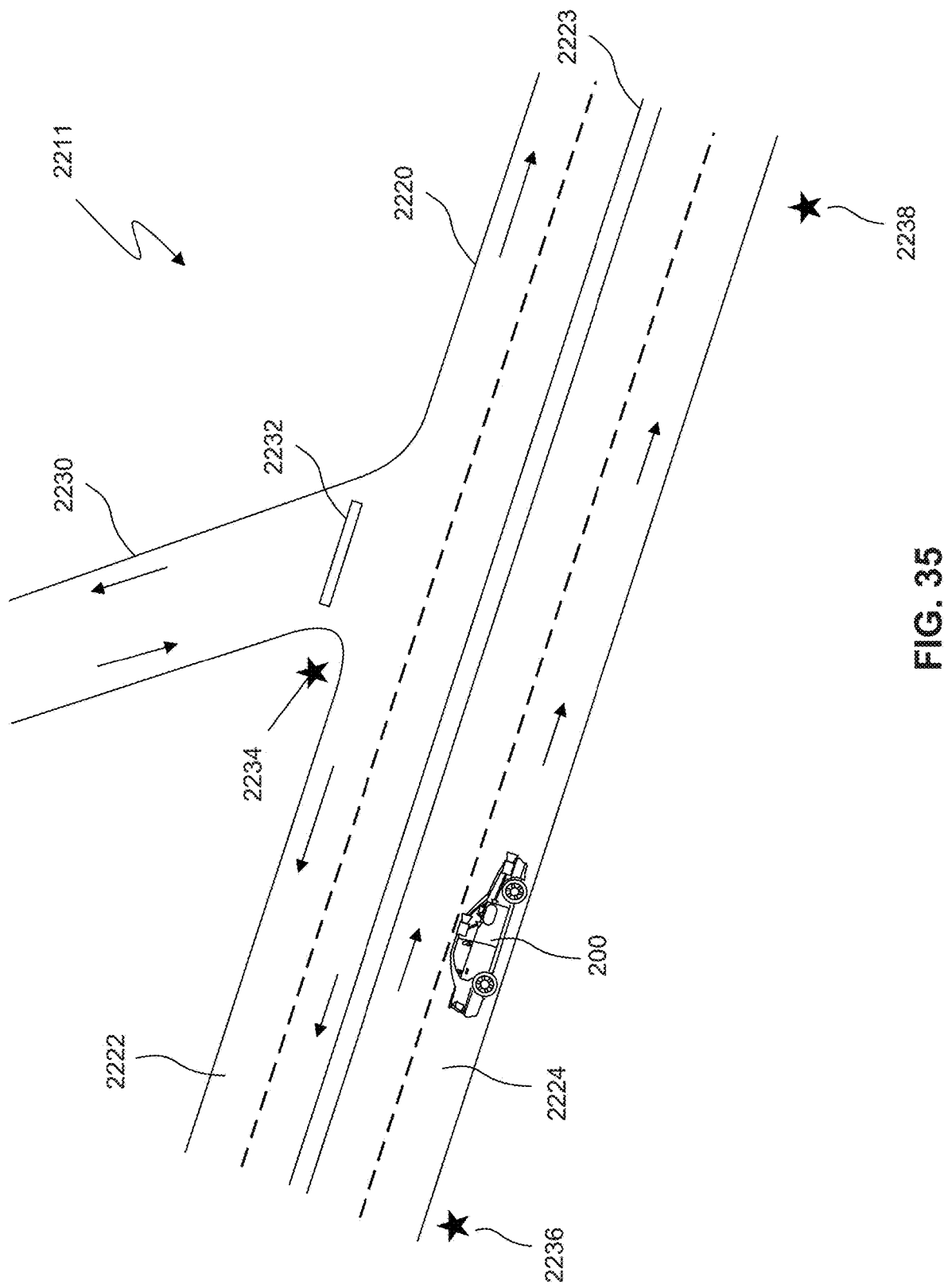
FIG. 35 shows a vehicle navigating along a multi-lane road, consistent with disclosed embodiments.

FIG. 35 shows vehicle 200 navigating along a multi-lane road consistent with disclosed embodiments. Here, a vehicle 200 may navigate road segments present within a geographic region 2211 shown previously in FIG. 22B. As previously discussed in relation to FIG. 2B, road segment 220 may include a multilane road with lanes 2222 and 2224, double yellow line 2223, and branching road segment 2230 that intersects with road segment 2220. Geographic region 2211 may also include other road features, such as a stop line 2232, a stop sign 2234, a speed limit sign 2236, and a hazard sign 2238.

FIG. 36 shows vehicle 200 navigating using target trajectories along a multi-lane road consistent with disclosed embodiments. A vehicle 200 may navigate geographic region 2211 shown previously in FIG. 22B and FIG. 35, using target trajectory 3600. Target trajectory 3600 may be included in a local map (e.g., local map 2240 of FIG. 22C) of sparse map 1900, and may provide a target trajectory for one or more lanes associated with a road segment. As previously discussed, sparse map 1900 may include representations of road-related features associated with geographic region 2211, such as representations of one or more landmarks identified in geographic region 2211. Such landmarks may include speed limit sign 2236 and hazard sign 2238. Vehicle 200 may use speed limit sign 2236 and hazard sign 2238 to assist in determining its current location relative to target trajectory 3600. Based on the determined current location of vehicle 200 relative to target trajectory 3600, vehicle 200 may adjust its heading to match a direction of the target trajectory at the determined location.

As discussed above, in some embodiments, sparse map 1900 may also include road signature profiles. Such road signature profiles may be associated with any discernible/measurable variation in at least one parameter associated with a road. For example, in some cases, such profiles may be associated with variations in surface roughness of a particular road segment, variations in road width over a particular road segment, variations in distances between dashed lines painted along a particular road segment, variations in road curvature along a particular road segment, etc.

Figure 37:
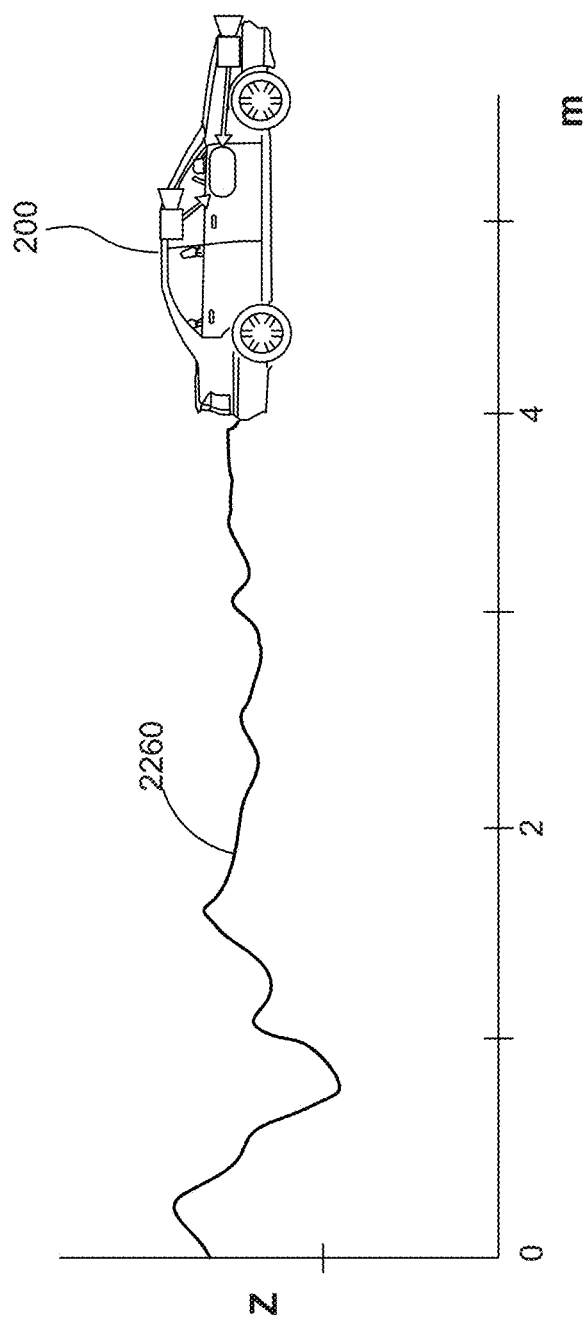
FIG. 37 shows an example of a road signature profile, consistent with the disclosed embodiments.

FIG. 37 shows an example of a road signature profile 2260 associated with vehicle 200 as it travels on the road shown in FIGS. 35 and 36. While profile 2260 may represent any of the parameters mentioned above, or others, in relation to vehicle 200, in one example, profile 2260 may represent a measure of road surface roughness obtained by monitoring one or more sensors providing outputs indicative of an amount of suspension displacement as a vehicle 200 travels a road segment in FIG. 36. Alternatively, profile 2260 may represent variation in road width, as determined based on image data obtained via a camera onboard vehicle 200 traveling in a road segment in FIG. 36. Such profiles may be useful, for example, in determining a particular location of vehicle 200 relative to target trajectory 3600, and may aid in navigation of vehicle 200. That is, as vehicle 200 traverses a road segment of FIG. 36, vehicle 200 may measure a profile associated with one or more parameters associated with that road segment. If the measured profile can be correlated/matched with a predetermined profile that plots the parameter variation with respect to position along the road segment, then the measured and predetermined profiles may be used by vehicle 200 (e.g., by overlaying corresponding sections of the measured and predetermined profiles) in order to determine a current position along the road segment and, therefore, a current position relative to target trajectory 3600 for the road segment. Measurements of the profile by vehicle 200 may continue as vehicle 200 travels in lane 2224 of FIG. 36 in order to continuously determine a current position along the road segment and a current position of vehicle 200 relative to target trajectory 3600. As such, navigation of vehicle 200 may be provided.

Figure 38:
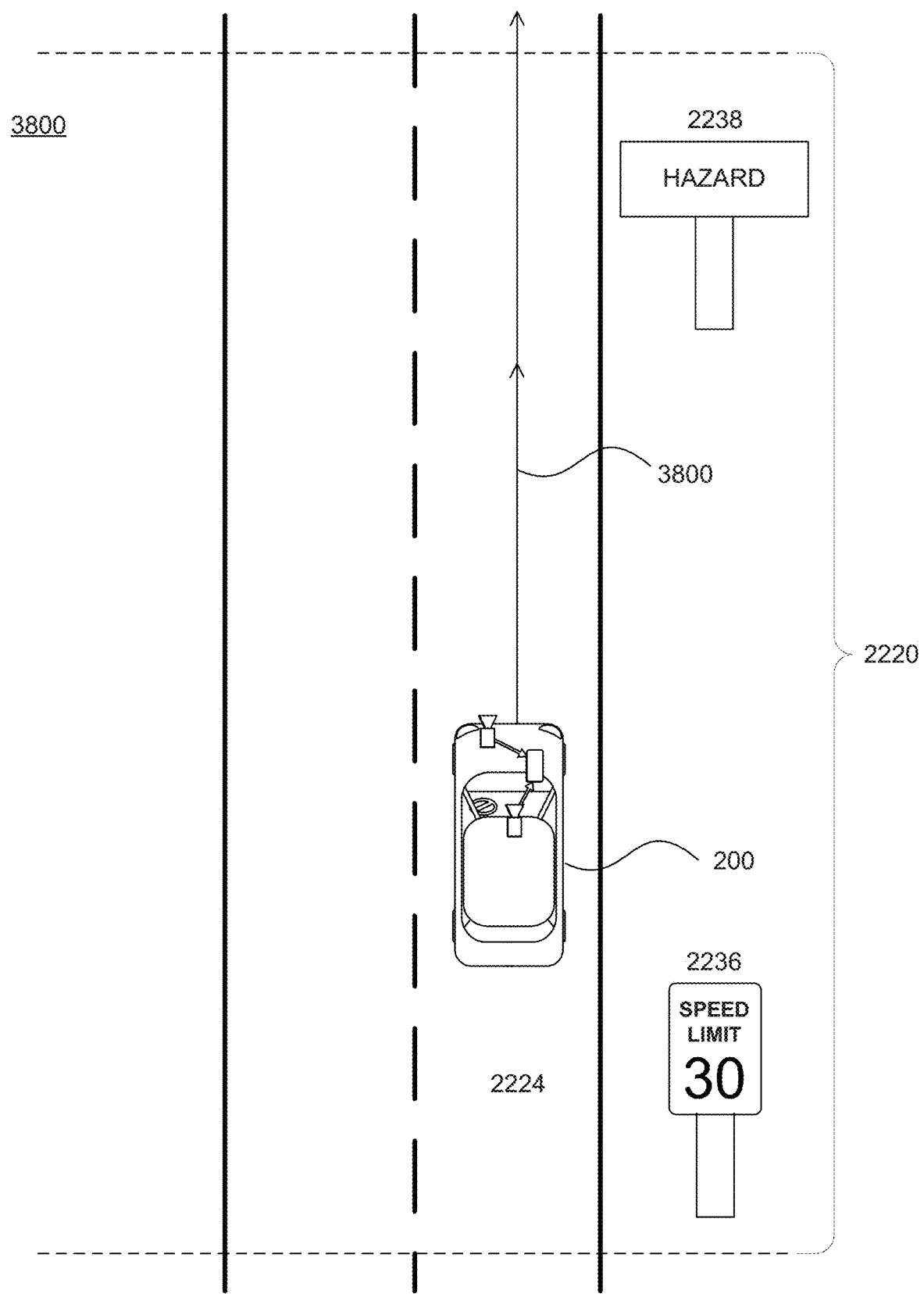
FIG. 38 illustrates an exemplary environment, consistent with the disclosed embodiments.

FIG. 38 is an illustration of an example of a portion of a road environment 3800, as shown in FIGS. 35 and 36. In this example, FIG. 38 shows road segment 2220. Vehicle 200 may be traveling along road segment 2220. Along the road segment 2220, landmarks such as speed limit sign 2236 and hazard sign 2238 may be present. Speed limit sign 2236 and hazard sign 2238 may be recognized landmarks that are stored in sparse map 1900, and may be used for autonomous vehicle navigation along road segment 2220 (e.g., for locating vehicle 200, and/or for determining a target trajectory of vehicle 200). Recognized landmarks 2236 and 2238 in sparse map 1900 may be spaced apart from each other at a certain rate. For example, recognized landmarks may be spaced apart in the sparse map at a rate of no more than 0.5 per kilometer, at a rate of no more than 1 per kilometer, or at a rate of no more than 1 per 100 meters. Landmarks 2236 and 2238 may be used, for example, to assist vehicle 200 in determining its current location relative to target trajectory 3600, such that the vehicle may adjust its heading to match a direction of the target trajectory at the determined location.

Figure 39:
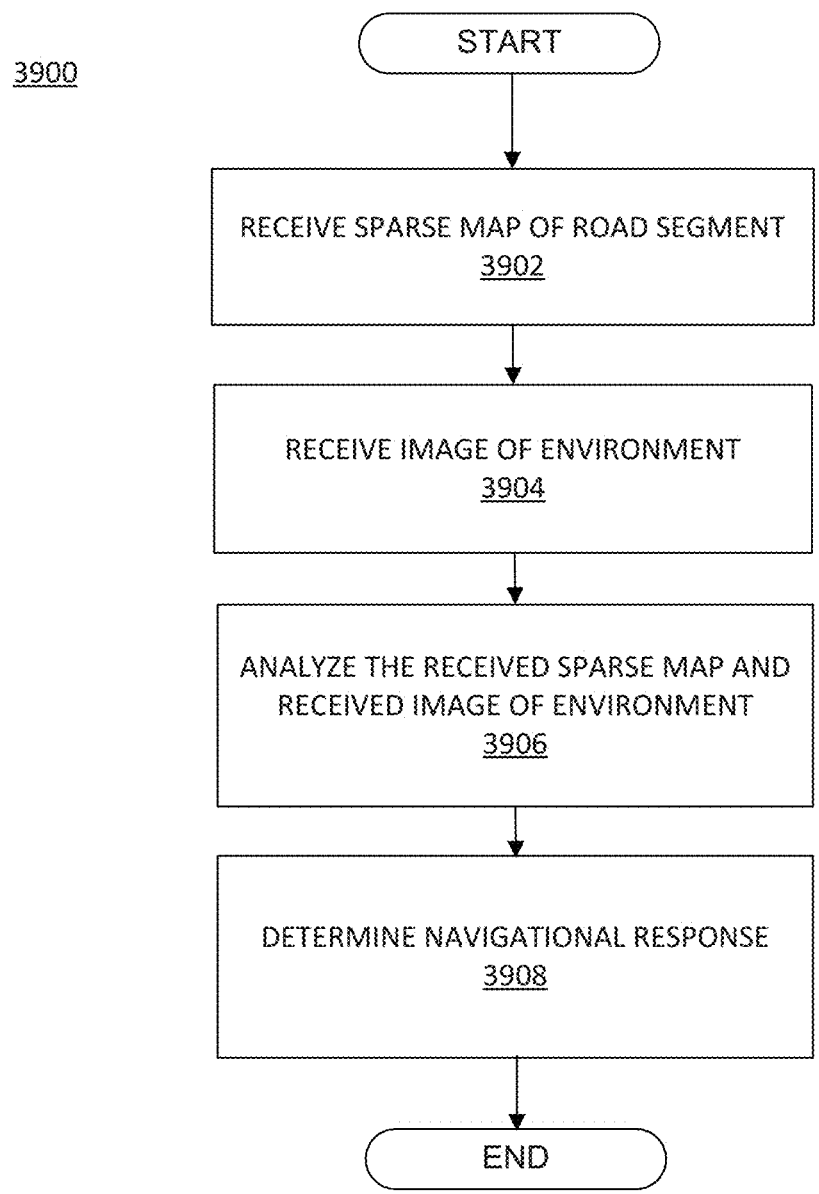
FIG. 39 is a flow chart showing an exemplary process for sparse map autonomous vehicle navigation, consistent with the disclosed embodiments.

FIG. 39 is a flow chart showing an exemplary process 3900 for sparse map autonomous navigation consistent with the disclosed embodiments. Processing unit 110 may utilize one of or both of application processor 180 and image processor 190 to implement process 3900. As discussed below in further detail, vehicle 200 may determine an autonomous navigational response based on analysis of a sparse map and at least one image representative of an environment of vehicle 200.

At step 3902, processing unit 110 may receive a sparse map of a road segment, such as sparse map 1900, from memory 140 or 150. For example, the sparse map may be transmitted to processing unit 110 based on a calculation of the position of vehicle 200 by position sensor 130. In other exemplary embodiments, vehicle 200 may receive the sparse map from remote server 3400. The sparse map data may have a particular data density. The data density of the sparse map may be expressed in terms of data unit per unit distance. For example, the sparse map may have a data density of no more than 1 megabyte per kilometer. In another example, the sparse map may have a data density of no more than 100 kilobytes per kilometer. In another example, the sparse map may have a data density of no more than 10 kilobytes per kilometer. Data density may be expressed in terms of any conceivable data unit and unit distance. Further, the sparse map may include a polynomial representation of a target trajectory along the road segment.

At step 3904, processing unit 110 may receive at least one image representative of an environment of vehicle 200. For example, processing unit 110 may receive at least one image from image acquisition unit 120 using image capture device 122. In other exemplary embodiments, image acquisition unit 120 may acquire one or more images from one or more of image capture devices 122, 124, and 126. Image acquisition unit 120 may transmit the one or more images to processing unit 110 over a data connection (e.g., digital, wired, USB, wireless, Bluetooth, etc.).

At step 3906, processing unit 110 may analyze the received sparse map and the at least one image of the environment of vehicle 200. For example, processing unit 110 may execute monocular image analysis module 402 to analyze one or more images, as described in further detail in connection with FIGS. 5B-5D. By performing the analysis, processing unit 110 may detect a set of features within the set of images, for example, one or more landmarks, such as landmarks 2234, 2236, and 2238. As discussed earlier, landmarks may include one or more traffic signs, arrow markings, lane markings, dashed lane markings, traffic lights, stop lines, directional signs, reflectors, landmark beacons, lampposts, a change is spacing of lines on the road, signs for businesses, and the like. Furthermore, processing unit 110 may analyze the sparse map to determine that an object in one or more images is a recognized landmark. For example, processing unit 110 may compare the image of the object to data stored in the sparse map. Based on the comparison, the image processor 190 may determine whether or not the object is a recognized landmark. Processing unit 110 may use recognized landmarks from captured image data of the environment and/or GPS data to determine a position of vehicle 200. Processing unit 110 may then determine a position of vehicle 200 relative to a target trajectory of the sparse map.

At step 3908, processing unit 110 may cause one or more navigational responses in vehicle 200 based solely on the analysis of the sparse map and at least one image of the environment performed at step 3906. For example, processing unit 110 may select an appropriate navigational response based on the position of vehicle 200 relative to the target trajectory of the sparse map. Navigational responses may include, for example, a turn, a lane shift, a change in acceleration, and the like. Processing unit 110 may cause system 100 to provide inputs (e.g., control signals) to one or more of throttling system 220, braking system 230, and steering system 240 as shown in FIG. 2F to navigate vehicle 200 (e.g., by causing an acceleration, a turn, a lane shift, etc.) to provide a navigational response. System 100 may provide inputs to one or more of throttling system 220, braking system 230, and steering system 240 over one or more data links (e.g., any wired and/or wireless link or links for transmitting data). Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Navigation by Augmented Path Prediction

As described in the sections above, the disclosed system is capable of analyzing one or more images captured by a camera and generating a planned trajectory (a predicted path, etc.) for an autonomous vehicle. In some cases, as described, a trained neural network may analyze the one or more images captured by a camera (e.g., a camera mounted onboard a host vehicle) and determine a planned trajectory based on numerous criteria or considerations. Just a few examples of such criteria or considerations may include identified free space ahead of the host vehicle, identified lane markings, identified road edges, a determined lane center, one or more parked cars identified on a road traversed by the host vehicle, one or more target vehicles (moving or stationary) identified on a road traversed by the host vehicle, identified curves, identified junctions, identified intersections, and many other criteria or considerations.

Advanced Driving Assistance Systems (ADAS), which are usually classified as level 2 autonomous driving, may include some type of a lane centering system. Lane centering may be performed in computer vision-based systems, but such systems tend to work best in certain well-defined scenarios, such as in driving situations that involve lanes defined by painted lane marks. Vision-based systems may have more difficulty navigating more complex road features, such as junctions, urban roads with no markings, traffic circles, etc. without at least some level of information augmentation (e.g., to discern an intent relative to direction or route to be taken, etc.).

As described in the sections above, the presently disclosed systems may be capable of analyzing one or more captured images and generating a planned trajectory for the host vehicle. Nevertheless, certain ambiguities may exist that may make the planned trajectory generation more difficult or complex. For example, where the system identifies multiple potential and valid paths that could be taken by the host vehicle, the system may be forced to decide which of the paths is most appropriate for the host vehicle. An image representing a fork in the road may have a few correct answers for possible, valid routes, but only one of the available paths may be correct or best for a specific drive or for reaching a desired destination.

In some cases, the host vehicle may traverse a road segment consisting of only one valid route for the host vehicle (e.g., a road segment having no entries, exits, intersections, etc. that are identifiable in a captured image). In such cases, there may be no ambiguity in which route the planned trajectory should follow.

In some cases, however, in such scenarios in which the host vehicle may traverse a road segment consisting of one valid route, an ambiguity (e.g., a structure, object, lines) may potentially mislead the system and/or sensors onboard the host vehicle to detect an alternative drivable path (in addition to the intended path for the host vehicle), where there is actually no alternative drivable path. In additional cases, for example, where intersections, merge lanes, road curves, exit lanes, traffic circles, road junctions, unmarked road segments, road segments with obscured edges, multiple intersecting roads in close proximity, etc. may be identifiable in one or more captured images, it may be more difficult for the system to generate the planned trajectory for the host vehicle, as it may be less clear which of the available, potential routes identified in the captured image(s) should be traversed by the host vehicle. In such cases, for autonomous navigation systems, additional information beyond the captured image information may be provided in order to successfully drive through road features where route ambiguity may exist. Such information may include, instructions at each junction or traffic circle about which road to choose. Even more basic, such information may include information providing directional guidelines (rather than specific instructions) which can be used by the disclosed system to select a path from among available routes. At the other end of the spectrum, the system may receive maps (e.g., any of the sparse maps described above) from which the system may discern an exact intended driving path from which to generate a planned trajectory. In some embodiments, the system may provide redundancy by using any combination of images, additional information (e.g., driving instructions and/or directional guidelines), and/or maps (e.g., a sparse map, as described above).

Various techniques may be used by the system to resolve route ambiguities in autonomous navigation systems and to generate a planned trajectory along an intended route. In some cases, the system may default to a presumption that the host vehicle should continue "straight" unless faced with some indication of an intent to travel along a different path. In such cases, even where multiple, valid routes may be identified, the system may generate the planned trajectory along the available route deemed most consistent with a continuation of current route.

In other situations, however, it may be less clear to the system which of the identified, available routes should be taken. In some cases, the system may resolve ambiguities based on received input that enables the system (e.g., one or more processors associated with the navigation system) to determine which of the identified, valid routes the planned trajectory for the host vehicle should follow.

Various types of input may be supplied to the one or more processors of the vehicle navigation system for assisting in generation of the planned trajectory. In some cases, the navigation processor(s) for the host vehicle, may be programmed to perform specific operations associated with the generation of planned trajectories for a host vehicle. Such programming may include, for example, access to instructions stored in a memory, access to instructions included in one or more of the available processors as part of a processor architecture/instruction set, etc., such that execution of such instructions contribute to the disclosed operation of the system. Such programming may also include one or more trained neural networks (discussed in the sections above and in more detail below) that can be relied upon by the one or more processors to receive various navigational inputs and, based on previous training, return various outputs useful in generating planned trajectories for a host vehicle (including, e.g., actual planned trajectories for the host vehicle).

Inputs to the one or more navigational processors may include one or more images representative of an environment of the host vehicle. As noted above, such images, e.g., may be captured by one or more cameras onboard a host vehicle. In some instances, such images may also be transmitted to the processors from locations remote with respect to the host vehicle (e.g., navigational servers, installed infrastructure along roadways, etc.). In addition to the image input, the navigational processors of the disclosed systems may also receive one or directional indicators for use in planning at least a segment of the planned trajectory for the host vehicle. Alternatively or additionally, the processor(s) may receive one or more distance estimates for use in planning certain segments of the planned trajectory.

Each directional indicator may include a target trajectory direction for the host vehicle. Such target trajectory directions may correspond to estimates of a direction the host vehicle should be heading at a certain point along a planned trajectory. In some cases, the directional indictors may correspond to heading directions actually included in a generated planned trajectory and/or taken by the host vehicle in traversing an actual trajectory. In other cases, however, the directional indicators function as guideposts (e.g., virtual guideposts) for assisting in generating a planned trajectory, but neither the planned trajectory nor the actual trajectory of the host vehicle includes segments exactly corresponding to the received direction indicators.

As described, another input that may be provided to the navigational processor(s) may include one or more distance estimates associated with target trajectory directions for the host vehicle. In some cases, the distance estimates may be associated with the received directional indicators. For example, each distance estimate may indicate a distance or location estimate where the host vehicle may obtain a heading direction indicated/suggested by a corresponding directional indicator specifying a target trajectory direction for the host vehicle. As a general example, the navigational processor(s) may receive a directional indicator suggesting that the host vehicle be oriented at a direction of about 60 degrees at a certain area of a planned trajectory to be generated for the host vehicle. A corresponding distance estimate received by the navigational processors may suggest that at a certain distance or location along the planned trajectory (e.g., 100 m), the host vehicle should achieve the 60 degree heading. Based on this type of information, the navigational processors may access one or more images captured of an environment of the host vehicle, determine regions in the images where navigation is possible, consider the received distance estimate(s) and/or directional indicator(s), and generate a planned trajectory for the host vehicle that traverses navigable regions in the environment of the host vehicle. The planned trajectory need not achieve the particular directional and distance estimates specified by the directional indicators and distance estimates. Rather, these inputs are used by the navigational processor(s) as guides for generating planned trajectories for the host vehicle, especially when navigating regions where at least some level of navigational ambiguity exists. More specific examples are discussed further below.

The directional indicators provided to the navigational processor(s) may include any type of data structure suitable for conveying directional information (e.g., a target heading direction for a host vehicle). In some cases, one or more of the directional indicators may include an angular measurement. For example, a directional indicator may specify an angle of ±10 degrees, ±45 degrees, ±60 degrees, ±90 degrees, ±135 degrees, ±150 degrees, 180 degrees, 210 degrees etc. Such angle values may be referenced relative to any suitable coordinate system. In some cases, the directional indicator may be referenced relative to a current heading direction of the host vehicle, where the current heading direction corresponds to 0 degrees, turns to the left would result in negative angle values, and turns to the right would result in positive angle values. In such an example, a right turn onto a crossing street that intersects at 90 degrees a street on which the host vehicle is located may be indicated by a directional indicator of 90 degrees. A left turn onto the same street may be indicated by a directional indicator of −90 degrees. A slight bend to the right on a curve ahead of the host vehicle may be associated with a directional indicator of 10 degrees. Similarly, a slight bend to the left may be associated with a directional indicator of −10 degrees. Of course, other angle values would result in a different coordinate system (e.g., if the directional indicator was referenced relative to world coordinates rather than vehicle coordinates or if a different type of coordinate system was employed).

A directional indicator need not be provided to the navigational processor(s) in the form of a numerical angle. Rather, a directional indicator may include any type of information or data structure that may convey directional information or from which a direction may be derived. For example, in some cases, a directional indicator may include one or more spatially oriented line segments from which a direction (e.g., a direction relative to a current heading direction of the host vehicle or a world coordinate system) may be derived. In other cases, a directional indicator may correspond to one or more vectors received by the navigational processor(s). In such cases, a directional indicator may be provided by a direction of the vector (e.g., relative to a current heading direction of the host vehicle or a world coordinate system), and a distance estimate applicable to a particular direction may be derived from a length of the vector.

Similarly, each distance estimate may be supplied to the navigational processor(s) using any suitable means for conveying a distance value. In some cases, a distance estimate may be provided by a numeric value (e.g., 5 m, 10 m, 25 m, 50 m, 100 m, etc.). In other cases, the distance estimate may be derived, for example, from a vector length, etc. Additionally, the distance estimate may be measured relative to various origins. For example, in some embodiments, a distance estimate provided to the navigational processor(s) may extend from a current position of the host vehicle to an intended onset of a particular target trajectory direction indicated by a directional indicator. In some embodiments, the intended onset of the particular target trajectory indicated by the directional indicator includes at least one point along a road or road segment. For example, a distance estimate of 30 meters and a corresponding directional indicator of 10 degrees may indicate that at a location approximately 30 meters ahead with respect to the host vehicle's current position, the host vehicle should have a heading direction bearing about 10 degrees to the right of its current heading direction. In other embodiments, a distance estimate provided to the navigational processor(s) may correspond to a target distance over which the host vehicle is intended to navigate with respect to a particular target trajectory direction. For example, a distance estimate of 10 meters and a corresponding directional indicator of 0 degrees may indicate that the host vehicle should have a heading direction of 0 degrees relative to its current heading direction and should maintain that heading for a distance of about 10 meters.

As another example, in an environment in which a road ahead of a host vehicle includes at least two alternative drivable paths, a directional indicator may be better aligned with a direction of a first segment along the first drivable path than any segment at or around the same directional indicator along the second drivable path. In such a scenario, the system may determine that the host vehicle should navigate to the first path. Further, in such a scenario, the directional indicator may not fall on the intended onset.

Figure 40:
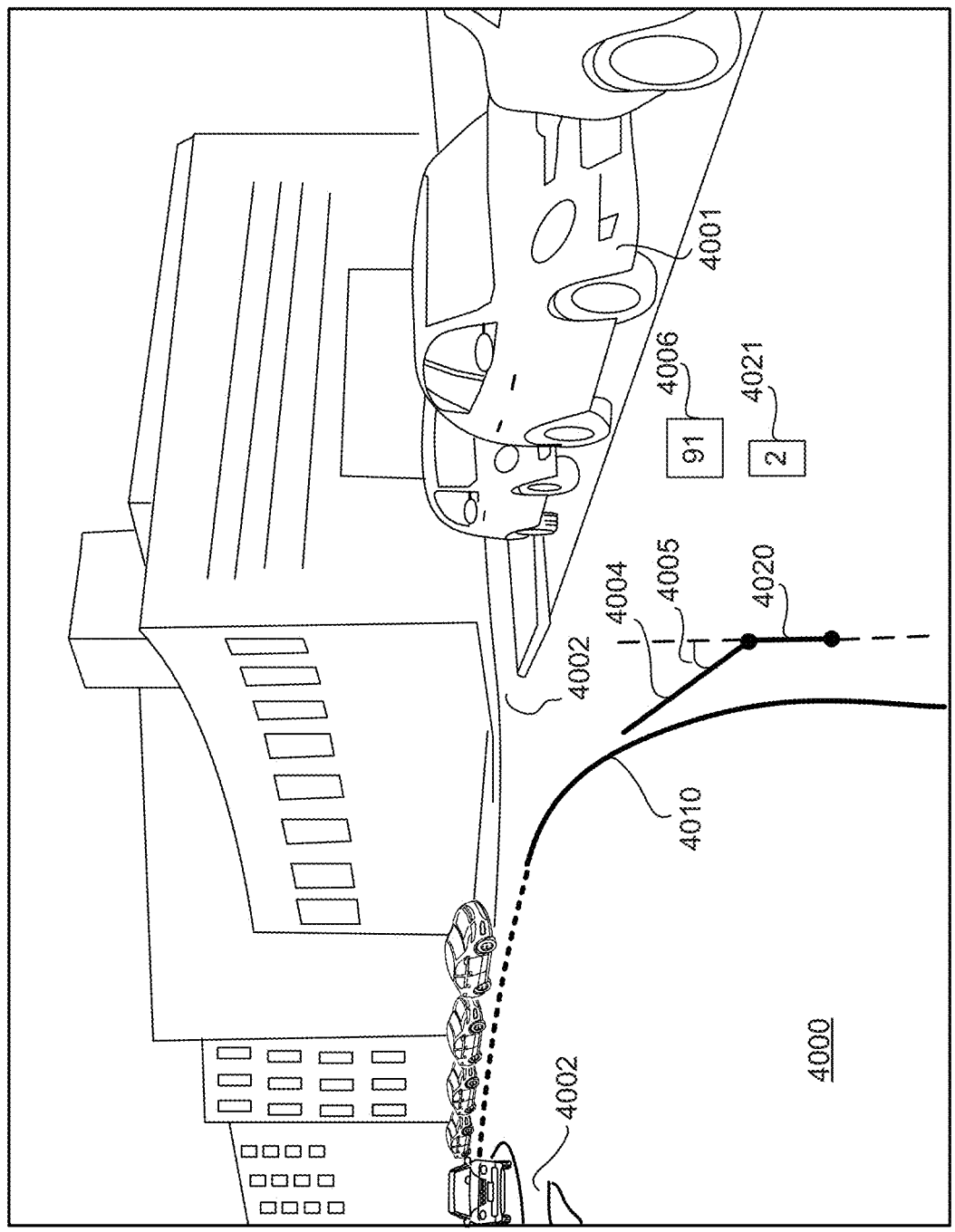
FIG. 40 illustrates an example situation where image, directional, and distance inputs can be used in generating a planned trajectory for a host vehicle, according to exemplary disclosed embodiments.

FIGS. 40-43 illustrate example situations where image, directional, and distance inputs can be used in generating a planned trajectory for a host vehicle, according to exemplary disclosed embodiments. As illustrated in FIG. 40, an image captured of an environment of a host vehicle (e.g., from a field of view forward of the host vehicle and which shows a curved road segment ahead of the host vehicle on a road on which the host vehicle is traveling) may represent an urban environment including a roadway 4000 that curves generally to the left. A line of cars 4001 obscures portions of a right edge of roadway 4000. As shown in the image, a street 4002 crosses roadway 4000 at an angle of other than 90 degrees. In such an environment, at least one navigational ambiguity may exist regarding whether the host vehicle should continue along roadway 4000 as it extends away and to the left of the host vehicle's current position, whether the host vehicle should turn right onto street 4002, or whether the host vehicle should turn left onto street 4002.

Such ambiguity may be resolved, for example, using the directional indicators and distance estimates described above. For example, in the current situation shown in FIG. 40, a directional indicator 4004 may be provided that suggests a directional heading for the vehicle at some point ahead of its current position and relative to its current heading direction. For example, as shown, directional indicator 4004 may indicate that the host vehicle should have a direction relative to its current position as defined by angle 4005, which, as illustrated, may be approximately −40 degrees relative to its current heading direction. In some cases, a directional indicator suggesting a heading direction different from a current heading direction of the host vehicle may provide valuable information for generating a planned trajectory for the host vehicle, as it may indicate a directional change for the host vehicle correlated to one or more road features that may be observed in the captured images.

To provide even further context for the directional indication, a distance estimate 4006 may be provided to the navigational processor(s) indicating that a distance of 91 meters from the current position of the host vehicle, the host vehicle should have an orientation of about −40 degrees relative to its current heading direction. In other words, a target trajectory direction for the host vehicle at approximately 91 meters from its current location should be about −40 degrees relative to its current heading direction. Based on this information, a planned trajectory 4010 may be generated for the host vehicle, for example, using a trained system, such as a trained neural network (as described in more detail in sections above and below). Planned trajectory 4010 may strictly adhere to the directional indicator 4004 and distance estimate 4006 or it may more loosely correspond to these values (e.g., by using these input values as suggestions or approximate targets). Regardless, directional indicator 4004 and distance estimate 4006 may serve to aid the navigational processor(s) in resolving ambiguities regarding which of the possible, valid routes available (as determined based on analysis of the received image(s) of the environment) the host vehicle should follow.

In some embodiments, even a single directional indicator or a distance estimate may be sufficient for assisting in resolving ambiguity and generating a planned trajectory for the host vehicle. In other embodiments, additional directional indicators and/or distance estimates may be provided. For example, as shown in FIG. 40, a second directional indicator 4020 may be provided, and a second distance estimate 4021 may also be provided. In this example, directional indicator 4020 may indicate a direction of 0 degrees relative to a current heading direction of the host vehicle, and the distance estimate 4021 may suggest a distance of 2 meters. Together, this information may convey to the navigational processor(s) a suggestion that the host vehicle proceed straight (e.g., substantially along its current heading direction) for a distance of 2 meters. In other words, distance estimate 4021 may indicate that at a point 2 meters from a current location, the host vehicle should have a heading of 0 degrees relative to its current position. In some embodiments, this information may convey the navigational processor(s) a suggestion that the host vehicle proceed straight (e.g., substantially along its current heading direction) at a distance (e.g., 2 meters) ahead of a current position to the host vehicle, and the input to the trained system may be a heading of 0 degrees. This may cause the trained system to output a planned trajectory for a road segment that is associated with an area around the 2 meters virtual guidepost, which is generally straight (heading of 0 degrees) relative to the host vehicle's current position. The distance may be used as a "marker" or guidepost for a segment an area or a path that is distinguishable from other paths. A segment may include a feature that is recognized or expected to be recognized by the trained system as an area in real life and as distinguished from other segments.

Thus, the example shown in FIG. 40 for generating a planned trajectory 4010, the navigational processor(s) may receive two directional indicators 4004 and 4020 and two distance estimates. Together these directional indicators and distance estimates provide navigational target suggestions for the navigational processor(s) to enable the navigational processor(s) (e.g., one or more trained systems, such as one or more trained neural networks implemented by the processor(s)) to resolve navigational ambiguities and generate a planned trajectory that traverses a valid path along a roadway and which may be consistent with the provided directional indicators and distance estimates. In the example of FIG. 40, the inputs to the navigational processor(s) may suggest that at 2 meters from a current location, the host vehicle should have a heading direction the same as or similar to its current heading direction (e.g., "go straight for 2 m"), but at a location approximately 91 meters from a current location, the host vehicle should have an orientation that is rotated about 40 degrees to the left of its current heading direction. With this information, the navigational processor(s) may generate a planned trajectory 4010 for the host vehicle. In some cases, planned trajectory 4010 may comply exactly with the provided directional indicators and distance estimates, especially where such information is possible in view of road features detected or observed based on analysis of the captured images and/or where such information is consistent with navigational constraints placed on the host vehicle (e.g., safety and/or comfort constraints) that may impact the exact location of the planned navigational path. In other cases, planned trajectory 4010 may not exactly comply with the provided directional indicators and distance estimates, especially where, for example, such values would violate one or more safety or comfort constraints or would cause navigation into one or more regions that the navigational processor(s) determine are not navigable (e.g., parked car locations, curbs, walls, etc.) based on analysis of the captured images.

Once a planned trajectory has been generated, various controls may be implicated in order to cause the host vehicle to navigate according to the planned trajectory. For example, in some embodiments, the navigational processor(s) may generate one or more control signals for causing adjustment(s) to steering and/or braking actuators. By controlling such actuators (or any others that may affect motion of the host vehicle), the host vehicle can be caused to navigate according to the planned trajectory. In some cases, such navigation may exactly follow the planned trajectory or segments of the planned trajectory. In other cases, however, the planned trajectory may be used as a guide, and the actual trajectory of the host vehicle may depart in one or more segments from the planned trajectory. For example, the actual trajectory may follow the planned trajectory within some specified tolerance for the host vehicle navigation (e.g., within a variance of ±1%, ±5%, 10 cm, 20 cm, etc.).

Figure 41:
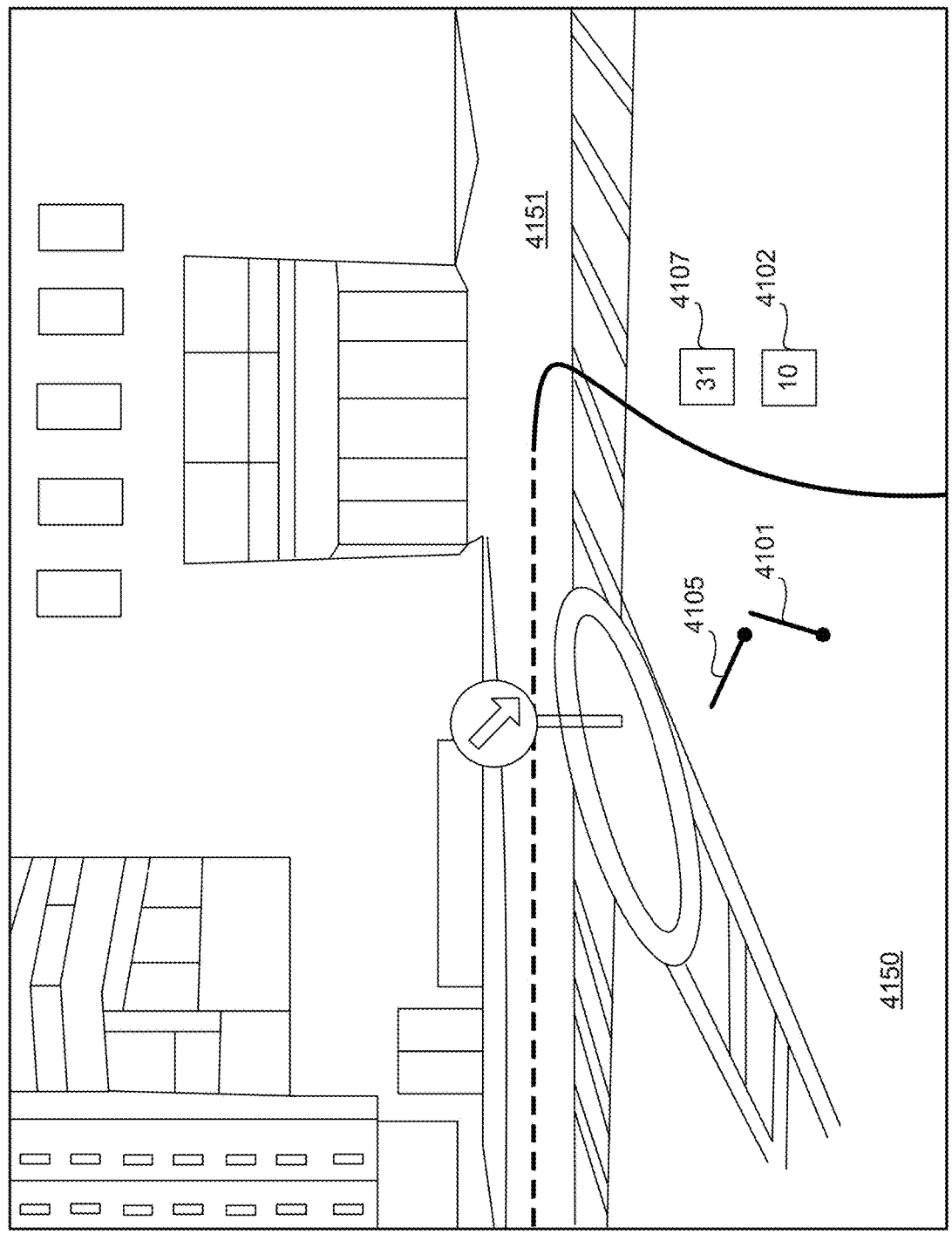
FIG. 41 illustrates an example situation where image, directional, and distance inputs can be used in generating a planned trajectory for a host vehicle, according to exemplary disclosed embodiments.

FIG. 41 illustrates another example of generating a planned trajectory for a host vehicle using directional indicators and distance estimates to resolve navigational ambiguities. For example, as shown in FIG. 41, a road 4150 on which the host vehicle travels intersects at a "T" junction with another road 4151 that curves away ahead and to the left and that also curves away ahead and to the right relative to the road on which the host vehicle travels. In such an example, there may be navigational ambiguity regarding at least which direction to turn on the crossing road (left or right). As the captured image also lacks a representation of a road edge to the right of the host vehicle and lacks standard lane markings in the portion of the road where the host vehicle is located, there may exist some navigational ambiguity regarding what position within the current road segment is most appropriate for the host vehicle.

As illustrated in FIG. 41, a first directional indicator 4101 and a first distance estimate 4102 may be provided indicating that at approximately 10 meters from the current position of the host vehicle, the host vehicle should have an orientation rotated to the right relative to its current heading direction. For example, directional indicator 4101 may indicate a suggested heading direction of about 10 degrees of rotation to the right of the host vehicle's current heading direction. The supplied directional indicator and distance estimate may indicate that before the host vehicle can make a turn onto road 4151, it must first bear to the right to maintain an appropriate position with respect to road 4150.

In the example illustrated by FIG. 41, the navigational processors may also be supplied with a second directional indicator 4105 and a second distance estimate 4107. Together, this directional indicator/distance estimate pair may suggest to the navigational processor(s) that at approximately 31 meters from the current position of the host vehicle, the host vehicle should have an orientation rotated to the left relative to its current heading direction. For example, directional indicator 4105 may indicate a suggested heading direction of about −60 degrees of rotation relative to the host vehicle's current heading direction. This supplied directional indicator and distance estimate may resolve a navigational ambiguity associated with whether to navigate to the left or to the right on road 4151. For example, through analysis of one or more captured images in view of directional indicator 4105 and distance estimate 4107, the navigational processor(s) may determine that road 4151 extends to the left of the host vehicle's current position. The navigational processor(s) may further determine that the curvature of road 4151, a location of a navigationally valid segment of road 4151, and/or a direction of road 4151 are consistent with directional indicator 4105 and distance estimate 4107. That is, the navigational processor(s) may determine that at a distance of about 31 meters from the host vehicle's current position, the host vehicle can assume a heading direction approximately −60 degrees relative to its current heading direction, and such an orientation and position will position the host vehicle along a valid segment of road 4151 or at least close enough to a valid segment of road 4151 to determine that any navigational ambiguity relative to road 4151 should be resolved by turning left onto road 4151.

In the example shown in FIG. 41, there are two pairs of directional indicators and distance estimates provided to the navigational processor(s). More or fewer pairs of directional indicators and distance estimates, however, may be provided. For example, in some embodiments, a third directional indicator/distance estimate pair may correspond to a suggestion for navigating over a road segment that occurs before a road segment implicated by directional indicator 4101/distance estimate 4102 (e.g., closer to the host vehicle than the road segment implicated by directional indicator 4101/distance estimate 4102). As an example, a third pair may indicate that after 5 meters of travel from the host vehicle's current position, the host vehicle should have an orientation of 0 degrees relative to its current heading direction ("go straight"). Alternatively, in some embodiments, a third directional indicator/distance estimate pair may correspond to a suggestion for navigating over a road segment that occurs after a road segment implicated by directional indicator 4105/distance estimate 4107 (e.g., farther from the host vehicle than the road segment implicated by directional indicator 4105/distance estimate 4107). For example, a third pair may indicate that at a position of about 75 meters relative to the host vehicle's current position, the host vehicle should have an orientation of about −45 degrees relative to its current heading direction.

Using directional indicators 4101 and 4105 and distance estimates 4102 and 4107, the navigational processor(s) may analyze one or more images captured of an environment of the host vehicle to identify in the one or more images a representation of a road segments consistent with the provided values. For example, the navigational processors may analyze the images to determine whether a navigable road surface is present at the distances suggested by the received distance estimates. Further, the processor(s) may determine through image analysis whether at the locations suggested by the distance estimates (or in areas in the vicinity of the distance estimates) heading directions for the host vehicle suggested by the directional indicators constitute valid target trajectory directions. If so, a planned trajectory for the host vehicle may be generated based, at least in part, upon the provided directional indicators specifying target trajectory directions and on the distance estimates associated with the provided directional indicators. In some cases, the generated planned trajectory for the host vehicle may extend along a first road segment implicated by a first directional indicator/distance estimate pair, a second road segment implicated by a second directional indicator/distance estimate pair, a third road segment implicated by a third directional indicator/distance estimate pair, etc. A road segment implicated by a particular directional indicator/distance estimate pair may include a location corresponding to the distance estimate (e.g., in FIG. 41, a distance 31 meters from the host vehicle, as indicated by distance estimate 4107, may correspond to a location in a segment of road 4151 where the host vehicle may validly travel in a direction specified by directional indicator 4105).

On the other hand, however, a road segment implicated by a particular directional indicator/distance estimate pair may not directly correspond spatially to a received directional indicator/distance estimate pair. In some embodiments, a directional indicator/distance estimate pair may refer to a location where no navigable road segment exists or where the host vehicle cannot validly travel along a road segment at the specified distance. For example, in some cases, a directional indicator/distance estimate pair, such as indicator 4105 (of −60 degrees) and estimate 4107 (of 31 m) may correspond to a location on the curb on the far side of road 4151. While such a location on the curb is not navigable by the host vehicle, the navigational processor(s) can still navigate based on the received directional indicator/distance estimate pair by using this pair effectively as an indication of intended course for the host vehicle. Through image analysis, the navigational processors may determine that the received directional indicator/distance estimate pair corresponds to a location that would cause the host vehicle to drive on the curb. But, the processor(s) would also determine from the receive pair an intent to navigate the vehicle to the left at an orientation of −60 degrees relative to its current position. While such a heading at approximately 31 meters, as specified by distance estimate 4107, would result in driving on the curb, the navigational processor(s) may determine from the image analysis that a segment of road 4151 located 28 meters from a current position includes a navigable path consistent with the −60 degree target trajectory direction specified by directional indicator 4105. In such cases, the navigational processors may generate a planned trajectory for the host vehicle that traverses the navigable path of the road segment recognized from the image analysis. The generated planned trajectory 4160, therefore, may obtain the target trajectory direction of −60 degrees relative to a current heading direction at a distance of 28 meters from the current position rather than at 31 meters from the current position, as suggested by the distance estimate 4107. In this way, the navigational processor(s) may use the received directional indicator/distance estimate pairs as guidelines or suggestions that convey navigational goals rather than absolute metrics to be achieved by the planned trajectories for the host vehicle. In this way, the received directional indicator/distance estimate pairs can operate as navigational suggestions that may be relied upon to resolve potential navigational ambiguities, and analysis of the captured images may enable the navigational processor(s) to identify navigable road segments consistent with the navigational suggestions (even if the planned trajectory does not intersect particular locations specified by the received directional indicator/distance estimate pairs).

Indeed, an actual distance on a planned trajectory (relative to a current host vehicle location) where a particular target trajectory direction specified by a received directional indicator is achieved may vary significantly relative to a received distance estimate associated with the received directional indicator. In other words, a planned trajectory may be generated consistent with a one or more received directional indicator/distance estimate pairs even where the received distance estimates do not correspond to locations of valid road segments. For example, in some cases, navigational ambiguities may be resolved and valid planned trajectories for a host vehicle may be generated where an actual distance along the planned trajectory between the current position of the host vehicle and an actual onset of a first target directory direction differs from the first distance estimate by up to 50% of the first distance estimate. In other cases, navigational ambiguities may be resolved and valid planned trajectories for a host vehicle may be generated where an actual distance along the planned trajectory between the current position of the host vehicle and an actual onset of a first target directory direction differs from the first distance estimate by up to 100% of the first distance estimate.

Figure 42:
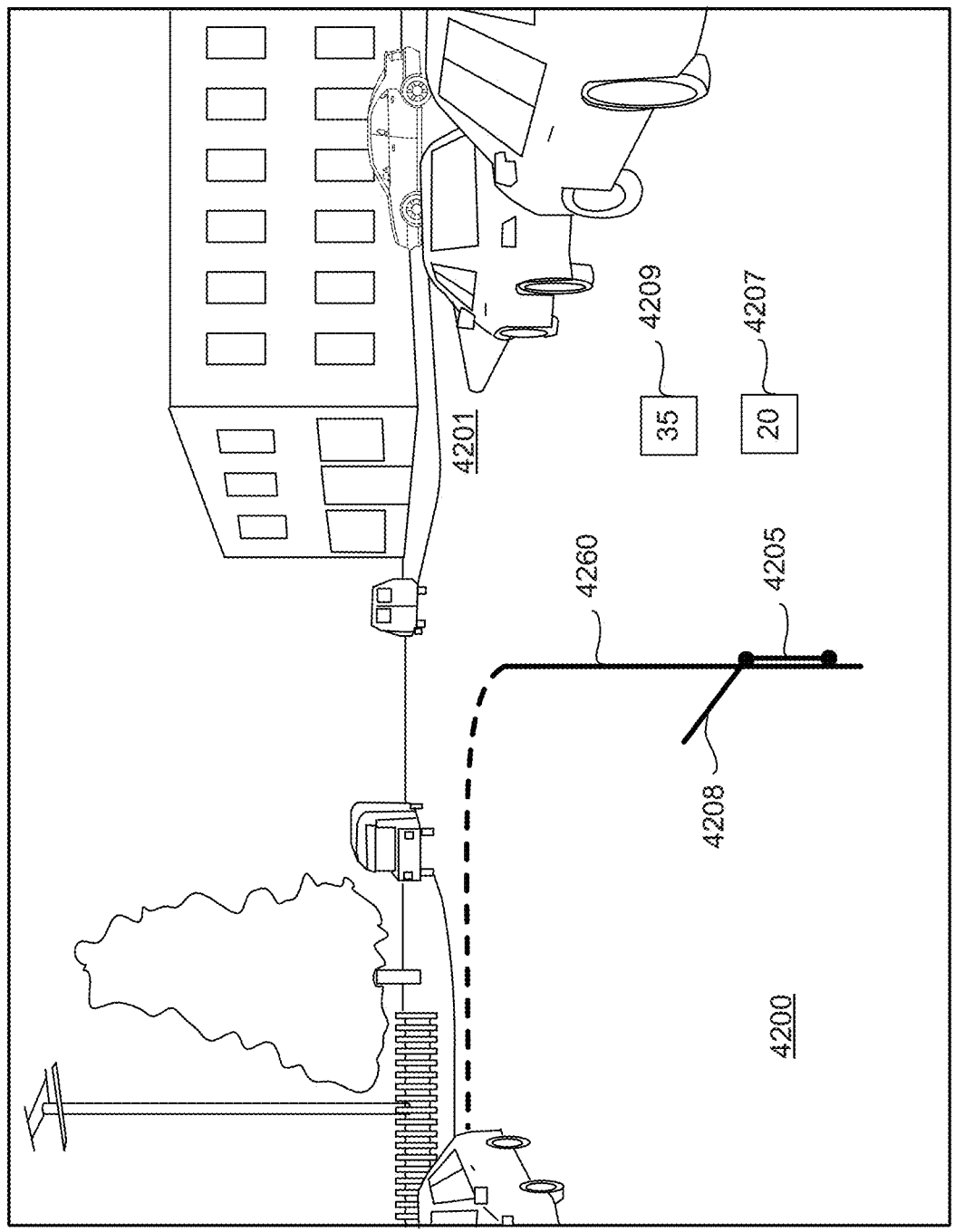
FIG. 42 illustrates an example situation where image, directional, and distance inputs can be used in generating a planned trajectory for a host vehicle, according to exemplary disclosed embodiments.

In some embodiments, a planned trajectory may be generated even where a received directional indicator/distance estimate pair suggests only a location of an intermediate location along an intended maneuver. For example, FIG. 42 shows a captured image including a representation of a road 4200 and another road 4201 that crosses road 4200 at about 90 degrees. As previously noted, at this junction between roads 4200 and 4201, it may be possible for the host vehicle to continue straight on road 4200, turn right on road 4201, or turn left on road 4201. In some cases, a left turn on road 4201 may be suggested by a received directional indicator/distance estimate pair indicating a target trajectory direction of −90 degrees at an estimated distance from a current position of the host vehicle. In this case, a directional indicator of −90 degrees may prompt the navigational processor(s) to analyze the captured image(s) for a navigable path near the estimated distance that would result in a left turn of the host vehicle (e.g., to achieve the −90 degree heading).

Such a left turn onto a 90 degree crossing road, however, need not be specified by at −90 degree heading. Rather, the navigational processor(s) may resolve the navigational ambiguity in favor of a left turn onto road 4201 even where a directional indicator other than −90 degrees is received. For example, in the example shown in FIG. 42, a first directional indicator 4205/distance estimate 4207 pair may suggest that the host vehicle be traveling at a heading of 0 degrees at a distance of 20 meters. Next, a second directional indicator 4208/distance estimate 4209 pair may suggest that the host vehicle be traveling at a heading of about −45 degrees at a distance of 35 meters relative to a current position of the host vehicle. Based on this information, the navigational processor(s) may analyze the captured image(s) and determine that a heading of −45 degrees at about 35 meters from the host vehicle's current location would correspond to a valid, navigable location along road 4200 consistent with initiation of a valid left turn onto road 4201. As a result, a planned trajectory 4260 may be generated corresponding to a 90 degree left turn from road 4200 onto road 4201 even where the received directional indicator 4208/distance estimate 4209 pair suggests a heading direction less than 90 degrees.

Figure 43:
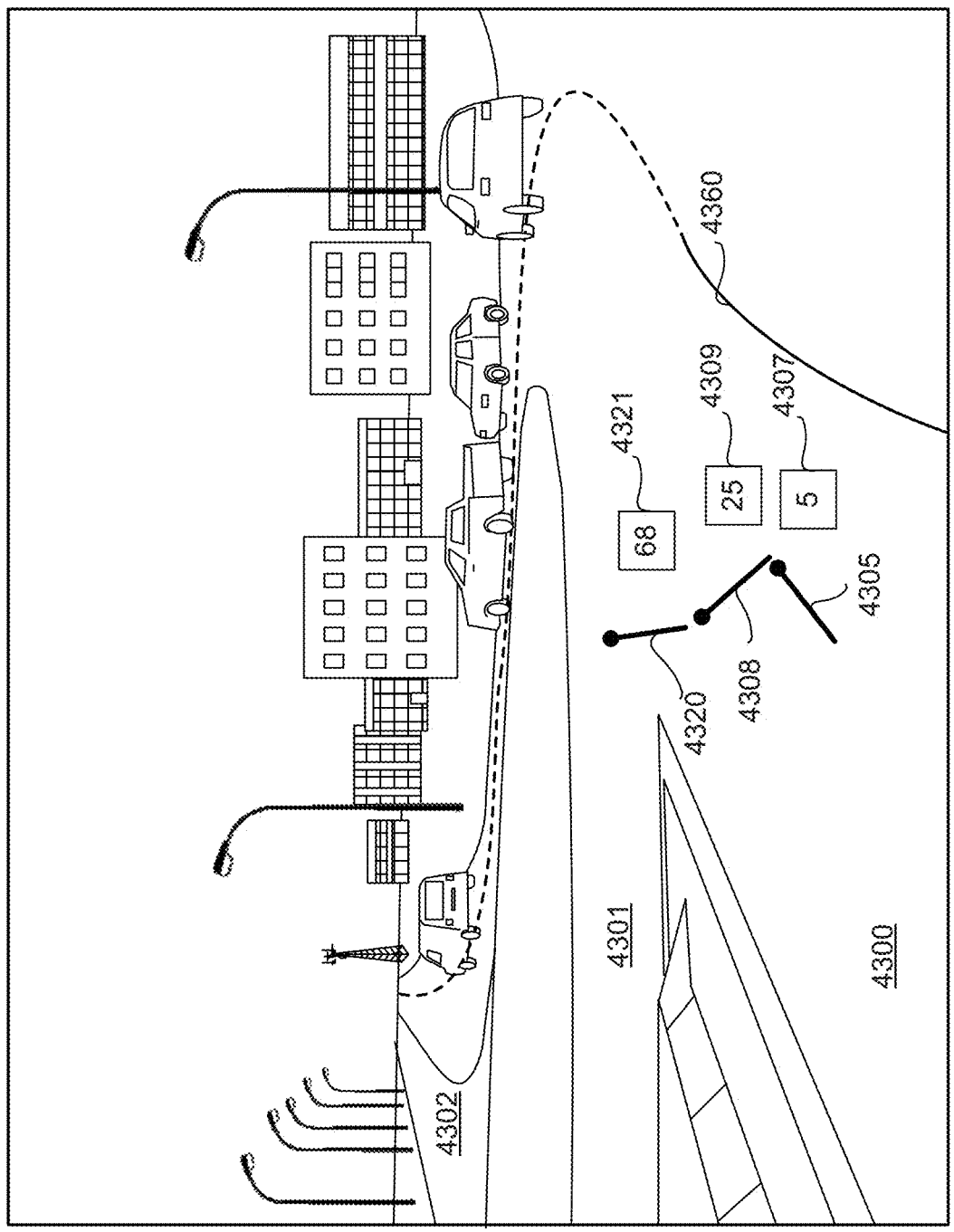
FIG. 43 illustrates an example situation where image, directional, and distance inputs can be used in generating a planned trajectory for a host vehicle, according to exemplary disclosed embodiments.

The disclosed system may also assist in resolving ambiguity and generating planned trajectories for complex road features. For example, FIG. 43 illustrates a captured image of a traffic circle 4301 having an entrance from road 4300 and an exit onto road 4302. The traffic circle, however, may include other entrances and exits. For example, traffic circle 4301, as illustrated, includes another potential exit to the right and before road 4302 and may include one or more potential entrances/exits occurring after road 4302 along a counterclockwise direction of traffic circle 4301. As the host vehicle approaches traffic circle 4301, a navigational ambiguity may exist with respect to where and how to enter the traffic circle. Additionally, a navigational ambiguity may exist with respect to where and how the host vehicle should exit from the traffic circle (e.g., which exit to take and where on the unmarked pavement the host vehicle should travel, etc.). Such ambiguity may be resolved, for example, based on one or more received directional indicator/distance estimate pairs and analysis of available captured images.

For example, in some embodiments, as the host vehicle approaches traffic circle 4301, the navigational processors may receive a first directional indicator 4305/distance estimate 4307 pair that may assist the processor(s) in determining an appropriate planned trajectory for entering the traffic circle. For example, first directional indicator 4305/distance estimate 4307 pair may suggest that at a distance ahead of about 5 meters, the host vehicle should achieve a heading direction of about 45 degrees relative to its current heading direction. Next, the navigational processors may receive a second directional indicator 4308/distance estimate 4309 pair that may assist the processor(s) in determining an appropriate planned trajectory for traversing the traffic circle past a first possible exit from the traffic circle. For example, second directional indicator 4308/distance estimate 4309 pair may suggest that at a distance ahead of about 25 meters, the host vehicle should achieve a heading direction of about −45 degrees relative to its current heading direction. Additionally, the navigational processors may receive a third directional indicator 4320/distance estimate 4321 pair that may assist the processor(s) in determining an appropriate planned trajectory for exiting the traffic circle onto road 4302. For example, third directional indicator 4320/distance estimate 4321 pair may suggest that at a distance ahead of about 68 meters, the host vehicle should achieve a heading direction of about −5 degrees relative to its current heading direction. Using the three received directional indicator/distance estimate pairs together with analysis of the captured image(s), the navigational processors can determine a planned trajectory 4360 consistent with the received directional indicator/distance estimate pairs and that traverses first, second, and third road segments identified based on analysis of the captured image(s) in view of the received directional indicator/distance estimate pairs.

The disclosed system may be useful in resolving navigational ambiguities and for generating planned trajectories for a host vehicle relative to various other types of road features. For example, the system may rely upon received directional indicator/distance estimate pairs and image analysis (e.g., to identify navigable road segments consistent with the received directional indicator/distance estimate pairs) to generate planned trajectories in driving situations involving exit lanes from a highway, merge lanes onto a highway, adjacent lanes into which a host vehicle is intended to enter, left turn lanes, right turn lanes, parking lots, road junctions lacking lane markings, urban roads with obscured road edges, roads with incomplete or lacking lane markings, etc.

The navigational processor(s) may generate planned trajectories for the host vehicle based on inputs in addition to received directional indicator/distance estimate pairs. In some embodiments, for example, a planned trajectory may be based on host vehicle speed, host vehicle acceleration, or any other suitable parameter value. In such embodiments, at least one navigational processor may be programmed to receive an indicator of a current speed of the host vehicle. With this information, the analysis of the one or more images captured of the host vehicle environment may further be performed in view of the indicator of the current speed of the host vehicle such that the identification in the one or more images of a representation of a navigable road segment may be consistent with the indicator of the current speed of the host vehicle. In such cases, the generation of the planned trajectory for the host vehicle may be further based on the current speed of the host vehicle. Similarly, at least one navigational processor may be programmed to receive an indicator of a current acceleration of the host vehicle. With this information, the analysis of the one or more images captured of the host vehicle environment may further be performed in view of the indicator of the current acceleration of the host vehicle such that the identification in the one or more images of a representation of a navigable road segment may be consistent with the indicator of the current acceleration of the host vehicle. In such cases, the generation of the planned trajectory for the host vehicle may be further based on the current acceleration of the host vehicle.

Returning to FIG. 42, one example of using current speed and/or current acceleration to generate a planned trajectory for a host vehicle may again begin with received directional indicator/distance estimate pairs. In this example, the directional indicator 4208/distance estimate 4209 pair may suggest that at about 35 meters from a current position of the host vehicle, the host vehicle should achieve a heading direction of about −45 degrees with respect to a current heading direction. As described above, such a received directional indicator/distance estimate pair may suggest that the host vehicle is to initiate a left turn in approximately 35 meters or earlier. The navigational processor(s) may analyze one or more captured images to seek navigable road segments consistent with the received directional indicator/distance estimate pairs. In some cases, the navigational processor(s) may identify crossing road 4201 that crosses road 4200 at about 25 meters ahead of a current position of the host vehicle. The processor may further determine that a second road (not shown) crosses road 4200 at a distance of about 45 meters ahead of the current position of the host vehicle. Thus, there may be navigational ambiguity regarding whether to turn onto road 4201 or the more distant crossing road. And, while the received directional indicator/distance estimate pair suggesting a left turn at about 35 meters may provide an initial hint/indication of an intent to cause the host vehicle to turn left, the received directional indicator/distance estimate pair may not unambiguously indicate the particular road onto which the left turn should be made. In fact, in this example, the suggested orientation of the host vehicle at 35 meters may indicate a left turn at a location that is equidistant from road 4201 at 25 meters and the more distant crossing road at 45 meters. In such cases, it may be useful for the navigational processor(s) to sample and consider the current speed and/or acceleration of the host vehicle. With this information and analysis of the captured images to determine distances to the crossing streets onto which a left turn may be viable, the navigational processor(s) may determine that the host vehicle is traveling at a current speed that is too high for safely decelerating and turning onto crossing street 4201 at 25 meters. The processor(s) may determine, however, that there is sufficient time and space to safely decelerate the host vehicle to a level suitable for turning left onto the more distant crossing street at 45 meters. Thus, a planned trajectory may be generated that avoids a left turn onto the closer crossing street and, instead, makes a left turn onto the more distant crossing street.

In some instances, a particular directional indicator/distance estimate pair may appear to suggest more than one potential navigation solution. For example, in a situation where a road passes two crossing streets in close proximity (e.g., one at 20 meters from a current location and the other at 40 meters from a current location), a directional indicator/distance estimate pair of 90 degrees and 25 meters may suggest a right turn at a location occurring between the available crossing streets that the processor identifies in captured images. In such a situation, however (as described above), the processor(s) may select the solution that more closely agrees with the suggestion made by the directional indicator/distance estimate pair. Thus, in this example and if the host vehicle is not traveling at a rate of speed or at an acceleration level that precludes a turn onto the closer crossing street at 20 meters, the processor(s) may generate a planned trajectory that includes a turn onto the closer street as it more closely agrees with the received directional indicator/distance estimate pair.

In some cases, the received directional indicator/distance estimate pair may suggest a maneuver that corresponds equally to two different road segments identified in one or more captured images. Continuing with the example above, a received directional indicator/distance estimate pair may suggest a right turn at a location 30 meters from a current position. In this case, if both the crossing street at 20 meters and the crossing street at 40 meters are identifiable in one or more captured images (and that the speed/acceleration/or other characteristic of the host vehicle does not favor one crossing street over the other), the processor may reach the conclusion that both crossing streets serve as viable navigational solutions for the suggested right turn. In such cases, the processor may break the tie using any suitable technique (e.g., a random number generator, etc.). In other cases, the processor(s) may break the perceived tie by looking for additional information. For example, the processor(s) may further analyze the crossing streets to determine whether there are any distinguishing features of the crossing streets that may suggest a turn onto one street versus the other (e.g., whether one of the streets is a driveway versus a through road; whether one road is paved and the other is not, etc.). Additionally or alternatively, the processor(s) may look to subsequent directional indicator/distance estimate pairs to determine whether such subsequent pairs fit better with identifiable features (e.g., based on image analysis or by referencing stored map data, etc.) associated with one street more than another. For example, after the right turn suggested by the first directional indicator/distance estimate pair, a second directional indicator/distance estimate pair may suggest a left turn after 15 meters. Based on image analysis, or references to stored map information, etc., the processor(s) may determine that while both crossing streets appear to fit the first received directional indicator/distance estimate pair equally well, only the second crossing street would be consistent with a subsequent left turn after about 15 meters. In such cases, the processor(s) may use this additional analysis to select the appropriate road segments for navigation and generate a planned trajectory traversing those selected road segments.

As another example, the same (or similar) directional indicator and distance estimate (e.g., a direction indicator/distance estimate pair) in two different scenarios or environments may yield entirely different paths when the road features in the different scenarios have differing structures (e.g., roads directed in different directions, roads with a different number of travel lanes, etc.). For example, the distance estimate may indicate to the system to look for valid paths at or around a specified distance from the host vehicle. The system may further check for valid paths at or around the specified distance at which the vehicle will achieve the specified orientation (e.g., specified by the directional indicator). That is, in some embodiments, the processor may use a distance estimate as a cue for where to look in a captured image to determine viable road segments in a zone around a target area. Accordingly, the same (or similar) distance estimate and direction indicator may be used to resolve two entirely different scenarios, including scenarios in which the actual desired trajectory is completely different between the scenarios. Using the same (or similar) directional indicator and distance estimate, the system may provide different predicted paths having entirely different layouts, according to the layout of the road (or drivable paths) ahead of the host vehicle. However, in these examples, the same (or similar) directional indicator and distance estimate may serve equally well for both scenarios.

Optionally, other characteristics of the host vehicle may be used to identify navigable roads in a captured image. For example, specific vehicle braking characteristics may be considered when determining whether a suggested turn can safely be made subsequent to a deceleration of the host vehicle. Other considerations may also be relied upon. For example, in some cases, the speeds of one or more target vehicles detected in an environment of the host vehicle (e.g., in one or more lanes adjacent to a lane of travel of the host vehicle) may be used together with a distance estimate to a suggested lane crossing to determine a planned trajectory that maintains safe buffer distances from the detected target vehicles.

The directional indicator/distance estimate pairs provided to the one or more navigational processor(s) may originate from various sources. In some embodiments, such inputs may be derived from the outputs of one or more route planners, outputs of automated navigational programs, user control outputs (e.g., joysticks), or may be derived from stored map information. Using these outputs or stored information (which on their own may be insufficient for generating planned trajectories for an autonomous vehicle), one or more processors may derive directional indicators and distance estimates for the host vehicle corresponding to an intended maneuver (e.g., "turn right in 50 meters" or "take the third exit at the traffic circle," as may be output from an automated GPS-based navigation program). For example, such automated programs may provide insufficient information for entering a traffic circle, navigating around a traffic circle, and achieving a suitable orientation for exiting at an intended location from the traffic circle. The derived directional indicators and distance estimates may be compared to one or more captured images, and the navigational processor(s) may determine whether navigable road segments exist that are consistent with and available for performing a maneuver suggested by the derived directional indicators and distance estimates. Upon identifying available road segments for completing maneuvers suggested by the received directional indicator/distance estimate pairs, a planned trajectory for the host vehicle may be generated that traverses the road segments identified through analysis of the captured images.

In the embodiments described above, one or more directional indicator/distance estimate pairs are used to identify valid road segments in captured image(s). Then, a planned trajectory for the host vehicle may be generated that links the identified road segments. Other types of input to the navigational processor(s), however, may be used for identifying viable road segments and for generating a planned trajectory for a host vehicle. For example, in some embodiments, as an alternative to supplying the navigational processor(s) with directional indicator/distance estimate pairs, more complex inputs may be provided. In some cases, for example, a three-dimensional polynomial spline representing a target trajectory for a host vehicle may be supplied to the navigational processor(s). Such splines may be similar to or the same as the splines described above that may be generated based on crowd sourcing of actual vehicle trajectories along various road segments and that may be stored as part of a sparse map 1900 for assisting in navigation of an autonomous vehicle.

In such embodiments, at least one navigational processor may receive, from a camera, one or more images representative of an environment of the host vehicle. The processor may also receive a representation of a three-dimensional spline defining a target trajectory for the host vehicle. With these inputs, the processor may analyze the one or more images in view of the received representation of the three-dimensional spline to determine whether the target trajectory defined by the three-dimensional spline is consistent with road segments identified based on the analysis of the one or more captured images representing an environment of the host vehicle. If the target trajectory is consistent with the identified road segments, the processor may cause at least one adjustment of a navigational actuator of the host vehicle to cause the host vehicle to navigate relative to the target trajectory. As noted above, navigation relative to the target trajectory may result in an actual trajectory of the host vehicle exactly following the target trajectory path. In other cases, however, the actual trajectory may differ from the target trajectory (e.g., by some variance or operational tolerance of the navigational system).

On the other hand, if the target trajectory is not consistent with the identified road segments (e.g., if the received spline suggests that the host vehicle is to navigate onto a curb or other invalid region), the processor may generate a planned trajectory for the host vehicle, based at least in part on the target trajectory, such that the planned trajectory is made to extend along at least a some of the identified road segments and cause at least one adjustment of a navigational actuator of the host vehicle to cause the host vehicle to navigate relative to the planned trajectory. In other words, the processor may use the received target trajectory as a guide (and may even replicate the received target trajectory in a generated planned trajectory), but may displace the planned trajectory from the target trajectory by some amount (or through a transformation) such that the planned trajectory traverses valid road surfaces identified based on the image analysis performed by the navigational processor(s) on the one or more captured images.

Not only may such an embodiment result in refined planned trajectories (e.g., trajectories that correspond to or relate to the received three-dimensional splines representing a desired path for a vehicle on one or more road segments), but such an embodiment may also be able to confirm whether the localization function described above (e.g., navigating based on sparse maps and recognized landmarks) is operational. For example, if the processor determines that a received spline is not consistent with road segments identified in one or more captured images, the processor may determine that the sparse map navigation operation is not functioning properly. In this way, the navigational system may serve as a check for the sparse map navigation system to ensure redundancy and safe operation even where the sparse map navigation may experience uncertainty in the localization function, for example. Additionally, by determining an amount that a received spline must be translated or transformed for consistency with road segments observed in the one or more captured image(s), the processor may determine a magnitude of error in the sparse map navigation system (e.g., an amount of error in the localization function) and may prompt a suitable correction. In some cases, an observed error result not from any operation of the navigational system, but rather from a physical change in one or more road segments. In such cases, the observed disparity between a received spline and observed road segments identified in the captured images may be used to prompt an upload of collected visual and trajectory information and an update to the stored sparse map.

As described above, the planned trajectories generated for the host vehicle may be provided by one or more learning systems, such as a trained neural network. For example, a learning system, such as a neural network may be trained using a plurality of images of actual road segments collected during actual drives over the road segments. In addition to the visual information collected from these drives, other actual drive data may also be accumulated for the road segments and used to train the neural network. For example, actual trajectories of many vehicles may be recorded and overlaid with the collected images as examples for the neural network of available paths for corresponding imaged road segments. Moreover, direction intention tags may also be recorded and provided to the neural network to train the network on viable paths corresponding to various intended directional maneuvers. In this way, when the trained neural network encounters a directional indicator and distance estimate suggesting the initiation of a left turn maneuver at a certain distance from a current position, the neural network may be able to rely upon many examples (e.g., hundreds, thousands, or millions of similar situations) provided during training on which it can rely to generate a planned trajectory consistent with the paths taken by other vehicles in similar situations upon which the network was trained.

In some cases, the neural network may be trained using actual drive data but intentionally erroneous distance tag information corresponding to intended maneuvers. For example, in cases where actual vehicles were recorded making left turns at a certain intersection, the neural network can be provided with tags indicating a left turn intention, but may also be supplied with distance information reflecting errors in where the recorded cars initiated the left turn maneuvers. Using such a technique of training a neural network in view of intentionally introduced errors may enable the network to better predict planned trajectories for a host vehicle based on a range of distance estimate values that do not directly correspond to observed road segments in a captured image. For example, such a trained network may successfully generate a planned trajectory including a left turn for a vehicle at an intersection that occurs at 50 meters ahead of a current position even where a supplied distance estimate suggests a left turn at 25 meters, 40 meters, 60 meters, 75 meters, etc.

The network may also be trained on a range of different cameras with different fields of view. Such training can support different types of driving, for example, sharp curves as opposed to driving straight at higher speeds.

Navigation in Vehicle Crossing Scenarios

Many vehicles, whether employing an advanced driver assist system or a more fully autonomous system, may be configured to identify certain situations in which the host vehicle has a planned trajectory intersecting or overlapping with a projected trajectory of one or more target vehicles. In such situations, one or more host vehicle systems may take an action. For example, a system may provide a warning to an operator/driver of the vehicle (e.g., audible, visual, etc.). In some cases, the system may determine one or more navigational actions to take and cause actuation of vehicle systems in order to perform the navigational action(s) (e.g., automatic braking, steering of the vehicle, etc.). The navigational action may be determined and enacted in order to enable the host vehicle to avoid a collision with the target vehicle.

Figure 44A:
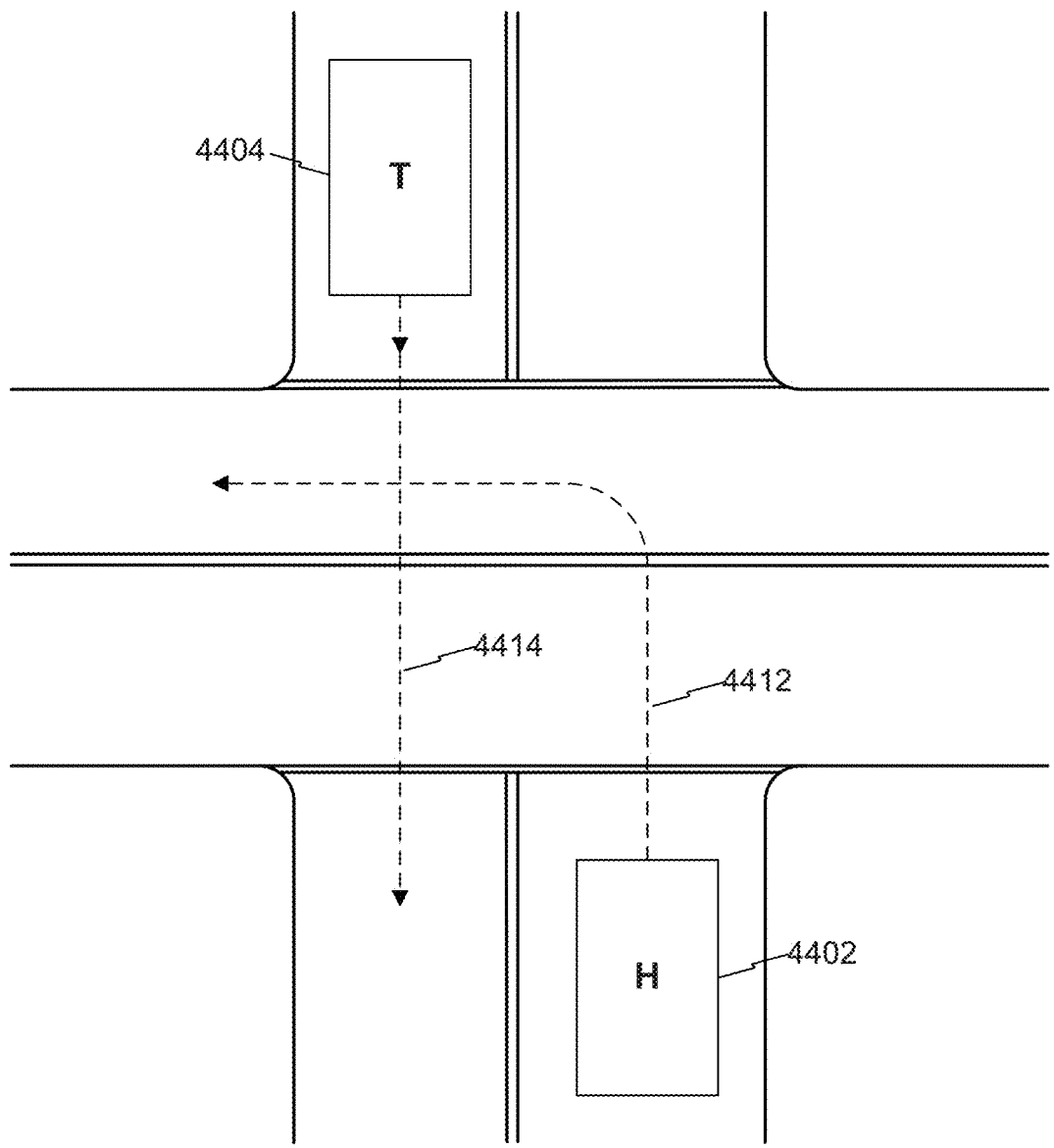
FIG. 44A provides a diagrammatic illustration of a driving scenario involving a host vehicle trajectory crossing a trajectory of a target vehicle in a right lane driving jurisdiction.

FIG. 44A provides a diagrammatic illustration of a driving scenario (e.g., a left turn across path (LTAP)) involving a host vehicle trajectory crossing a trajectory of a target vehicle in a right lane driving jurisdiction. Such jurisdictions may include, for example, the United States, Germany, France, Canada, etc. In this scenario, host vehicle 4402 is planning to make a left turn through an intersection along a path that crosses a projected trajectory of target vehicle 4404. In this scenario, the navigational system may be configured to take an action if, for example, a collision risk is determined to exist between the host vehicle and the target vehicle. Such actions may include, among others, issuing an audible warning to a driver of the host vehicle, issuing a visual warning to a driver of the host vehicle, issuing a control signal to cause actuation of the host vehicle brakes to slow or stop the host vehicle, issuing a control signal to cause actuation of the host vehicle throttle system to avoid an increase in speed of the host vehicle, etc. Such a determination of whether a collision risk exists between the host vehicle and the target vehicle may depend on whether the planned trajectory 4412 of the host vehicle crosses a projected trajectory 4414 of the target vehicle, as shown in FIG. 44A. Such a determination, however, may also depend on other information, such as current velocities of the host and target vehicles; a current lateral offset between the host and target vehicle; a current longitudinal offset between the host and target vehicle; a direction and/or projected path of the host vehicle during a desired navigational maneuver intended to further the navigational goals of the host vehicle (e.g., driving along a path toward an intended destination); a determined, expected collision point between the host vehicle and the target vehicle based on current trajectory information; any combination of these parameters or any other suitable parameters. Such information may be derived based on the outputs of various sensors, including, e.g., one or more cameras, LIDAR systems, RADAR, etc.

Figure 44B:
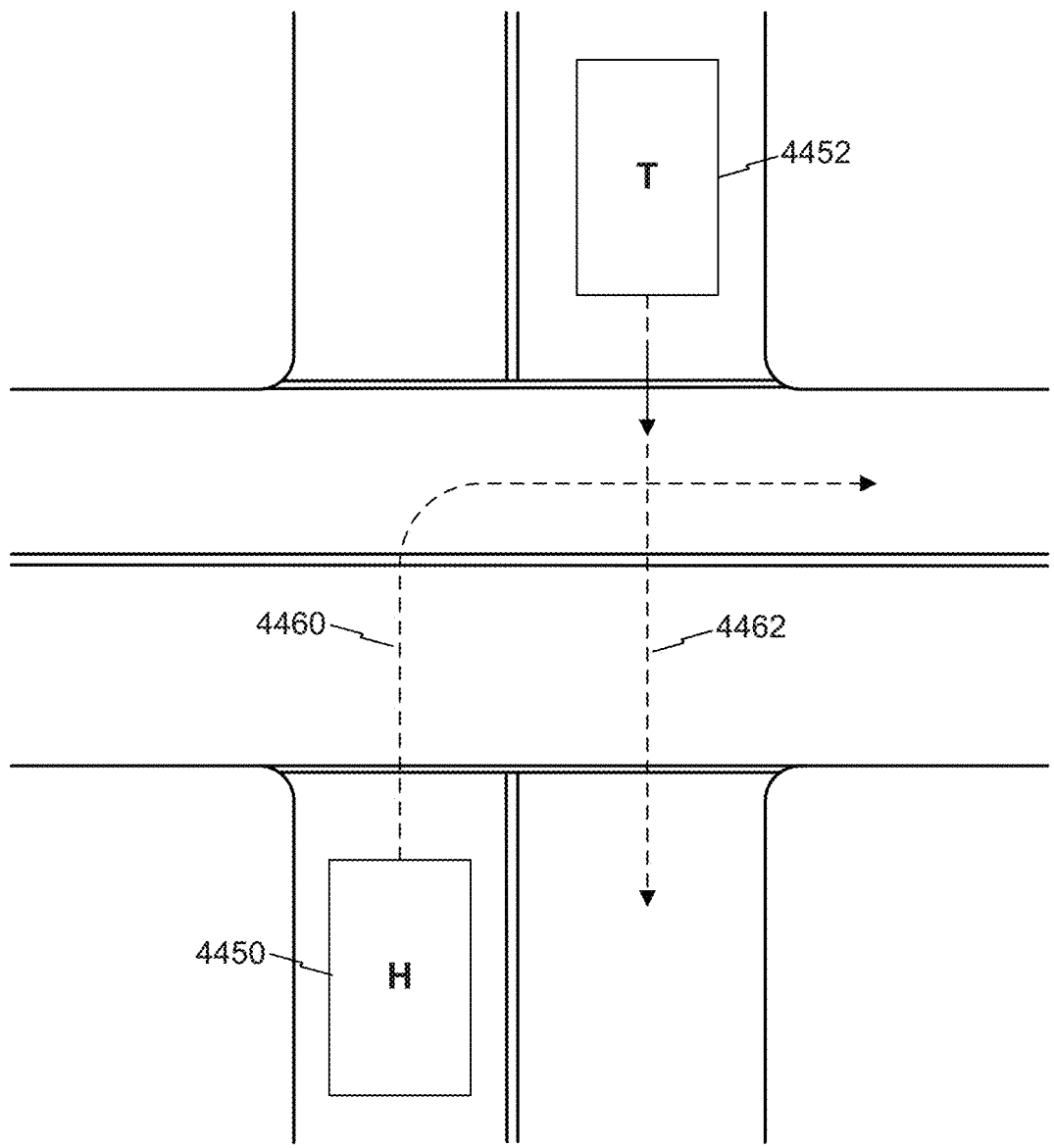
FIG. 44B provides a diagrammatic illustration of a driving scenario involving a host vehicle trajectory crossing a trajectory of a target vehicle in a left lane driving jurisdiction.

FIG. 44B provides a diagrammatic illustration of a driving scenario (e.g., a right turn across path (RTAP)) involving a host vehicle trajectory crossing a trajectory of a target vehicle in a left lane driving jurisdiction. Such jurisdictions may include, for example, Great Britain, Japan, Ireland, etc. In this scenario, a host vehicle 4450 is planning a right turn that crosses the projected trajectory of target vehicle 4452. Similar to the scenario of FIG. 44A, an action may be taken by the host vehicle navigation system (e.g., issuing a warning, braking, etc.) if the host vehicle navigation system determines that a collision risk exists between the host vehicle and the target vehicle, based on the planned trajectory 4460 of the host vehicle, the projected trajectory 4462 of the target vehicle, and any of the other sources of information described above with respect to FIG. 44A.

In both the scenarios represented by FIGS. 44A and 44B, the host vehicle navigation system would be expected to take an action (e.g., issue a warning, brake, etc.) where at minimum two conditions existed: that the planned trajectory of the host vehicle was determined to cross a projected (e.g., an estimated) trajectory of the detected target vehicle, and that a potential collision would result if the host vehicle was to follow the planned trajectory across the projected trajectory of the target vehicle. For example, the potential collision may be determined based on a timing at which the planned trajectory will cross the projected trajectory of the target vehicle. This may be based on, for example, a determined speed of the target vehicle, a determined acceleration of the target vehicle, a current and/or planned speed or acceleration of the host vehicle, etc. In some cases, the host vehicle navigation system may also take such actions if following the planned trajectory by the host vehicle would result in impingement upon a safety or comfort envelope with the detected target vehicle even if a determination is made that no collision would result between the host vehicle and the target vehicle.

Figure 45A:
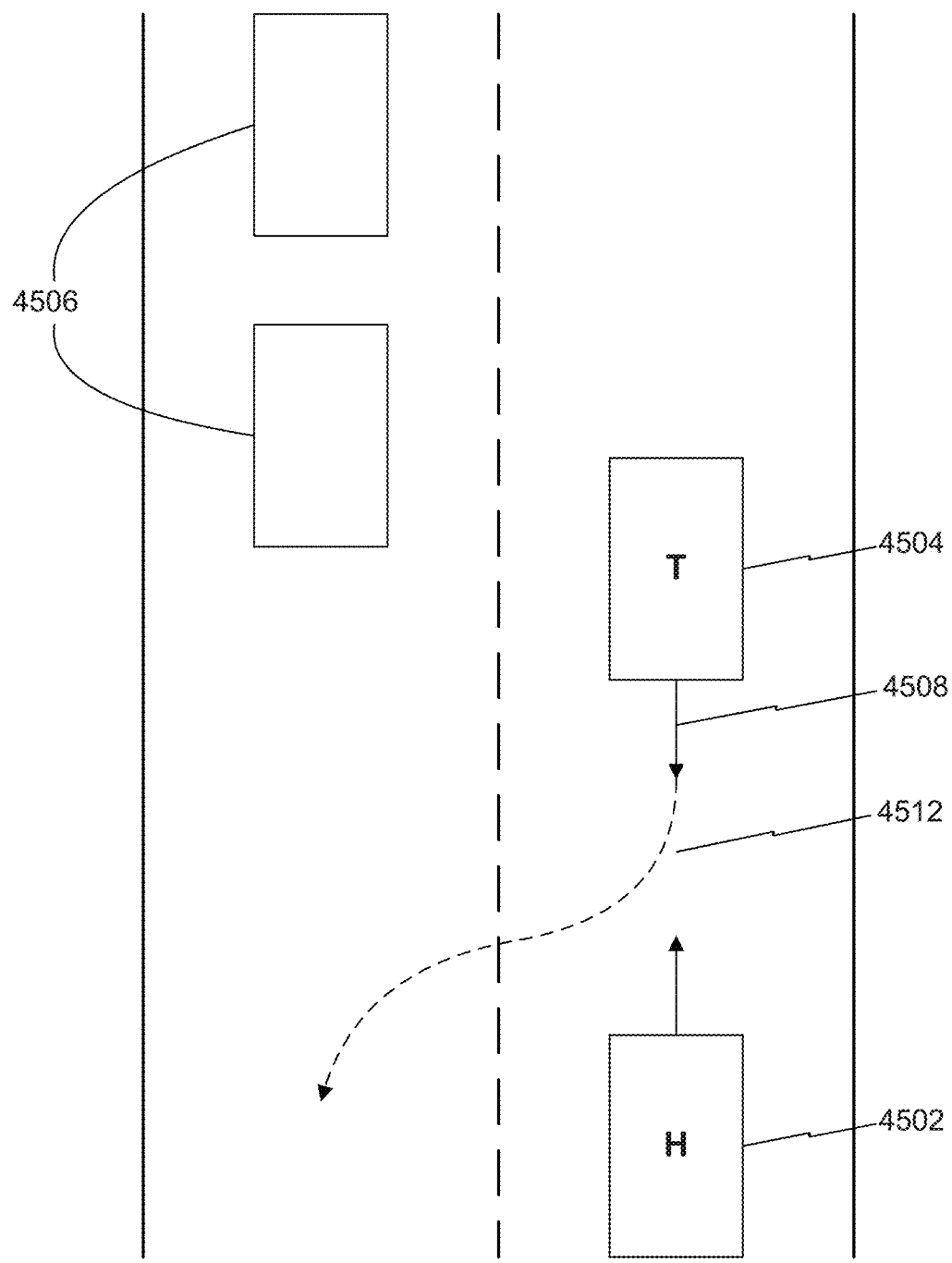
FIG. 45A provides a diagrammatic illustration of a driving scenario involving a host vehicle trajectory overlapping with a trajectory of a target vehicle in a right lane driving jurisdiction.

Other driving scenarios involving a host vehicle and a detected target vehicle may also be expected to result in an action taken by the host vehicle navigation system (e.g., issuing a warning, braking, etc.). For example, as shown in FIG. 45A, a host vehicle 4502 in a right lane driving jurisdiction is approaching a detected target vehicle 4504. Target vehicle 4504 is in the process of passing vehicles 4506 and, therefore, is currently driving toward host vehicle 4502 in the same lane as host vehicle 4502. In such a case, a navigation system of host vehicle 4502 would be expected to take an action (e.g., issuing a warning, braking, etc.) if a potential collision is determined to be likely to occur relative to detected target vehicle 4504. Such a determination may be made, for example, at a time during which a current projected trajectory 4508 extends toward host vehicle 4502. Such an action may be canceled or not taken, for example, if a projected trajectory 4512 of the target vehicle extends away from a planned trajectory of the host vehicle (e.g., is not expected to intersect with the trajectory of the host vehicle).

Figure 45B:
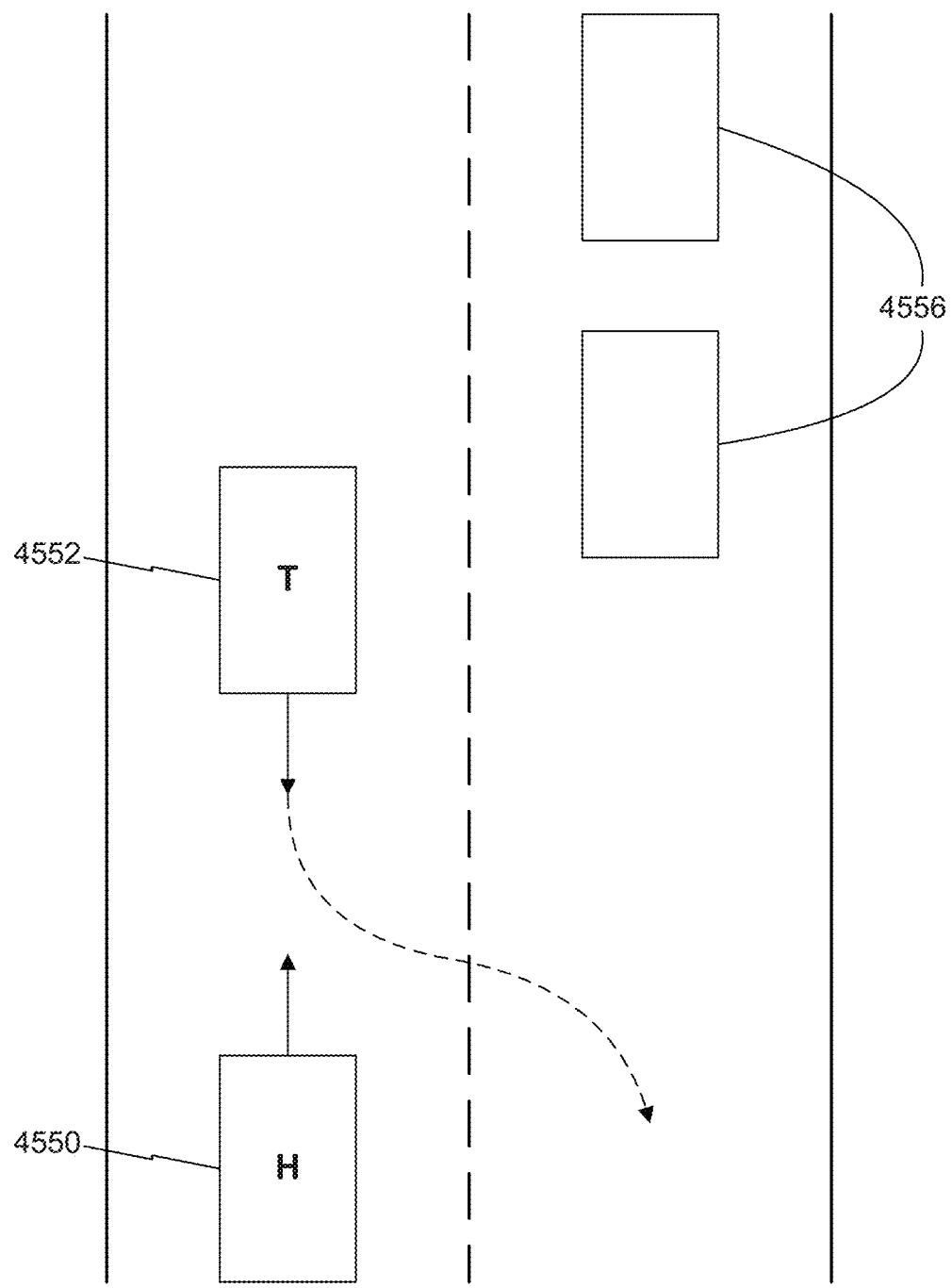
FIG. 45B provides a diagrammatic illustration of a driving scenario involving a host vehicle trajectory overlapping with a trajectory of a target vehicle in a left lane driving jurisdiction.

FIG. 45B represents a scenario similar to the scenario of FIG. 45A, but located in a left lane driving jurisdiction. In this scenario, a detected target vehicle 4552 is in the process of passing vehicles 4556. Target vehicle 4552 is driving toward host vehicle 4550 in the same lane of travel as host vehicle 4550. Similar to the scenario represented by FIG. 45A, a navigational system of host vehicle 4550 would be expected to take at least one action (e.g., issuing a warning, braking, etc.) if the planned trajectory of host vehicle 4550 overlaps with the trajectory of target vehicle 4552 or if a potential collision is otherwise determined to exist between host vehicle 4550 and target vehicle 4552. As in the scenario of FIG. 45A, an avoidance action may be canceled or not taken, for example, if a projected trajectory of the target vehicle extends away from a planned trajectory of the host vehicle (e.g., is not expected to intersect with the trajectory of the host vehicle).

Figure 46A:
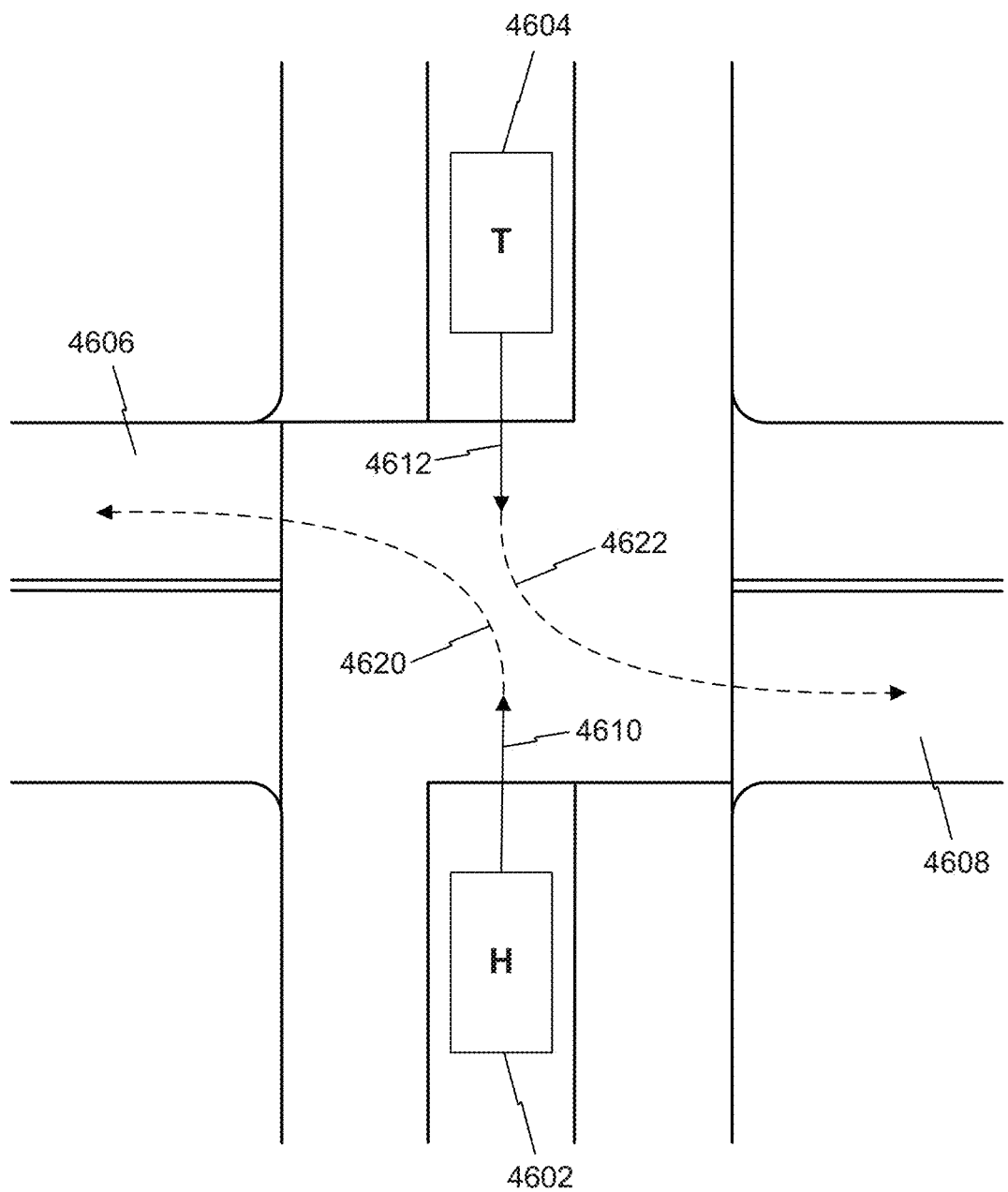
FIG. 46A provides a diagrammatic illustration of a driving scenario involving a host vehicle trajectory overlapping with a trajectory of a target vehicle in a right lane driving jurisdiction.

FIG. 46A provides a diagrammatic illustration of another driving scenario involving a host vehicle trajectory overlapping with a trajectory of a target vehicle in a right lane driving jurisdiction. In this scenario, a host vehicle 4602 is located in a left-hand turn lane and plans to make a left-hand turn into lane 4606. Opposite the intersection, a detected target vehicle 4604 is also located in a left-hand turn lane and plans to make a left-hand turn into lane 4608. For at least a portion of time during which both the host vehicle and the target vehicle initiate their respective left-hand turns, both vehicles may be travelling along trajectories toward one another in a head-on scenario. As described relative to FIGS. 45A and 45B, where a host vehicle has a planned trajectory that intersects with a target vehicle or overlaps with (or crosses, as in FIGS. 44A and 44B) a projected trajectory for a target vehicle, the navigation system is expected to take at least one remedial action (e.g., issuing a warning, braking, etc.). In the scenario of FIG. 46A, at the initiation of the respective left-hand turns of the host vehicle and the target vehicle, the initial trajectories 4610 and 4612 may be toward one another. As a result, under normal circumstances, a navigation system of host vehicle 4602 may determine that there is a risk of collision and may take a remedial action. In the scenario of FIG. 46A, however, the navigation system of host vehicle 4602 may forego any remedial action and may allow host vehicle 4610 to proceed, without action, through the intersection and into lane 4606. Such a determination to forego a remedial action in the scenario of FIG. 46A may be based on a number of factors determined based on sensor input (e.g., images acquired from cameras (onboard or otherwise), LIDAR, RADAR, etc.). For example, the navigation system of host vehicle 4602 knows that the planned trajectory of host vehicle 4602 does not continue along a path expected to cross or overlap with target vehicle 4604 or a projected trajectory of target vehicle 4604. Rather, the navigation system of host vehicle 4602 knows that the planned trajectory of host vehicle 4602 will, at a certain point, shift away from initial trajectory 4610 and follow a path 4620 that diverges from the observed trajectory and/or the projected (estimated) trajectory of target vehicle 4604.

The navigation system of host vehicle 4602 may be able to forego a remedial action in this scenario based primarily upon that information. In other cases, however, additional information may further confirm a decision to forego a remedial action. Such information may include sensor inputs (e.g., acquired images, LIDAR, RADAR, etc.) indicating that the target vehicle trajectory has diverged from initial trajectory 4612 and is continuing along a new projected trajectory 4622 that does not cross a trajectory of the host vehicle. The decision to forego a remedial action may also be aided by information such as a detected location of the target vehicle in a turn lane. For example, acquired images, LIDAR, RADAR, etc. may indicate that the target vehicle is in a middle lane between two lanes of normal travel, that the target vehicle in a lane that is not an outside most lane, that the target vehicle in a lane directly opposite of the lane in which the host vehicle resides suggesting that the target vehicle does not intend to proceed straight through the intersection and into the path of the host vehicle, etc. This may be especially true where the host vehicle navigation system recognizes the host vehicle position as residing in a turn lane and that the detected target vehicle resides in a lane across the intersection and opposite to the turn lane in which the host vehicle resides (e.g., a clue that the target vehicle also resides in a turn lane). This information may also suggest that no remedial action is expected or needed if the navigation system understands that opposing lanes in an intersection do not represent valid driving paths across the intersection.

Figure 46B:
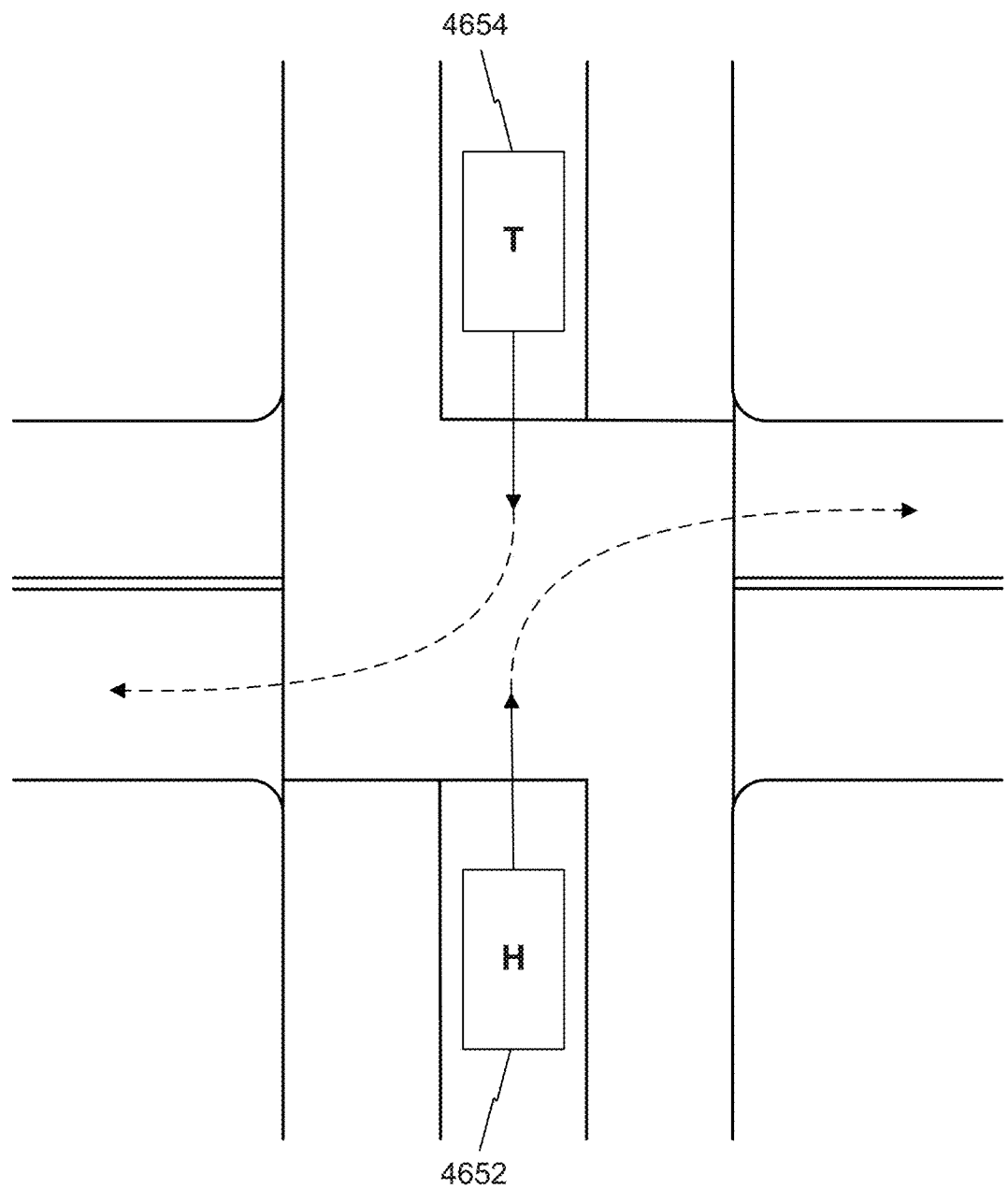
FIG. 46B provides a diagrammatic illustration of a driving scenario involving a host vehicle trajectory overlapping with a trajectory of a target vehicle in a left lane driving jurisdiction.

FIG. 46B provides a diagrammatic illustration of a driving scenario involving a host vehicle 4652 and a target vehicle 4654 both traversing an intersection and both making right-hand turns in a left lane driving jurisdiction. The scenario of FIG. 46B is the counterpart scenario to the FIG. 46A scenario, except in a left lane driving jurisdiction.

Figure 47:
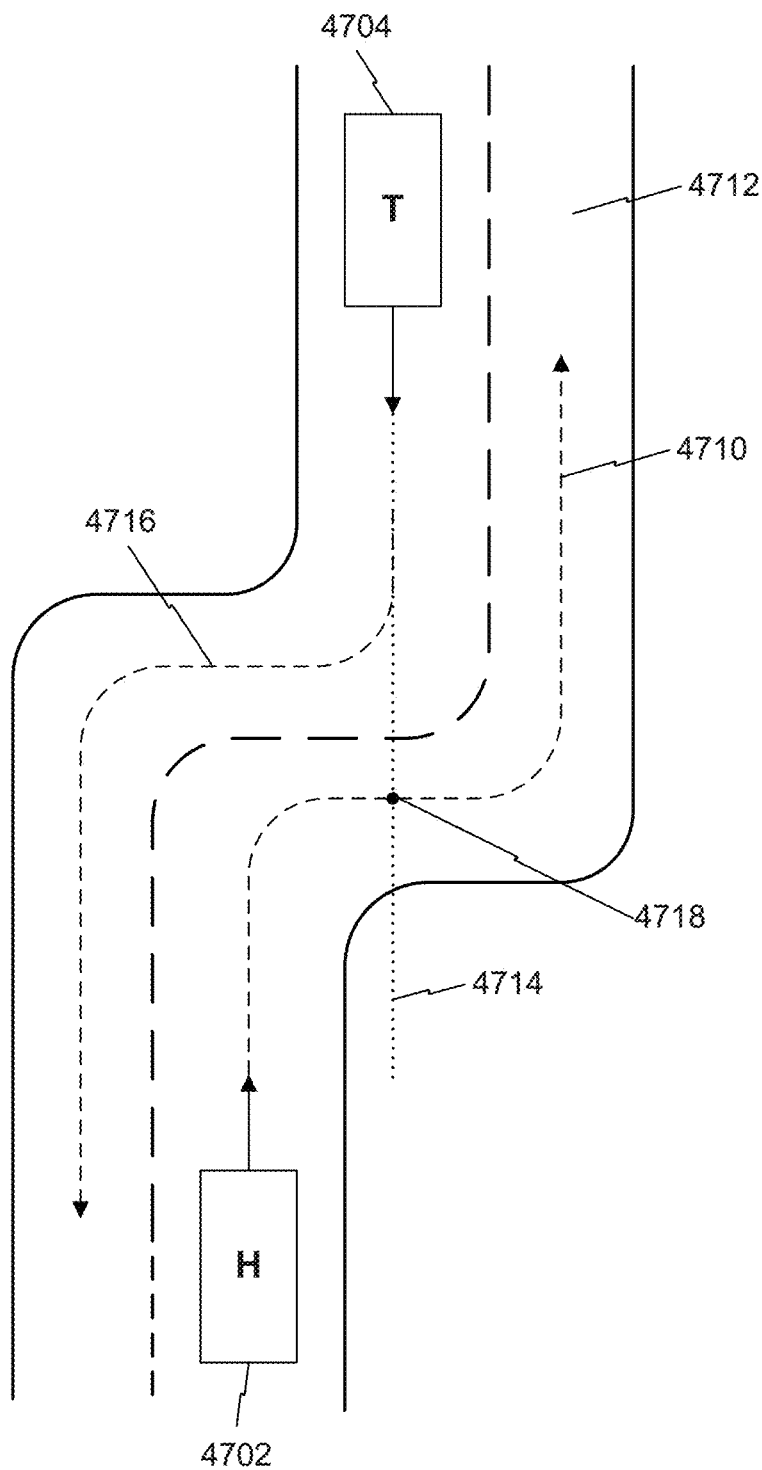
FIG. 47 provides a diagrammatic illustration of a driving scenario involving a planned trajectory for a host vehicle intersecting with a current trajectory of a target vehicle in a right lane driving jurisdiction.
Figure 48:
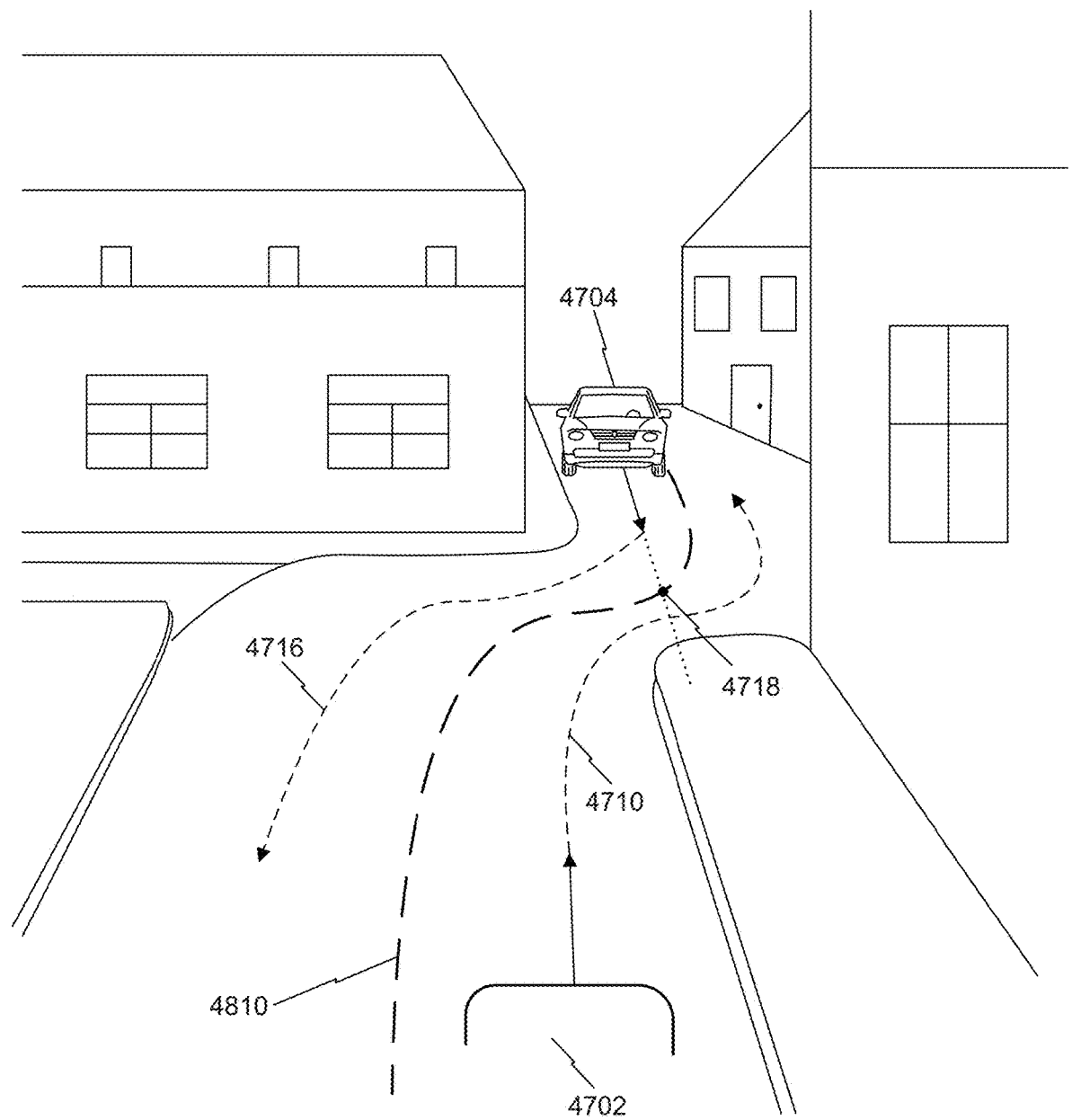
FIG. 48 provides a perspective illustration of the driving scenario represented by FIG. 47.

Other scenarios, however, may exist in which the situation may be more ambiguous to the navigation system of a host vehicle. Such situations, for example, may involve a determination that a planned trajectory for a host vehicle overlaps with a current, observed or projected (estimated) trajectory of a target vehicle. In normal situations, which may include LTAP or RTAP situations, a navigation system of a host vehicle may be expected to take a remedial action to issue a warning, cause vehicle braking, etc. In other cases, however, it may be desirable for the navigation system of a host vehicle to forego such a remedial action FIG. 47 provides a diagrammatic illustration of a driving scenario involving a planned trajectory for a host vehicle 4702 intersecting with a current trajectory of a target vehicle 4704 in a right lane driving jurisdiction. FIG. 48 provides a perspective illustration of the driving scenario represented by FIG. 47. For example, at the current location of host vehicle 4702, a navigation system of the host vehicle may know that a planned trajectory 4710 for the host vehicle continues straight for a short distance and then bends to the right before bending to the left in order to follow lane 4712.

At its current location, however, the navigation system of host vehicle 4702 may determine that detected target vehicle 4704 has a current motion indicative of a projected or estimated trajectory 4714 that extends in a straight line from the current location of target vehicle 4704. As a result, the navigation system of host vehicle 4702 may determine that its own planned trajectory 4710 crosses the projected trajectory of the target vehicle at a point 4718. Such an intersection of the planned trajectory of the host vehicle and the detected target vehicle suggests a need for a remedial action by the navigational system of host vehicle 4702 (e.g., issuing a warning, braking, etc.), as in the cases of the scenarios represented in FIGS. 44A-45B, for example.

The scenario of FIG. 47 and FIG. 48, however, is one in which both the host vehicle and the target vehicle are both traveling in their respective lanes, and assuming both continue to travel in their respective lanes (the host vehicle along its trajectory 4710 and the target vehicle traveling along its actual trajectory 4716), there will be no crossing of trajectories and no danger of collision. Thus, in such cases, it may be desirable for the host vehicle navigation system to forego any remedial action, even where it appears to the host vehicle navigation system, at its current location, that such a crossing of trajectories is likely.

There may be several information sources on which a navigational system of host vehicle 4702 may rely in determining to forego a remedial action in a perceived turn-across-path situation (e.g., a RTAP (right turn across path) situation in right lane driving jurisdictions, as shown in FIGS. 47 and 48, or in a counterpart LTAP situation in a left lane driving jurisdiction). For example, in some cases, the navigation system of host vehicle 4702 may determine a location of the host vehicle based on an output of a GPS sensor, for example, or based on any other source of information upon which a vehicle location may be determined. Based on the determined vehicle location, the navigation system may determine whether the vehicle location is associated with a right lane driving jurisdiction (e.g., the U.S., Canada, France, Germany, etc.) or whether the vehicle location is associated with a left lane driving jurisdiction (e.g., Great Britain, Ireland, Japan, etc.). In some cases, this location information along with the associated driving convention may be sufficient, on its own, to forego a remedial action. For example, if the host vehicle navigation system determines that the host vehicle is located in a right lane driving jurisdiction, then the navigation system may determine that a projected RTAP situation may not correspond with a valid driving action on the part of the target vehicle. Referring to FIG. 48, while there is a potential RTAP event detected at point 4718, a collision would result only if the target vehicle 4704 disobeyed driving convention and left its lane. Indeed, the host vehicle navigation system may be configured such that a detected RTAP event in a right lane driving jurisdiction and for an oncoming traffic situation may be assumed, at least initially, as one not requiring remedial action (as right turns across paths of oncoming vehicles is not a situation typically associated with normal driving in a right lane driving jurisdiction). Therefore, as at least a first action, the host vehicle navigation system may forego a remedial action. Host vehicles in a left lane driving jurisdiction may take a similar approach when confronted with LTAP situations involving oncoming traffic. Note that the same assumption is likely is not valid when the target vehicle is travelling in a crossing lane the host vehicle is planning to enter.

In some cases, a decision to forego a remedial action in a situation such as the one represented by FIGS. 47 and 48 may depend on additional information. For example, in addition to information regarding the location of the host vehicle (and whether the location is in a left or right lane driving jurisdiction), other information may be automatically derived from various sensor outputs associated with the host vehicle. Based on analysis of images acquired from one or more cameras, point clouds associated with LIDAR outputs, etc., the navigation system of a host vehicle may determine which lane on a roadway a target vehicle is traveling.

The navigation system may determine whether a target vehicle is traveling in a lane adjacent to an expected/correct road edge (e.g., adjacent to a curb, shoulder, etc., of a lane other than a lane in which the host vehicle travels). For example, relative to the scenario of FIG. 48, the host vehicle navigation system may determine that target vehicle 4704 is traveling in a right lane of the road, based on analysis of acquired images or LIDAR showing an open lane to the right of the target vehicle 4704. In such instances, the host vehicle navigation system may determine that there is sufficient room on the right side of the target vehicle to pass by the target vehicle in a right lane driving jurisdiction.

The navigation system may also identify in acquired images, LIDAR output, etc. the existence on the roadway of one or more lane markings. Such markings (like centerline 4810 of FIG. 48) may indicate an upcoming shift in the roadway. For example, in FIG. 48, analysis of acquired images, LIDAR, etc. may enable the navigation system of the host vehicle to determine that centerline 4810 curves to the right and then to the left, indicating a bend in the road ahead of the host vehicle. This information, coupled with an expectation that the target vehicle will obey road markings and remain on the correct side of the centerline, may enable the navigation system to determine that no remedial action is required in the scenario of FIG. 48.

Any of the foregoing information may be used in any combination together or separate from other information such as sensed or determined host/target vehicle speed, host/target lateral offset, host/target vehicle turn direction, and/or potential collision point between host and target in determining whether to initiate a remedial action.

Additional information may be used by a navigation system of the host vehicle to determine whether to cause a remedial action by the host vehicle or whether to forego such a remedial action. For example, a trained system, such as the system described above in the "Estimating Future Paths" section may be capable of recognizing the scenario illustrated in FIG. 48. Such a system may recognize available room for the host vehicle to pass by the target vehicle when traversing the roadway along a predicted path of the host vehicle and according to a driving convention of the jurisdiction in which the host vehicle is located. Such systems may also augment the remedial action analysis by recognizing/detecting road edges, mapping the road edges, and/or otherwise using detected road edge locations in determining the path of a road on which a host vehicle travels. Such information may be useful in determining the presence of an upcoming curve in the road, as shown in FIG. 48, and the availability of room to pass by a detected target vehicle without issuing a remedial action.

A host vehicle navigation system may also rely on augmented path prediction information in determining whether to issue a remedial action. For example, as described above in the "Navigation by Augmented Path Prediction" section, a navigation system may rely upon navigational hints to resolve ambiguities in determining an available trajectory for the host vehicle. Such hints, for example, may indicate that in 40 meters, a host vehicle is to be traveling along a direction that is 60 degrees to the right of a current trajectory. Such information may enable a host vehicle navigation system, when confronted with a sensed environment as represented by FIG. 48, to determine that a right-hand bend in the road exists about 40 meters ahead of the host vehicle. With such information, the navigation system may determine that the detected target vehicle is on the other side of the bend in the road and is heading toward a complementary right-hand bend in the road. As a result, the navigation system may determine that the detected target vehicle may pass safely by the host vehicle and, therefore, a remedial action is not required.

Similarly, a navigation system of the host vehicle may rely, at least partially, upon sparse map information and principles of navigation based on such sparse maps (as described in the sections above) in order to determine whether a remedial action is appropriate. For example, a sparse map (and a target trajectory for the host vehicle defined by a polynomial spline associated with the sparse map) may indicate that in 40 meters, the host vehicle is expected to be traveling through a right-hand bend in the road (as represented by a right hand bend in the target trajectory for the host vehicle). Such information may enable a host vehicle navigation system, when confronted with a sensed environment as represented by FIG. 48, to determine that a right-hand bend in the road exists ahead and that the detected target vehicle will also be traversing a similar bend in the road. As a result, the navigation system may determine that the detected target vehicle may pass safely by the host vehicle and, therefore, a remedial action is not required.

Figure 49:
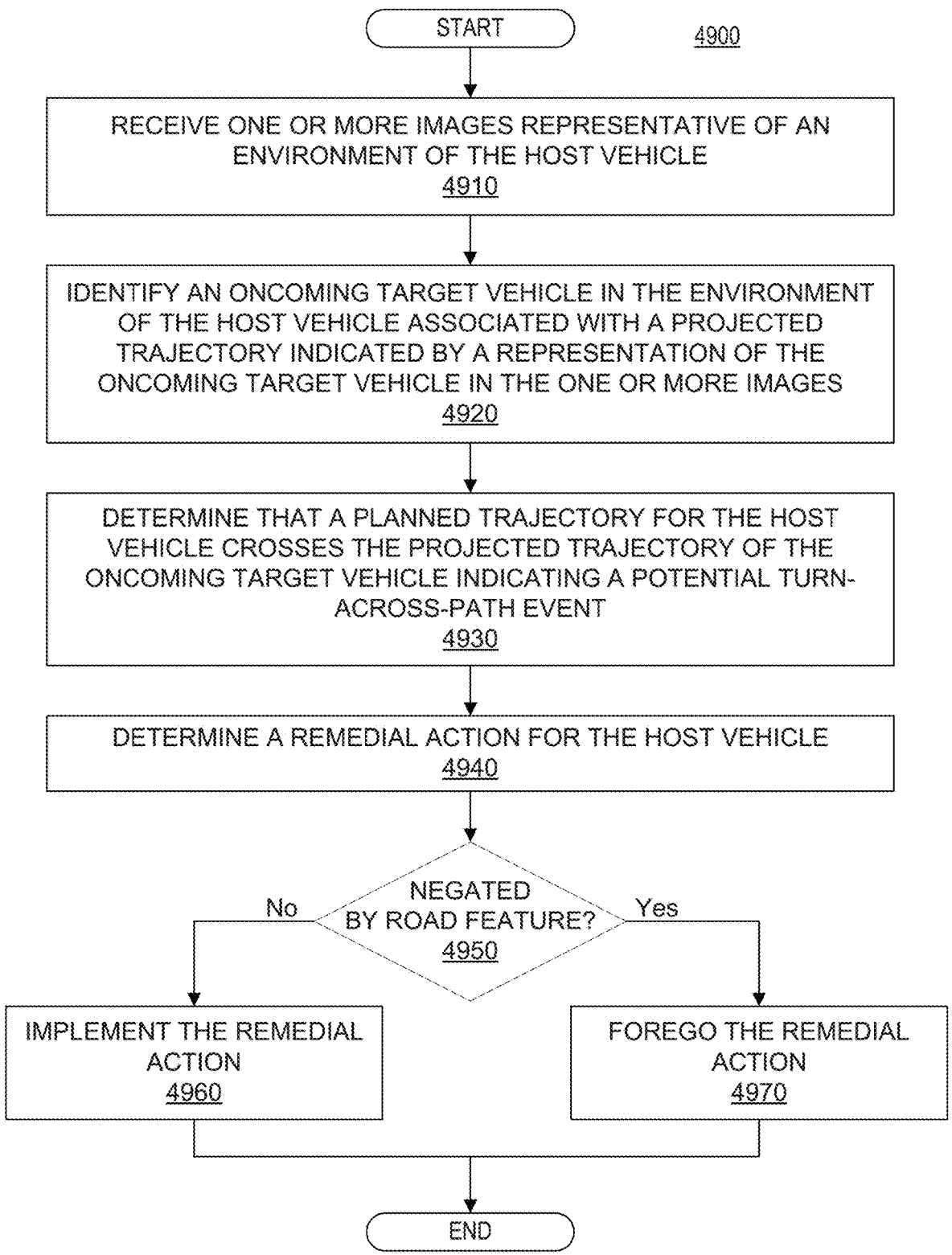
FIG. 49 is a flow chart showing an example process for autonomous navigation in vehicle crossing scenarios consistent with the disclosed embodiments.

FIG. 49 is a flow chart showing an exemplary process 4900 for autonomous navigation in vehicle crossing scenarios consistent with the disclosed embodiments. Process 4900 may be performed by at least one processing device, such as processing unit 110, which may use one of or both of application processor 180 and image processor 190 to implement process 4900.

At step 4910, process 4900 may include receiving, from a camera, one or more images representative of an environment of the host vehicle. The at least one image may be received from an image capture device consistent with this disclosure, including, for example, image acquisition unit 120, as described above. Accordingly, the images may represent an environment of vehicle 200. In some embodiments, the at least one image may be an image obtained from a RADAR, a LIDAR, or any other device from which an image may be obtained, whether optical or otherwise.

At step 4920, process 4900 may include identifying, based on analysis of the one or more images, an oncoming target vehicle in the environment of the host vehicle. For example, the oncoming target vehicle may correspond to target vehicles 4404, 4452, 4504, 4552, 4604, 4654, and/or 4704, as discussed above. The oncoming target vehicle may be associated with a projected trajectory of the oncoming target vehicle, the projected trajectory being indicated by at least one aspect of a representation of the oncoming target vehicle in the one or more images. For example, the projected trajectory may be based on a current heading direction of the target vehicle, as represented in the one or more images. Accordingly, process 4900 may further include determining a heading direction of the target vehicle based on analysis of the one or more images.

At step 4930, process 4900 may include determining that a planned trajectory for the host vehicle crosses the projected trajectory of the oncoming target vehicle and is indicative of a potential turn-across-path event. As described above, the planned trajectory for the host vehicle may be determined in various ways. In some embodiments, processing unit 110 may further be configured to determine the planned trajectory of the host vehicle based on analysis of the one or more images to determine free space associated with a road. For example, processing unit 110 may determine free space ahead of vehicle 200 and the planned trajectory may represent a route for navigating vehicle 200 through the free space. In some embodiments, processing unit 110 may further be configured to determine the planned trajectory of the host vehicle based on a heading direction of the host vehicle for a predetermined distance ahead of the host vehicle. For example, processor 100 may assume that the host vehicle will maintain the same heading direction for a predetermined distance (e.g., 1 m, 2 m, 5 m, 10 m, etc.). In other embodiments, processing unit 110 may further be configured to determine the planned trajectory of the host vehicle based on a stored spline associated with a map. For example, the stored spline may be associated with a sparse map or other navigation model associated with vehicle 200. The stored spline may be accessed locally from within a memory of vehicle 200, or may be accessed from a server (e.g., server 3400). The potential turn-across-path event may be any event in which the projected path of the target vehicle and the planned path of the host vehicle intersect. For example, the turn-across-path event may be a RTAP (right turn across path) event or LTAP (left turn across path) event, as discussed above, or similar events.

At step 4940, process 4900 may include determining a remedial action for the host vehicle in response to the oncoming target vehicle and the potential turn-across-path event. The remedial action may be an action determined by processing unit 110 that will avert or remediate a collision between host vehicle 200 and the target vehicle. In some embodiments, the remedial action may include braking of the host vehicle. For example, the host vehicle may reduce its speed or come to a stop. In some embodiments, the remedial action may include changing a heading direction of the host vehicle. For example, the remedial action may include a steering action for host vehicle to avoid a collision with the target vehicle.

In some embodiments, process 4900 may include a step 4950 for determining whether the target vehicle is approaching a road feature that negates the potential turn-across-path event. For example, processing unit 110 may determine that, based on an identified road feature, that the target vehicle will avoid the potential turn-across-path event.

In some embodiments, this may be determined based on the images received from the camera. For example, processing unit 110 may further be configured to analyze the one or more images to determine a presence of a road feature that will cause a path of the oncoming vehicle to not overlap with a planned trajectory of the host vehicle. The road feature may include, for example, a road edge, a lane marking, a structure of the road, or similar features. In some embodiments, the road feature may be detected based on other objects or indications within the environment of the host vehicle. For example, detection of the road feature may be based on the presence of a sign depicting a road curve, a turn lane, etc. Various other signs may also be detected, such as a stop sign, a yield sign, a do not enter sign, a traffic signal, or the like. Detection of the presence of one or more such signs may be indicative of a corresponding road feature.

In some embodiments, the determination in step 4950 may be based on a road navigation model associated with the environment of the host vehicle. For example, processing unit 110 may access a sparse map, as discussed above, or another form of map or road navigation model. Accordingly, process 4900 may further include determining, from a stored map, a lane of travel of the oncoming target vehicle and determining, from the stored map, a target trajectory associated with the lane of travel of the oncoming target vehicle. For example, the target trajectory may include a bend associated with a road such that the target trajectory of the oncoming target vehicle's lane of travel does not overlap with the planned trajectory of the host vehicle.

In some embodiments, the determination in step 4950 may be based on a driving jurisdiction associated with the environment of the host vehicle. For example, as discussed above with respect to FIGS. 47 and 48, processing unit 110 may determine that, based on the driving jurisdiction, the turn-across-path event may not be associated with a valid driving path of the target vehicle in the jurisdiction. Accordingly, process 4900 may further include determining a location of the host vehicle and determining whether the location of the host vehicle is a left lane or a right lane driving jurisdiction. For example, the location of the host vehicle may be based on a GPS location, etc. and the processing unit 110 may determine a country or other territory associated with the location. In some embodiments, processing unit 110 may determine whether the location of the host vehicle is a left lane or right lane jurisdiction based on a stored value (e.g., based on a setting, based on a previously determined driving jurisdiction, etc.). Process 4900 may further include determining that the oncoming target vehicle is approaching a road feature that negates the potential turn-across-path event based on the determination that the location of the host vehicle may be a left-handed or a right-handed driving jurisdiction. In some embodiments, the turn across path event may be associated with a right turn of the host vehicle across the projected trajectory of the oncoming target vehicle, the oncoming target vehicle and the host vehicle may be located in a right lane driving jurisdiction, and the road feature may include a right hand bend or turn in the road. In other embodiments, the turn across path event may be associated with a left turn of the host vehicle across the projected trajectory of the oncoming target vehicle, the oncoming target vehicle and the host vehicle may be located in a left lane driving jurisdiction, and the road feature may include a left hand bend or turn in the road.

In some embodiments, the determination in step 4950 may be based on a lane of travel of the target vehicle. Accordingly, process 4900 may further include determining, based on analysis of at least two of the one or more images, a lane of travel of the target vehicle based on motion of the target vehicle and determining, based on the motion, a target trajectory associated with the lane of travel of the oncoming target vehicle. For example, processing unit 110 may compare the at least two images to determine a direction of travel, a speed, or other properties of the target vehicle. The lane of travel may be determined by analyzing the one or more images (e.g., detecting a lane marking, a lane boundary, etc.), based on a road navigation model (e.g., a sparse map, etc.) or various other methods. In some embodiments, the target trajectory may include a bend associated with a road such that the target trajectory of the oncoming target vehicle's lane of travel does not overlap with the planned trajectory of the host vehicle.

At step 4960, process 4900 may include implementing the remedial action if the oncoming target vehicle is determined to be not approaching a road feature that negates the potential turn-across-path event. For example, based on the analysis in step 4960, processing unit may not identify any features in the road that would reduce the probability of an impact between the host vehicle and the target vehicle based on the turn-across-path event. Accordingly, the host vehicle may stop, reduce its speed, perform a steering action, etc.

At step 4970, process 4900 may include foregoing the remedial action for the host vehicle in response to the oncoming target vehicle and the potential turn-across-path event if the oncoming target vehicle is determined to be approaching a road feature that negates the potential turn-across-path event. For example, at step 4950, processing unit 110 may determine that there is a reduced risk of impact (or entry into a safety envelope, etc.) between the host vehicle and the target vehicle associated with the turn-across-path event. As discussed above, the determination may be based on a navigational model or map, a driving jurisdiction, images captured by the camera, etc. For example, processing unit 110 may determine that, based on the driving jurisdiction, the target vehicle is expected to follow a bend in the road which would negate the potential turn-across-path event. In some embodiments, foregoing the remedial action for the host vehicle may include forgoing application of brakes of the host vehicle, maintaining a current heading direction of the host vehicle, etc. In some embodiments, process 4900 may include determining and/or taking an alternate remedial action. Such alternate actions may include reducing a speed of the host vehicle, monitoring the target vehicle to verify it navigates in a manner that negates the turn-across-path event, or the like.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A navigation system for a host vehicle, the navigation system comprising:
    at least one processor comprising circuitry and a memory, wherein the memory includes instructions that when executed by the circuitry cause the at least one processing device to:
        receive one or more images captured by a camera, the one or more images being representative of an environment of the host vehicle;
        identify, based on analysis of the one or more images, an oncoming target vehicle in the environment of the host vehicle, wherein the oncoming target vehicle is associated with a projected trajectory of the oncoming target vehicle extending ahead of a current location of the oncoming target vehicle, the projected trajectory being indicated by at least one aspect of a representation of the oncoming target vehicle in the one or more images, wherein a current heading direction extending ahead of the host vehicle does not intersect with the projected trajectory;
        determine that a planned trajectory for the host vehicle includes a turn that crosses the projected trajectory of the oncoming target vehicle at a turn-across-path location and is indicative of a potential turn-across-path event, the turn being associated with a first curve in a road the host vehicle is traveling along, the road being associated with either a right-hand driving jurisdiction or a left-hand driving jurisdiction;
        if the oncoming target vehicle is determined to be not approaching a road feature that negates the potential turn-across-path event, implement a remedial action in the host vehicle; and
        if the oncoming target vehicle is determined to be approaching a road feature that negates the potential turn-across-path event, forego implementing a remedial action associated with the potential turn-across-path event in determining a navigational action for the host vehicle, the road feature that negates the potential turn-across-path event including a second curve in the road detected in the one or more images, wherein the presence of the second curve in the road indicates the oncoming target vehicle will turn to follow the curvature of the road prior to reaching the turn-across-path location;
        wherein if the road is associated with a right-hand driving jurisdiction, the first curve is a right-hand bend in the road and the second curve is a left-hand bend in the road relative to the host vehicle, and if the road is associated with a left-hand driving jurisdiction, the first curve is a left-hand bend in the road and the second curve is a right-hand bend in the road relative to the host vehicle.

2. The navigation system of claim 1, wherein the remedial action includes braking of the host vehicle.

3. The navigation system of claim 1, wherein the remedial action includes changing a heading direction of the host vehicle.

4. The navigation system of claim 1, wherein execution of the instructions included in the memory further cause the at least one processor to:
    determine, from a stored map, a lane of travel of the oncoming target vehicle; and
    determine, from the stored map, a target trajectory associated with the lane of travel of the oncoming target vehicle, wherein the target trajectory includes a bend associated with the second curve in the road.

5. The navigation system of claim 1, wherein execution of the instructions included in the memory further cause the at least one processor to:
    analyze the one or more images to identify the road feature that negates the potential turn-across-path event.

6. The navigation system of claim 5, wherein the road feature is identified based on a representation of a road edge included in the one or more images.

7. The navigation system of claim 5, wherein the road feature is identified based on a representation of a lane marking included in the one or more images.

8. The navigation system of claim 5, wherein the road feature is identified based on a representation of a structure of a road detected in the one or more images.

9. The navigation system of claim 5, wherein the road feature is identified based on a representation of a sign depicting a road curve included in the one or more images.

10. The navigation system of claim 1, wherein execution of the instructions included in the memory further cause the at least one processor to:
    determine a location of the host vehicle; and
    determine, based on the location, whether the road is associated with the right-hand driving jurisdiction or the left-hand driving jurisdiction.

11. The navigation system of claim 1, wherein execution of the instructions included in the memory further cause the at least one processor to:
    determine, based on analysis of at least two of the one or more images, a lane of travel of the oncoming target vehicle based on a motion of the oncoming target vehicle; and
    determine, based on the motion, a target trajectory associated with the lane of travel of the oncoming target vehicle, wherein the target trajectory includes a bend associated with the second curve in the road.

12. The navigation system of claim 1, wherein execution of the instructions included in the memory further cause the at least one processor to determine the planned trajectory of the host vehicle based on analysis of the one or more images to determine free space associated with a road.

13. The navigation system of claim 1, wherein execution of the instructions included in the memory further cause the at least one processor to determine the planned trajectory of the host vehicle based on a heading direction of the host vehicle for a predetermined distance ahead of the host vehicle.

14. The navigation system of claim 1, wherein execution of the instructions included in the memory further cause the at least one processor to determine the planned trajectory of the host vehicle based on a stored spline associated with a map.

15. The navigation system of claim 1, wherein execution of the instructions included in the memory further cause the at least one processor to determine a heading direction of the oncoming target vehicle based on analysis of the one or more images.

16. The navigation system of claim 1, wherein foregoing the remedial action for the host vehicle includes foregoing application of brakes of the host vehicle.

17. A method for navigating a host vehicle, the method comprising:
    receiving one or more images captured by a camera, the one or more images being representative of an environment of the host vehicle;
    identifying, based on analysis of the one or more images, an oncoming target vehicle in the environment of the host vehicle, wherein the oncoming target vehicle is associated with a projected trajectory of the oncoming target vehicle extending ahead of a current location of the oncoming target vehicle, the projected trajectory being indicated by at least one aspect of a representation of the oncoming target vehicle in the one or more images, wherein a current heading direction extending ahead of the host vehicle does not intersect with the projected trajectory;
    determining that a planned trajectory for the host vehicle includes a turn that crosses the projected trajectory of the oncoming target vehicle at a turn-across-path location and is indicative of a potential turn-across-path event, the turn being associated with a first curve in a road the host vehicle is traveling along, the road being associated with either a right-hand driving jurisdiction or a left-hand driving jurisdiction;
    if the oncoming target vehicle is determined to be not approaching a road feature that negates the potential turn-across-path event, implementing a remedial action in the host vehicle; and
    if the oncoming target vehicle is determined to be approaching a road feature that negates the potential turn-across-path event, foregoing implementing a remedial action associated with the potential turn-across-path event in determining a navigational action for the host vehicle, the road feature that negates the potential turn-across-path event including a second curve in the road detected in the one or more images, wherein the presence of the second curve in the road indicates the oncoming target vehicle will turn to follow the curvature of the road prior to reaching the turn-across-path location;
    wherein if the road is associated with a right-hand driving jurisdiction, the first curve is a right-hand bend in the road and the second curve is a left-hand bend in the road relative to the host vehicle, and if the road is associated with a left-hand driving jurisdiction, the first curve is a left-hand bend in the road and the second curve is a right-hand bend in the road relative to the host vehicle.

18. The method of claim 17, wherein the method further comprises:
    determining, from a stored map, a lane of travel of the oncoming target vehicle; and
    determining, from the stored map, a target trajectory associated with the lane of travel of the oncoming target vehicle, wherein the target trajectory includes a bend associated with the second curve in the road.

19. The method of claim 17, wherein the method further comprises:
    analyzing the one or more images to identify the road feature that negates the potential turn-across-path event.

20. The method of claim 17, wherein the method further comprises:
    determining, based on analysis of at least two of the one or more images, a lane of travel of the oncoming target vehicle based on a motion of the oncoming target vehicle; and
    determining, based on the motion, a target trajectory associated with the lane of travel of the oncoming target vehicle, wherein the target trajectory includes a bend associated with the second curve in the road.

21. The method of claim 17, wherein the planned trajectory of the host vehicle is determined based on analysis of the one or more images to determine free space associated with a road.

22. The method of claim 17, wherein the planned trajectory of the host vehicle is determined based on a heading direction of the host vehicle for a predetermined distance ahead of the host vehicle.

23. The method of claim 17, wherein the planned trajectory of the host vehicle is determined based on a stored spline associated with a map.

24. The method of claim 17, wherein the heading direction of the oncoming target vehicle is determined based on analysis of the one or more images.

25. A non-transitory computer-readable medium storing instructions for performing a method for navigating a host vehicle, the method comprising:
    receiving one or more images captured by a camera, the one or more images being representative of an environment of the host vehicle;
    identifying, based on analysis of the one or more images, an oncoming target vehicle in the environment of the host vehicle, wherein the oncoming target vehicle is associated with a projected trajectory of the oncoming target vehicle extending ahead of a current location of the oncoming target vehicle, the projected trajectory being indicated by at least one aspect of a representation of the oncoming target vehicle in the one or more images, wherein a current heading direction extending ahead of the host vehicle does not intersect with the projected trajectory;
    determining that a planned trajectory for the host vehicle includes a turn that crosses the projected trajectory of the oncoming target vehicle at a turn-across-path location and is indicative of a potential turn-across-path event, the turn being associated with a first curve in a road the host vehicle is traveling along, the road being associated with either a right-hand driving jurisdiction or a left-hand driving jurisdiction;
    if the oncoming target vehicle is determined to be not approaching a road feature that negates the potential turn-across-path event, implementing a remedial action in the host vehicle; and if the oncoming target vehicle is determined to be approaching a road feature that negates the potential turn-across-path event, foregoing implementing a remedial action associated with the potential turn-across-path event in determining a navigational action for the host vehicle, the road feature that negates the potential turn-across-path event including a second curve in the road detected in the one or more images, wherein the presence of the second curve in the road indicates the oncoming target vehicle will turn to follow the curvature of the road prior to reaching the turn-across-path location.

\* \* \* \* \*